_(12)_ United States Patent
Tachibana et al.

(10) Patent No.: US 8,073,575 B2
(45) Date of Patent: Dec. 6, 2011

(54) VEHICLE

(75) Inventors: Takumi Tachibana, Tokyo (JP);
Nobuaki Miki, Tokyo (JP); Munehisa Horiguchi, Tokyo (JP); Fumihiko Sakakibara, Tokyo (JP)

(73) Assignee: Kabushikikaisha Equos Research, Tokyo (JP)

( * ) Notice: Subject to any disclaimer, the term of this patent is extended or adjusted under 35 U.S.C. 154(b) by 533 days.

(21) Appl. No.: 11/922,356

(22) PCT Filed: Jun. 23, 2006

(86) PCT No.: PCT/JP2006/312659
§ 371 (c)(1),
(2), (4) Date: Dec. 17, 2007

(87) PCT Pub. No.: WO2006/137545
PCT Pub. Date: Dec. 28, 2006

(65) Prior Publication Data
US 2010/0030397 A1    Feb. 4, 2010

(30) Foreign Application Priority Data

Jun. 24, 2005 (JP) ................. 2005-185689
Jun. 24, 2005 (JP) ................. 2005-185690
Jul. 14, 2005 (JP) ................. 2005-205090

(51) Int. Cl.
*G05D 1/00* (2006.01)

(52) U.S. Cl. ........... 701/1; 701/23; 701/110; 701/116; 701/117; 701/216; 414/396; 414/401; 414/584; 340/435; 340/903; 340/933; 324/337; 324/457; 148/320; 148/639; 148/644; 428/34; 428/215

(58) Field of Classification Search ............... 701/1, 23, 701/110, 116, 117, 216; 414/396, 401, 584; 340/435, 903, 933; 324/337, 457; 428/34, 215; 148/320, 639, 644; 318/587; 180/168; 296/96.14; 52/786.12; 73/117.01
See application file for complete search history.

(56) References Cited

U.S. PATENT DOCUMENTS 4,284,941 A * 8/1981 Regueiro ................. 318/587
5,581,249 A * 12/1996 Yoshida ................. 340/928
(Continued)

FOREIGN PATENT DOCUMENTS
JP          63-150044       6/1988
(Continued)

*Primary Examiner* — James Trammell
*Assistant Examiner* — McDieunel Marc
(74) *Attorney, Agent, or Firm* — Bacon & Thomas, PLLC

(57) ABSTRACT

To provide a vehicle which can move independently as an own independent vehicle and can run integrally in linkage with another vehicle. A plurality of single-seat vehicles which can move independently are combined and they move integrally while a predetermined formation is maintained through linkage among respective vehicles. One of all the vehicles moving in linkage serves as a host vehicle and an occupant in the host vehicle becomes a driver in the linkage moving. A host vehicle 1 runs with speed/direction according to running operation conducted by an occupant. Simultaneously therewith, the host vehicle 1 instructs following vehicles 2 to 4 to synchronize (follow) the host vehicle. The host vehicle 1 transmits a speed, a direction, and a relative position to the host vehicle to the following vehicles 2 to 4 as moving information in order to synchronize the following vehicles with the host vehicle (maintain linkage relationship). The following vehicles 2 to 4 move based upon a follow-up instruction and feed status information including speeds and directions of the following vehicles, and their own positions back to the host vehicle 1 as own vehicle information.

4 Claims, 30 Drawing Sheets

U.S. PATENT DOCUMENTS 6,026,135 A * 2/2000 McFee et al. .................. 376/159
6,246,932 B1 * 6/2001 Kageyama et al. ............. 701/24

FOREIGN PATENT DOCUMENTS

| | | |
|---|---|---|
| JP | 07-65297 | 3/1995 |
| JP | 09-249047 | 9/1997 |
| JP | 10-67254 | 3/1998 |
| JP | 10-162282 | 6/1998 |
| JP | 11-020499 | 1/1999 |
| JP | 11-149600 | 6/1999 |
| JP | 2000-113399 | 4/2000 |
| JP | 2000-331296 | 11/2000 |
| JP | 2001-006099 | 1/2001 |
| JP | 2004-510637 | 4/2004 |
| JP | 2005-145296 | 6/2005 |

* cited by examiner

| FORMATION | | REFERENCE | SLENDER | WIDE |
|---|---|---|---|---|
| | | ADVANCING DIRECTION | | |
| DETERMINATION REFERENCE | SPEED | ~100km/h | 100km/h~ | ABSENCE |
| | BRAKING | ABSENCE | ABSENCE | PRESENCE |
| | MANUAL | ORDINARY | NARROW ROAD AND THE LIKE | COMMUNICATION |

FOLLOWING INSTRUCTION
- POSITION/ARRANGEMENT
- SPEED
- DIRECTION

STATUS FEEDBACK
- POSITION/ARRANGEMENT
- SPEED
- DIRECTION

FIG. 13(a)
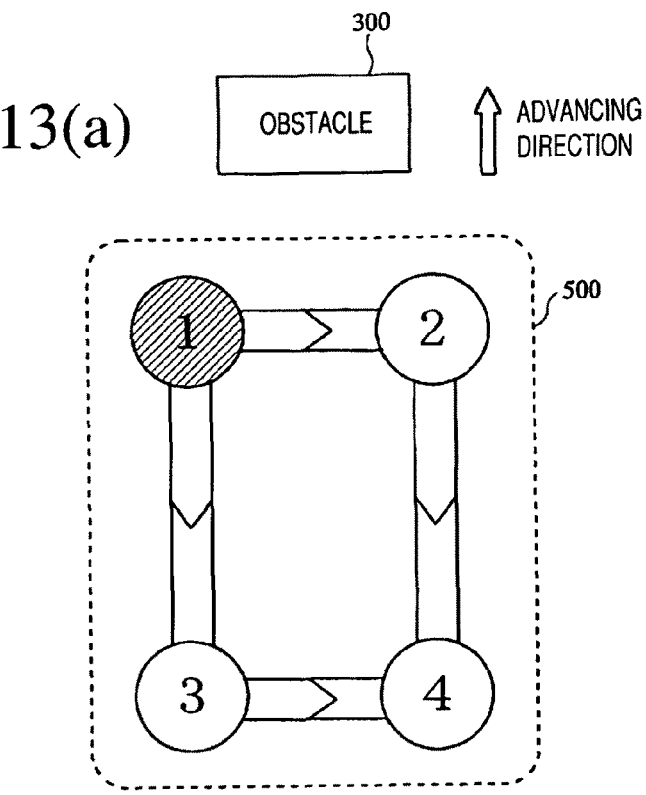
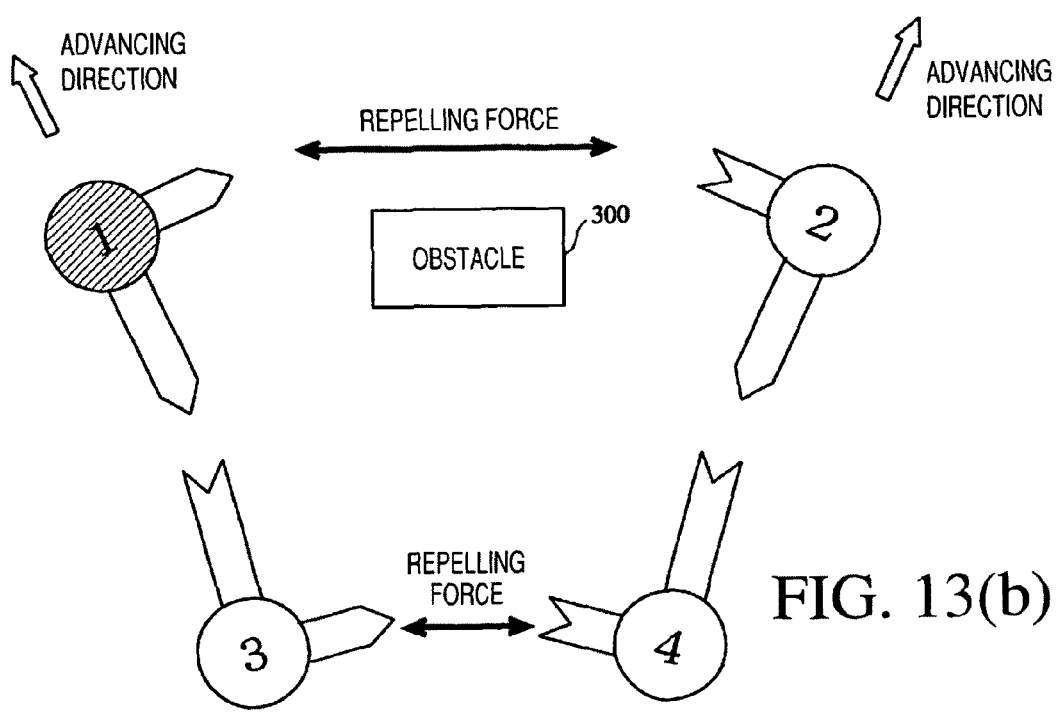
FIG. 13(b)

FIG. 21(a)
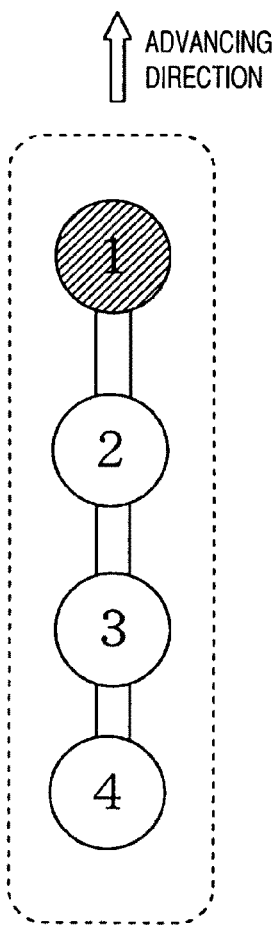
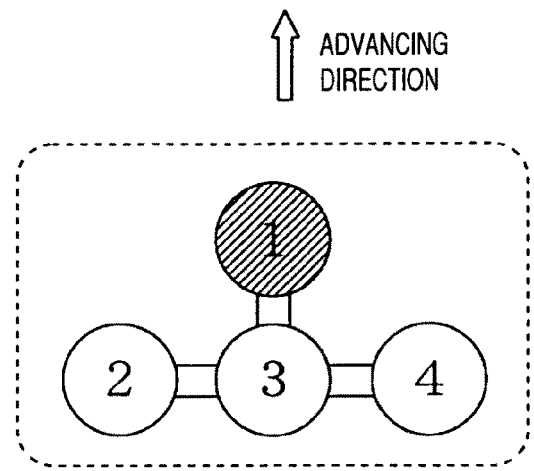
FIG. 21(b)
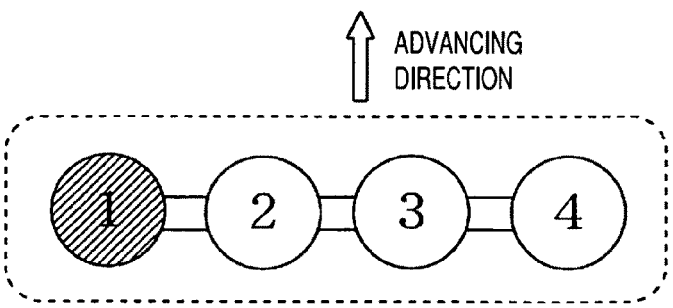
FIG. 21(c)

| | REMAINING AMOUNT | | | | | |
|---|---|---|---|---|---|---|
| | FUEL BATTERY | SMALL BATTERY 1 | SMALL BATTERY 2 | SMALL BATTERY 3 | SMALL BATTERY 4 | CAPACITOR |
| CASE 1 | SUFFICIENT DRIVING | SUFFICIENT | SUFFICIENT | SUFFICIENT | SUFFICIENT | EMPTY REGENERATION |
| CASE 2 | SUFFICIENT DRIVING | EMPTY CHARGING | EMPTY CHARGING | EMPTY CHARGING | EMPTY CHARGING | EMPTY REGENERATION |
| CASE 3 | INSUFFICIENT | SUFFICIENT | SUFFICIENT | SUFFICIENT | SUFFICIENT DRIVING | EMPTY REGENERATION |
| CASE 4 | INSUFFICIENT | SUFFICIENT | SUFFICIENT | SUFFICIENT DRIVING | EMPTY | EMPTY REGENERATION |
| CASE 5 | INSUFFICIENT | SUFFICIENT | SUFFICIENT DRIVING | EMPTY | EMPTY | EMPTY REGENERATION |

FIG. 38

| | | | | | |
|---|---|---|---|---|---|
| | FUEL BATTERY | SMALL BATTERY 1 | SMALL BATTERY 2 | SMALL BATTERY 3 | SMALL BATTERY 4 |
| CASE 1 | SUFFICIENT DRIVING | SUFFICIENT | SUFFICIENT | SUFFICIENT | EMPTY REGENERATION |
| CASE 2 | SUFFICIENT | SUFFICIENT | SUFFICIENT | SUFFICIENT | SUFFICIENT DRIVING·REGENERATION |
| CASE 3 | INSUFFICIENT | SUFFICIENT | SUFFICIENT | SUFFICIENT DRIVING·REGENERATION | EMPTY |
| CASE 4 | INSUFFICIENT | SUFFICIENT | SUFFICIENT DRIVING·REGENERATION | EMPTY | EMPTY |

FIG. 39

VEHICLE

TECHNICAL FIELD

The present invention relates to a vehicle, and to integration with and division from another vehicle, and moving during integration.

BACKGROUND ART

In a conventional vehicle such as an automobile, its size cannot be changed regardless of the number of occupants. Therefore, even when a vehicle moves together with only one occupant, the vehicle must move accompanying an empty seat and a space unneeded, so that it includes much wasteful weight and space and an efficiency of fuel consumption relative to the number of occupants deteriorates.

Further, a driver's seat is fixed, and a driver and an occupant must once get out of a vehicle to change seats with each other at such a time as change of driving. Furthermore, since a size of the vehicle is fixed, a place where the vehicle can move is limited.

On the other hand, regarding vehicle moving, there is a proposal about a vehicle conducting auto cruising while following a preceding vehicle.

For example, in Patent Literature 1, a vehicle provided with an inter-vehicular distance control type constant speed moving apparatus for performing constant speed moving while following a preceding vehicle with keeping a preset following inter-vehicular distance setting value has been proposed.

Further, in Patent Literature 2, a vehicle provided with a an inter-vehicular distance control type constant speed moving apparatus for recognizing a preceding vehicle by a laser radar and a CCD camera to control a moving speed of an own vehicle such that an inter-vehicle time between a preceding vehicle (=an inter-vehicular distance/a moving speed) falls in about two seconds has been proposed.

However, each of the vehicles realizing the auto cruises is provided with an apparatus for moving while a following vehicle is following a preceding vehicle, where, since each vehicle is not configured such that it receives moving information about the preceding vehicle from the preceding vehicle to move, it cannot move integrally with another vehicle while being linked therewith.

Furthermore, each vehicle moves following a preceding vehicle and it cannot move while being lateral to another vehicle.

Patent Literature 1: JP-A-10-67254
Patent Literature 2: JP-A-07-65297

DISCLOSURE OF THE INVENTION

Problem to be solved by the Invention

The invention of the present application is to provide a vehicle which can conduct independent moving with an own vehicle independently and can move integrally in a linkage manner with another vehicle.

Means for solving the Problem (a) In the invention the abovementioned object is achieved by providing a vehicle which conducts linkage moving where a following vehicle moves using moving information of a leading vehicle while maintaining a connected formation and independent moving where an own vehicle moves independently, having running operation means for conducting running operation, moving information transmitting means for transmitting, to the following vehicle, moving information based upon a moving demand according to the running operation in case of the linkage moving, and driving means for driving the own vehicle based upon the moving demand according to the running operation.

(b) Alternatively, the invention achieves the abovementioned object by providing a vehicle which conducts linkage moving where a following vehicle moves using moving information of a leading vehicle while maintaining a connected state and independent moving where an own vehicle moves independently, having running operation means for conducting running operation, moving information receiving means for receiving moving information transmitted from the leading vehicle, and driving means for driving the own vehicle based upon the received moving information in case of linkage moving and driving the own vehicle based upon a moving demand according to the running operation in case of independent moving.

(c) According to the invention, the abovementioned object may also be achieved by providing a vehicle, having moving selecting means for selecting either one of leading moving serving as a leading vehicle in linkage moving where an own vehicle moves integrally in a linkage manner with another vehicle and following moving serving as a following vehicle in the linkage moving, running operation means for conducting running operation, moving information transmitting and receiving means for transmitting moving information based upon a moving demand according to the running operation to the following vehicle in case of the leading moving and receiving moving information transmitted from the leading vehicle in the case of following moving, and driving means for driving the own vehicle based upon a moving demand according to the running operation in case of the leading moving and driving the own vehicle based upon the received moving information in the following moving.

(d) The vehicle may have moving formation determining means for determining a moving formation and a arrangement relationship between a leading vehicle and a following vehicle in the linkage moving, and moving information preparing means for preparing moving information for each following vehicle based upon a moving demand according to the running operation and the determined arrangement relationship with each following vehicle in case of the leading moving, wherein the moving information transmitting and receiving means transmits moving information prepared by the moving information preparing means to each following vehicle.

(e) Alternatively, the vehicle may have moving formation determining means for determining a moving formation and a arrangement relationship between a leading vehicle and a following vehicle in the linkage moving, moving formation transmitting and receiving means for transmitting the determined moving formation and arrangement relationship to each following vehicle in case of the leading moving and receiving a moving formation and a arrangement relationship transmitted from the leading vehicle in case of the following moving, and moving detecting means for detecting a vehicle speed and a moving direction of the own vehicle, wherein the moving information transmitting and receiving means transmits the detected vehicle speed and moving direction of the own vehicle to the following vehicle as moving information in the leading moving and the driving means controls driving of the own vehicle based upon a moving formation and a arrangement relationship of the own vehicle, and a vehicle speed and a moving direction of the leading vehicle in case of the following moving.

(f) According to the invention, the vehicle may also have moving procedure storing means where a moving procedure where each vehicle moves at a changing time from a specific moving formation to another moving formation is stored and moving formation changing means for performing determination about necessity of change from a moving formation in current moving to another moving formation to determine a moving formation after changed, wherein the moving formation transmitting and receiving means sequentially transmits arrangement relationships after changed to the respective following vehicles according to the moving procedure for performing change from a current moving formation to the determined moving formation after changed in case of the leading moving and the driving means drives the own vehicle such that the own vehicle moves to satisfy the arrangement relationship after changed received from the leading vehicle in case of the following moving.

(g) According to the invention, the vehicle may also have road width information acquiring means for acquiring road width information wherein the moving formation changing means makes determination about necessity of moving formation change and a moving formation after changed based upon at least one of a vehicle speed of the own vehicle and the acquired road width information.

(h) According to the present invention, the vehicle may also have one or plural driving wheels which are driven by the driving means and are disposed on one shaft, a boarding portion disposed above the driving wheels, an attitude sensing sensor sensing an attitude of the boarding portion, and attitude control means for performing attitude control of the boarding portion so as to hold balance in a longitudinal direction regarding a driving direction of the driving wheels.

Effect of the Invention

According to the present invention, since the own vehicle can conduct independent moving with the own vehicle independently and can move integrally in a linkage manner with another vehicle, movement with minimal weight or space is made possible so that a fuel consumption efficiency to the number of occupants can be improved.

Further, since moving can be conducted in a linkage manner utilizing communication, any vehicle can be steered regardless of its position.

Furthermore, since the linkage utilizes communication, sizes of all vehicles moving integrally in a linkage manner can be changed arbitrarily, so that a moving range can be expanded.

BRIEF DESCRIPTION OF THE DRAWINGS

FIG. 5 is an explanatory diagram conceptually representing one example of an arrangement changing procedure when a moving pattern stored in the storage section is changed;

FIG. 13 is a diagram for explaining an avoiding method when an obstacle is in front of integrated vehicles;

FIG. 21 is a diagram showing a modified example of a formation of integrated vehicles;

FIG. 38 is a table of respective cases of usage state of power sources when a capacitor is used together with a fuel battery; and FIG. 39 is a table of respective cases of usage state of power sources when a fuel battery is used without using a capacitor.

BEST MODES FOR CARRYING OUT THE INVENTION

A preferred first embodiment of a vehicle of the present invention will be explained in detail with reference to FIG. 1 to FIG. 11.

(1-1) Brief Overview of First Embodiment

A vehicle of the present embodiment is configured such that a plurality of single-seat vehicles which can move independently are combined and they run integrally while maintaining a predetermined moving formation through linkage among the respective vehicles.

The number of connected vehicles is increased or decreased to accommodate the number of vehicle occupants, which results in movement with an optimal size. A driver is one host vehicle (leading vehicle) even in a connected state of many occupants and the remaining vehicles are controlled in a coordinated manner as following vehicles based upon moving information transmitted from the host vehicle taking charge of steering.

Change of a driver in a connected state can be conducted freely due to change of a moving formation or change of a moving position without performing movement between seats. The change of the moving formation or the change of a moving position is determined by the host vehicle according to a demand from each vehicle and an arrangement relationship after changed is transmitted from the host vehicle to each following vehicle (demand change).

Further, each vehicle changes a moving formation of vehicles based upon a width of a road on which the vehicle is to move from now, acquired by a speed sensor and road width acquiring means (for example, based upon road data having road width data and a current position detected by current position detecting means).

Furthermore, any arrangement is allowed in a state connected in a software manner, for example, expansion and contraction of a vehicle body size such as reduction of a distance between vehicles in a narrow road can be conducted freely.

A arrangement relationship in moving formation when a plurality of vehicles moves in a linkage manner in this manner, for example, various patterns about how many vehicles move, which formation (a tandem, a single horizontal row, two rows in matrix, or the like) is adopted, and where a host vehicle is positioned is determined and stored.

Further, when change is performed from a current moving formation to another moving formation or when an arrangement relationship among respective vehicles is changed while maintaining the same moving formation, a procedure for movement of each vehicle is determined in advance.

Figure 1:
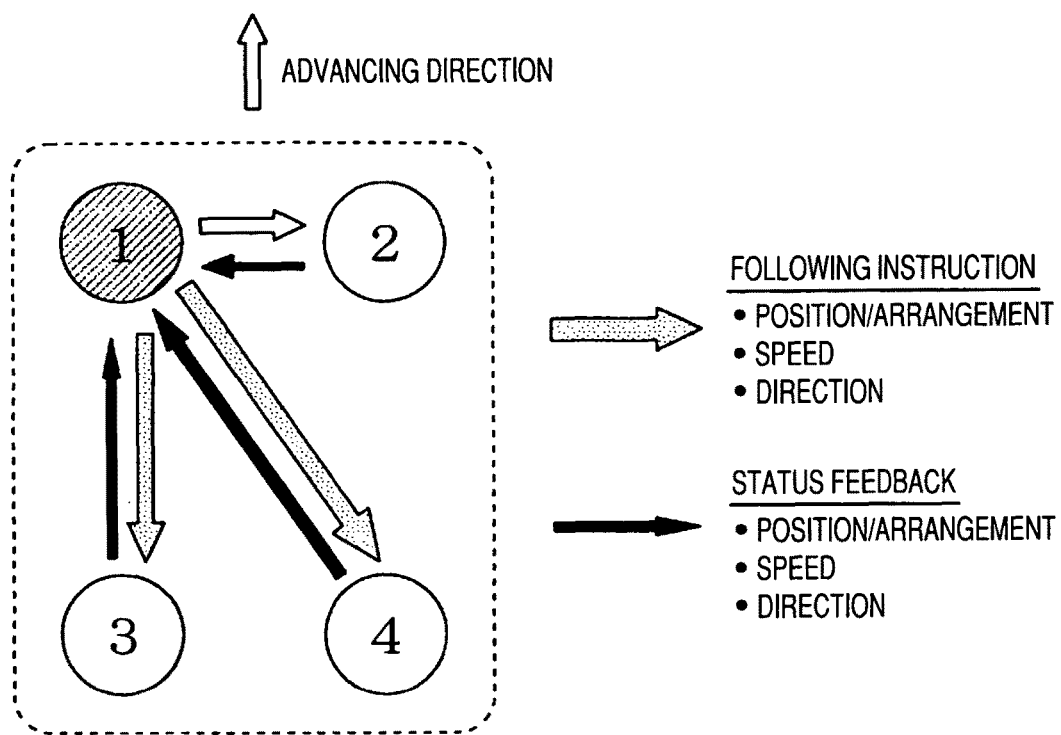
FIG. 1 is an explanatory diagram illustrating a relationship between a host vehicle and following vehicles when four vehicles according to the present invention move in a linkage manner.

FIG. 1 is a diagram illustrating a relationship between a host vehicle and following vehicles when four vehicles move in a linkage manner.

In the example shown in FIG. 1, a vehicle No. 1 attached with a vehicle lane of vehicles 1 to 4 of four vehicles is a host vehicle and an occupant in the host vehicle is a driver for the linkage moving.

Incidentally, the host vehicle is limited to one, but any vehicle of the vehicles 1 to 4 may be the host vehicle and an arrangement formation (a moving formation) may be arbitrarily selected from predetermined moving formations and a range of shapes similar thereto.

Selection about whether each vehicle is a host vehicle or a following vehicle is performed by an input section 171 before start of linkage moving.

A relationship between a host vehicle and following vehicles once determined continues unchanged until the linkage moving terminates or an instruction for change of a host vehicle is issued.

The host vehicle 1 conducts driving required for speed/direction according to running operation performed by an occupant. Simultaneously therewith, the host vehicle 1 instructs the following vehicles 2 to 4 to synchronize (follow) the host vehicle. That is, the host vehicle 1 transmits a speed, a direction, and a relative position to an own vehicle (host vehicle 1) to the following vehicles 2 to 4 as moving information (a follow-up instruction) in order to cause the following vehicles to synchronize the own vehicle (maintain the linkage relationship).

On the other hand, the following vehicles 2 to 4 move base upon the follow-up instruction and feed status information having a speed and a direction of the own vehicle, and an own vehicle position as own vehicle information back to the host vehicle 1.

The host vehicle 1 prepares moving information to transmit the same to the following vehicles 2 to 4 according to each status information fed back, and current moving status and running operation of the own vehicle.

Thus, the respective vehicles move while repeating the follow-up instruction from the host vehicle and feedback of status information from the following vehicles so that the linkage moving can be maintained.

A plurality of vehicles of the present embodiment moves in a linkage manner in this manner, so that moving is possible with an optimal vehicle body size corresponding to the number of occupants including one to many occupants.

Furthermore, any occupant (any vehicle) steers as the host vehicle at any place in a linkage moving state. Moreover, driver change can be made possible without changing seats or changing a moving position by changing charge of the host vehicle to another vehicle.

Since flexibility regarding change of a vehicle size or a moving formation in a linkage state is high, for example, vehicles can move through a narrow alley in a line in a tandem, which results in expansion of places where the vehicles can move.

(1-2) Details of First Embodiment

Figure 2:
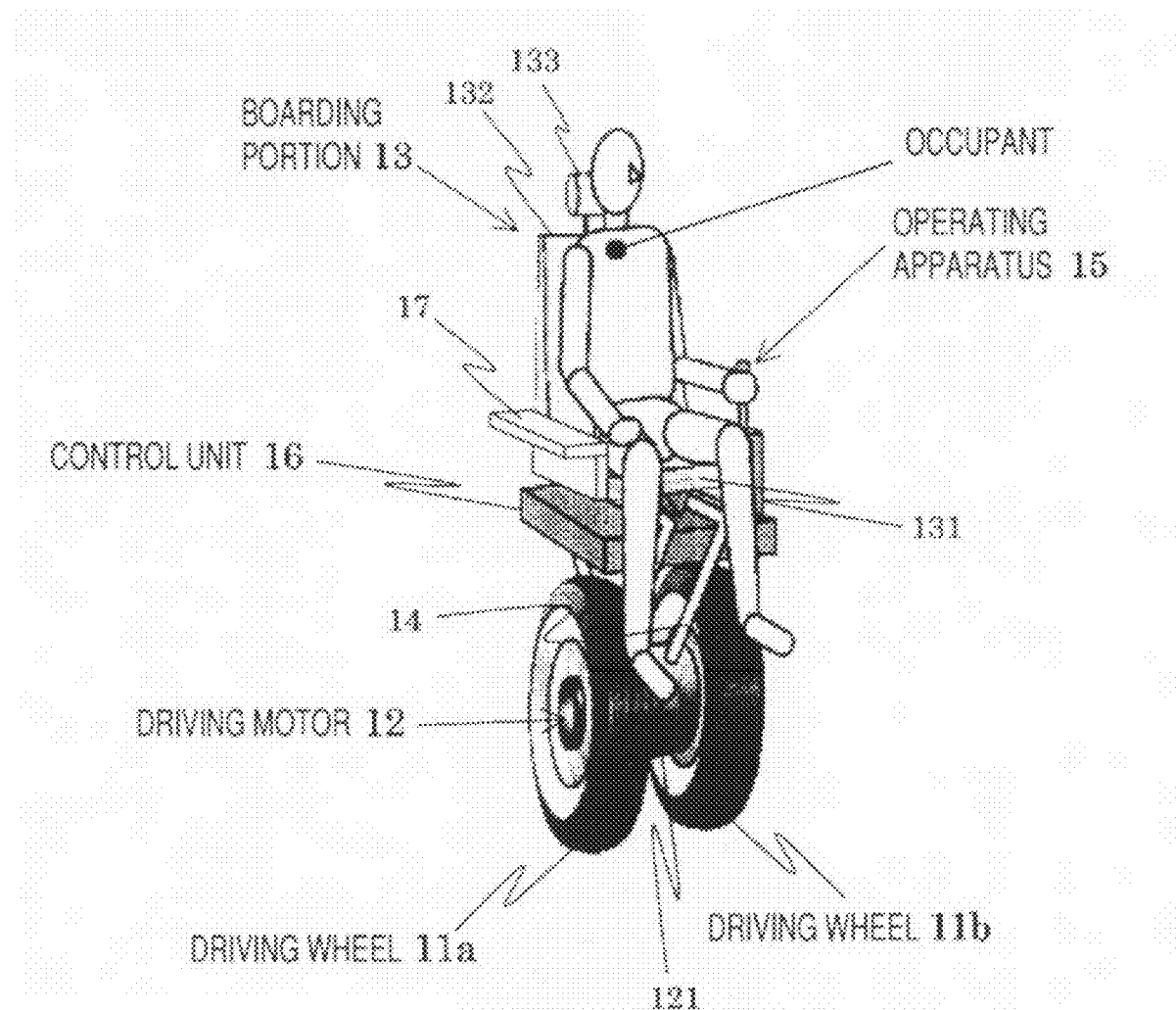
FIG. 2 is an appearance configuration diagram of an inverted-pendulum vehicle which is one embodiment in the vehicle according to the present invention.

FIG. 2 is a diagram illustrating an appearance configuration of a vehicle according to the present embodiment.

The vehicle according to the present embodiment comprises an inverted-pendulum vehicle and it moves while sensing an attitude of a boarding portion to perform attitude control so as to maintain balance in a longitudinal direction of the vehicle according to the attitude regarding a driving direction of driving wheels.

As a method of attitude control in the present embodiment, for example, respective control methods disclosed in U.S. Pat. No. 6,302,230, JP-A-63-35082, JP-A-2004-129435, and JP-A-2004-276727 can be used.

As shown in FIG. 2, the inverted-pendulum vehicle is provided with two driving wheels 11a, 11b arranged coaxially.

Both the driving wheels 11a, 11b are to be driven by a drive motor (wheel motor) 12, respectively.

A boarding portion 13 on which a driver boards is disposed above the driving wheels 11a, 11b (both the driving wheels 11a and 11b are hereinafter called "driving wheel 11") and the drive motor 12.

The boarding portion 13 comprises a seat face portion 131 on which a driver sits, a seatback portion 132, and a headrest 133.

The boarding portion 13 is supported by a supporting member 14 fixed to a wheel motor casing 121 in which the drive motor 12 is accommodated.

A steering apparatus 15 is disposed on the left side of the boarding portion 13. The steering apparatus 15 is for issuing such an instruction as acceleration, deceleration, turning, rotation, stopping and braking of the inverted-pendulum vehicle by operation of a driver.

In the steering apparatus 15 in the present embodiment is fixed on the seat face portion 131, but it may be configured using a remote controller connected in a wired manner or in a wireless manner. Such a configuration may be adopted that an armrest is provided and the operating apparatus is disposed on the armrest.

Incidentally, in the present embodiment, control such as acceleration or deceleration is performed by an operation signal outputted according to operation on the steering apparatus 15, but, for example, as shown in Patent Literature 1 that a driver changes a forward inclination moment to a vehicle or an inclination angle in the longitudinal direction of the vehicle, thereby performing switching so as to conduct attitude control and moving control of the vehicle according to the inclination angle. Incidentally, when attitude control and moving control based upon the inclination moment imparted by the driver are performed, the attitude control according to the present embodiment is not conducted.

A display/operation section 17 is disposed on the right side of the boarding portion. The display/operation section 17 is provided with a display section 172 having a liquid crystal display device (not shown), and an input section 171 having a touch panel and exclusive function keys disposed on a surface of the display section 172.

Incidentally, the display/operation section 17 may comprise a remote controller similar to or identical to the steering apparatus 15. The display/operation section 17 and the steering apparatus 15 can be reversed regarding their arrangement, or the both may be disposed on the same side.

A control unit 16 is disposed between the boarding portion 13 and the driving wheel 11.

In the first embodiment, the control unit 16 is attached to a lower face of the seat face portion 131 of the boarding portion 13, but it may be attached to the supporting member 14.

Figure 3:
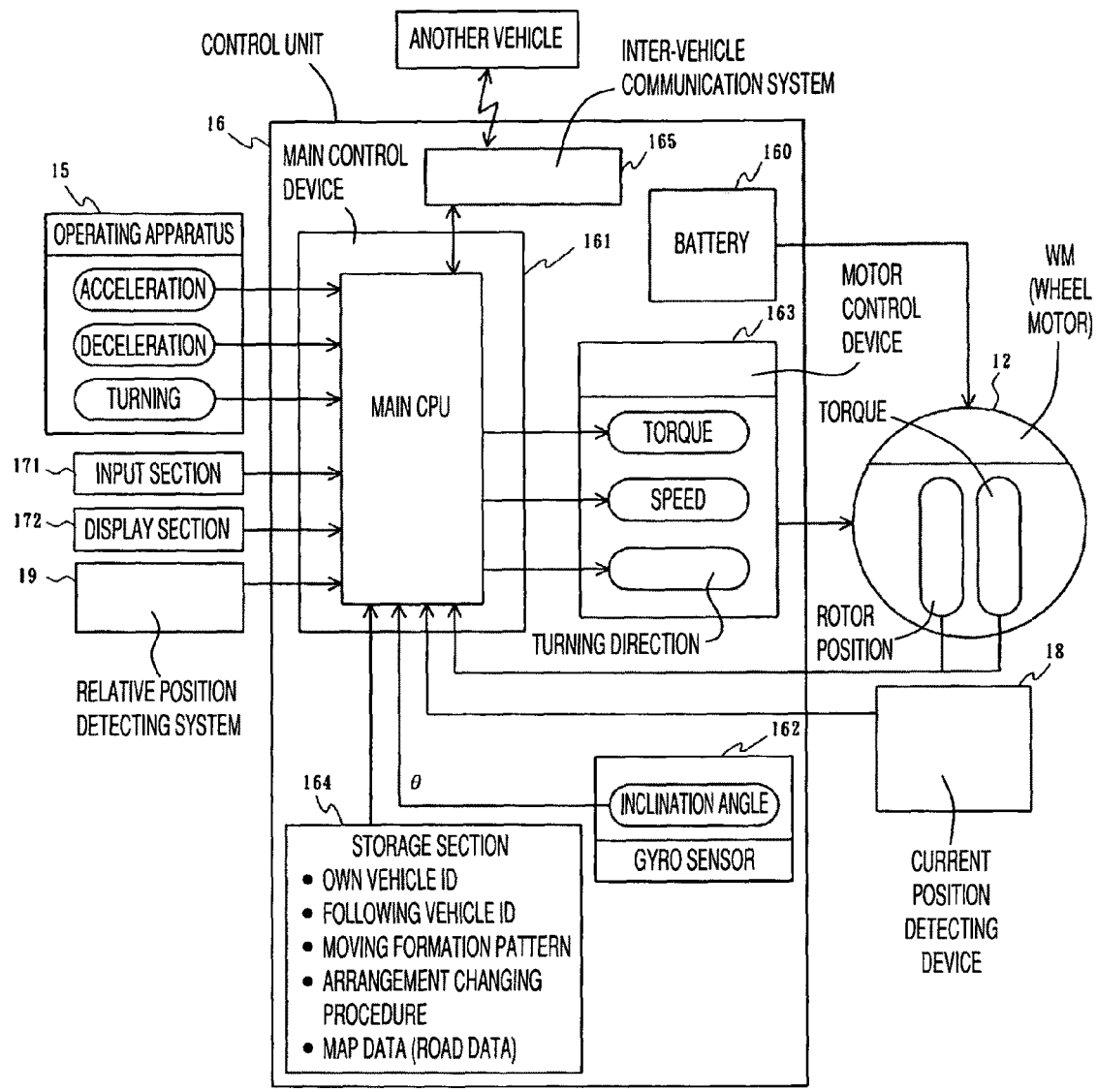
FIG. 3 is a configuration diagram of a control unit of the inverted-pendulum vehicle.

FIG. 3 is a diagram representing a configuration of the control unit 16 of the inverted-pendulum vehicle.

The control unit 16 is provided with a battery 160, a main control device 161, a gyro sensor 162, a motor control device 163, a storage section 164, and an inter-vehicle communication system 165.

The battery 160 supplies power to the drive motor 12. Further, the battery 160 also supplies power source of a low voltage for control to the main control device 161.

The main control device 161 is provided with a main CPU, and it comprises a computer system provided with a ROM storing various programs and data, a RAM used as a working area, an external storage device, an interface section, and the like (not shown).

Various programs such as an attitude control program holding an attitude of an inverted-pendulum vehicle, a moving control program controlling moving based upon various instruction signals from the steering apparatus 15, and a program for performing various linkage moving processings for conducting linkage moving in cooperation with other vehicles in the first embodiment are stored in the ROM (or the storage section 164), and the main control device 161 performs the various programs to conduct corresponding processings.

Examples of the program for performing linkage moving processing are as follows:

A program for making determination of a leading vehicle and following vehicles, determination of a moving formation, and a arrangement relationship among respective vehicles at a time of a linkage moving.

A linkage moving processing program for controlling drives of vehicles as the leading vehicle or the following vehicles.

The gyro sensor 162 functions as an attitude sensing sensor for sensing an attitude of the boarding portion 13.

The gyro sensor 162 detects an angular acceleration and an inclination angle θ of the boarding portion 13 as physical quantity based upon inclination of the boarding portion 13.

The main control device 161 recognizes an inclination direction from the inclination angle detected by the gyro sensor 162.

Incidentally, the gyro sensor 162 in the first embodiment detects the angular acceleration and the inclination angle to supply them to the main control device 161, but it can detect only the angular acceleration.

In this case, the main control device 161 accumulates angular velocities supplied from the gyro sensor 162 to calculate an angular acceleration and an angle, thereby acquiring an inclination angle.

Further, various sensors outputting a signal corresponding to an angular acceleration when the boarding portion 13 inclines such as a liquid rotor type angular accelerometer or an eddy current type angular accelerometer may be used as the attitude sensing sensor besides the gyro sensor 162.

Instead of a pendulum in a servo type accelerometer, the liquid rotor type angular accelerometer detects motion of liquid to measure an angular acceleration from a feedback current when motion of the liquid is balanced by a servo mechanism. On the other hand, the angular accelerometer utilizing an eddy current is formed by configuring a magnetic circuit using a permanent magnet and disposing a cylindrical rotor made of aluminum in the circuit, and it detects an angular acceleration based upon magnetic electromotive force generated according to change of a rotating speed of the rotor.

The motor control device 163 controls the drive motor 12.

That is, the motor control device 163 controls the drive motor 12 according to respective instruction signals of a drive torque, a speed, and a rotation direction supplied from the main control device 161.

The main control device 161 supplies respective instruction signals of a drive torque, a speed, and a rotation direction to a destination control device 163 based upon a moving demand from the steering apparatus 15 when the own vehicle moves as a host vehicle and based upon moving information received from the host vehicle when the own vehicle moves as a following vehicle.

The motor control device 163 is provided with a torque-current map for the drive motor 12.

The motor control device 163 conducts control so as to output a current corresponding to drive torque supplied from the main control device 161 to the drive motor 12 according to the torque-current map.

Incidentally, the drive torque supplied from the main control device 161 is a torque instruction value T3 for attitude control when the vehicle is stopping and a value obtained by adding/subtracting the torque instruction value T3 to/from a torque instruction value according to a drive demand of a driver while the vehicle is moving.

Various data items such as an identification number of an own vehicle (own vehicle ID), an identification number of a following vehicle (following vehicle ID), moving formation patterns and arrangement-changing conditions, an arrangement-changing procedure, and map data (road data) are stored in the storage section 164 as various information items required for linkage moving.

Nickname (handle name) of each vehicle can be registered as being related to an own vehicle ID (following vehicle ID). The handle name together with the following vehicle ID is transmitted to the host vehicle. In the host vehicle, for example, when an occupant thereof makes determination about where respective following vehicles should be arranged in the determined moving formation, he/she displays the determined moving formation and all the handle names received on the display section 172 so that he/she can select the handle names and positions in the moving formation displayed to determine his/her vehicle position easily.

Assuming that the own vehicle is the host vehicle, the following vehicle ID is an ID number of another vehicle which can conduct linkage moving together with the own vehicle, and an ID number registered in advance according to a following vehicle registration operation from the input section 171 is stored as the following vehicle ID.

The main control device 16 transmits moving information to each following vehicle, but the contents of the moving information differ according to a arrangement relationship with the host vehicle in the determined moving formation, so that the main control device transmits the moving information attached with the following vehicle IDs to the following vehicles and each following vehicle adopts only moving information attached with its own ID.

The inter-vehicle communication system 165 conducts transmission/reception of moving information (a follow-up instruction) and status information between the host vehicle and a following vehicle present within a predetermined distance.

The inter-vehicle communication system 165 performs transmission/reception of information through wireless communication utilizing radio wave, infrared ray, or the like.

The inter-vehicle communication system 165 in the first embodiment transmits communication data to respective vehicles present in a plurality of peripheral regions by using broadcast, but it may transmit communication data to the plurality of vehicles utilizing multicast or the like.

The input section 171 is disposed on the display/operation section 17 (see FIG. 2), and it functions as input means for various data or conducting instruction and selection.

The input section 171 comprises a touch panel and exclusive selection buttons disposed on the display section 172. Regarding the touch panel portion, a position pressed (touched) by a passenger is detected corresponding to various selection buttons displayed on the display section 172 so that selection content is acquired from the pressed position and the display content thereof.

The display section 172 is disposed on the display/operation section 17. Buttons to be selected or inputted from the input section 171, explanation, and the like are displayed on the display section 172.

As the selection buttons displayed on the display section 172, various buttons such as, for example, a moving mode selection button, a moving formation selection button, a following vehicle ID selection button (the handle name is displayed), and a moving position (arrangement relationship) selection button are displayed.

Further, a midstream joint button utilized when a vehicle joins a vehicle group moving in a linkage manner in the middle of moving is also displayed. When the midstream joint button is selected, an own vehicle ID and a handle name (when it has been registered) are transmitted from the inter-vehicle communication system 165 as information representing joint application.

On the other hand, when the host vehicle moving in the linkage manner receives the own vehicle ID and the handle name, if the own vehicle is a vehicle registered in the storage section 164 as the following vehicle ID, display indicating that there is a vehicle wishing to join is displayed on the display section 172 and a permission button which permits joint and a rejection button which rejects joint are displayed.

When the joint permission button is selected, a current moving formation and an arrangement relationship (the handle names are displayed) are displayed on the display section 172, and a possible arrangement position of a new joint vehicle is displayed. Regarding the possible arrangement position, another moving formation maintaining a current moving formation is read from the storage section 164 and an empty position is displayed as the possible arrangement position. When a plurality of possible arrangement positions is present, one arrangement position is determined by selection conducted by an occupant in the host vehicle.

A current position detecting device 18 is for detecting a current position (an absolute coordinate value having a latitude and a longitude) of a vehicle, and one or more of a GPS (Global Positioning System) receiving device for measuring a position of a vehicle utilizing an artificial satellite, a geomagnetic sensor which detects geomagnetism to obtain an orientation of a vehicle, a gyro sensor, a vehicle speed sensor and the like are used.

Road width information is acquired by specifying a road on which a vehicle is currently moving from a current position detected by the current position detecting device 18 and map data in the storage section 164 through map matching (road width information acquiring means) and it is used for determination about whether or not change of moving formation is required.

Incidentally, the road width information acquiring means comprises the map information, the current position detecting device 18, and the mapping matching processing, but it may comprise an imaging device for imaging both sides of a vehicle and detecting a road width according to image recognition of an imaged image.

A relative position detecting section 19 is provided with a radar and a gyro, and it detects a relative position to a host vehicle. A distance to the host vehicle is detected by the radar, and a moving amount (direction) is detected by the gyro.

The detected relative position relationship is fed back to the host vehicle as status information together with a vehicle speed detected by the vehicle speed sensor (not shown).

The main control device 161 is supplied with information items corresponding to respective devices and equipment from the drive motor (wheel motor) 12, the steering apparatus 15, and the gyro sensor 162, the current position detecting device 18, the input section 171, and the relative position detecting section 19, so that respective controls of attitude control, moving control, and braking control, and the linkage moving control in the first embodiment are performed according to these information items.

Information indicating a torque and a rotor position is supplied from the drive motor 12, acceleration instruction information, deceleration instruction information, and turning information showing a turning direction are supplied from the steering apparatus 15, an angular velocity of the boarding portion is supplied from the gyro sensor 162, a current position (a latitude, a longitude) of a vehicle is supplied from the current position detecting device 18, selection information of an occupant to respective buttons displayed on the display section 172 is supplied from the input section 171, and a relative position relationship to a host vehicle is supplied from the relative position detecting section 19.

Figures 4, 5A, 5B, 5C, 5D:
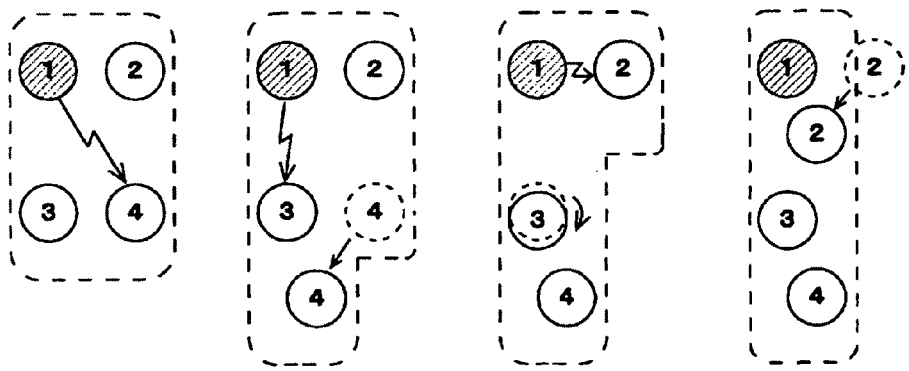
FIG. 4 is an explanatory diagram conceptually representing moving formation patterns stored in a storage section and change states when a moving formation is changed.

FIG. 4 conceptually shows moving formation patterns and change conditions when a moving formation is changed, which are stored in the storage section 164.

As shown in FIG. 4, as the moving formation patterns, two lines in each of row and column constitute a basic moving formation when four vehicles move.

A staggered moving formation of one line in tandem utilized when vehicles move on a narrow road or air resistance at a high speed moving is reduced, and a wide moving formation utilized when a road width is relative wide or braking force is obtained by increasing air resistance are defined in advance.

Though not illustrated in FIG. 4, selectable moving formations according to the number of vehicles moving in a linkage manner such as, two vehicles, three, vehicles, five vehicle, six vehicles, . . . are determined in advance.

Incidentally, in case of the wide moving formation, each vehicle is displayed so as to contact with a vehicle adjacent thereto in FIG. 4, but a distance equal to or more than a predetermined minimal distance (which can be set to 50 cm, 1 m, or the like, for example) is actually maintained between adjacent vehicles.

In respective moving formations (in case of four vehicles) in FIG. 4, a vehicle 1 of the vehicle 1 to a vehicle 4 which is shaded is a host vehicle.

The host vehicle is determined by such a procedure that an occupant of a vehicle designated as the host vehicle first determines a moving formation and he/she selects an arbitrary position of respective positions in the determined moving formation as an own vehicle position (position of the host vehicle=driving position).

Criteria shown in FIG. 4 represent criteria for formation change when a moving formation is changed.

As the criteria for formation change, there are an automatic change mode for performing change based upon a speed and a braking state, and a manual change mode for performing change manually. A default mode is the automatic change mode, but the default mode can be changed to the manual change mode.

The default mode can be set for each vehicle, but the default mode set to the host vehicle when a linkage moving is conducted becomes effective. Further, a vehicle which can conduct mode change when the linkage moving is performed is the host vehicle, and the mode change is performed by operation from the input section 171 of the host vehicle.

Incidentally, in the manual moving mode, unless mode change is conducted, a moving formation is not changed automatically, but a moving formation can be changed by selection from the host vehicle in case of the automatic moving mode.

As the criteria for formation change for changing a formation in the automatic changing mode, vehicle speed and presence/absence of braking are defined and are determined by the main control device 161 in the host vehicle in the first embodiment.

In the case shown in FIG. 4 where four vehicles move in a linkage manner, for example, when a vehicle speed (a vehicle speed detected in the host vehicle) is less than a predetermined reference vehicle speed (for example, 100 km/h in the first embodiment) and braking is absent, a basic moving formation is selected.

When the vehicle speed is equal to or more than the basic vehicle speed and braking is not conducted, a slender moving formation is selected in order to reduce air resistance due to moving, thereby improving fuel consumption.

On the other hand, when braking demand equal to or more than a predetermined value is issued regardless of a vehicle speed, a wide formation is selected.

In this case, the number of vehicles laterally-aligned is determined according to the required braking force. That is, when the braking force is less than a first braking force, a formation of front one vehicle and rear three vehicles is adopted, and when the braking force is equal to or more than the first braking force, a formation of four vehicles laterally-aligned is adopted.

Incidentally, explanation about the criteria for change of moving formation and the moving formation after changed has been made according to the example shown in FIG. 4, but such a configuration can be adopted in practice that more moving formations are defined and a moving formation is changed according to a further detailed criteria.

For example, as the slender formation, a moving formation including such a staggered arrangement as shown in FIG. 4, whose lateral width (vehicle width=width between a line connecting the vehicles 1 and 3 and a line connecting the vehicles 2 and 4) is slightly wider than that shown in FIG. 4, is defined in addition to the one straight line formation where respective vehicles are arranged on one line.

Such a configuration can be adopted that, according to a vehicle speed, the one straight line formation is performed when the vehicle speed is equal to or more than a first reference vehicle speed (for example, 100 km/h), the slender formation shown in FIG. 4 is performed when the vehicle speed is less than the first reference vehicle speed and equal to or more than a second reference vehicle speed (for example, 90 km/h), and a wider moving formation (which is different from that shown in FIG. 4, for example, a width corresponding to overlapping of vehicles of the vehicles 1, 3 and vehicles of the vehicles 2, 4 with each other in a advancing direction of the vehicles becomes narrow) is performed when the vehicle speed is less than the second reference vehicle speed and equal to or more than a third reference vehicle speed (for example, 80 km/h).

The determination of the formation change criteria explained above is performed by the host vehicle, and the host vehicle transmits an instruction for moving to the following vehicles while selecting a moving formation coinciding with the formation change criterion.

When the moving formation is changed according to a vehicle speed or a braking state, a procedure for performing change from each moving formation to another moving formation is defined according to an arrangement changing procedure in the storage section 164.

The main control device 161 in the host vehicle transmits moving information (an arrangement position changing instruction) to respective following vehicles according to the arrangement changing procedure so as to sequentially change their arrangement positions.

FIG. 5 conceptually represents one example of an arrangement changing procedure performed when the moving pattern stored in the storage section 164 is changed.

In FIG. 5, a procedure performed when changing is automatically or manually performed from the basic moving formation shown in FIG. 4 to a slender moving formation is represented conceptually.

When it is determined at the host vehicle 1 that change to a slender moving formation is required in a basic moving formation shown in FIG. 5A, a arrangement relationship, a vehicle speed, a direction after changed, and the like together with information designating a moving formation after changed are transmitted from the host vehicle 1 to the following vehicle 4.

The following vehicle 4 moves from a position represented with a dotted line to a leftward and backward position represented with a solid line according to the received moving information, as shown in FIG. 5B. When completing the movement (position change), the following vehicle 4 detects status information after changed to feed the same back to the host vehicle 1.

Incidentally, when the following vehicle 4 receives an instruction for change of a moving formation (transmission of a moving formation after changed), it performs change of its position before it changes the moving position to the instructed position and after it notifies an occupant in the following vehicle about the change of the moving position.

The notification of the moving position change is performed by utilizing one or both of performing display for notification of the change on the display section 172 and performing notification of the change utilizing sound output from a speaker.

When the status information after changed is fed back from the following vehicle 4 which has outputted the instruction for position change, the following vehicle 4 transmits moving information indicating a arrangement relationship after moving together with information designating a moving formation after changed to the following vehicle 3 defined as a vehicle whose position should be changed next.

The following vehicle 3 slightly goes back from a position indicated by a dotted line to a position indicated by a solid line (goes back as a position relative to the following vehicle 1) according to the received moving information, as shown in FIG. 5C, and it feeds the status information back to the host vehicle 1.

In the following processing, like the above, the main control device 161 in the host vehicle 1 transmits the moving formation after changed and the moving information to the following vehicle 2 and it receives status information after changed responding to the transmission from the following vehicle 2, thereby terminating the change of the moving formation.

Thus, the procedure for performing change from each moving formation to another moving formation is determined in advance and transmission/reception of information and position changes between the host vehicle and the respective following vehicles and are sequentially performed according to the procedure.

Incidentally, when change is performed from the slender moving formation shown in FIG. 5D to the basic moving formation shown in FIG. 5A, definition is made such that the change is performed according to a procedure reversed to that explained in FIG. 5.

The linkage control based upon the inverted-pendulum vehicles configured as described above will be explained according to respective flowcharts shown in FIG. 6 to FIG. 11.

Figure 6:
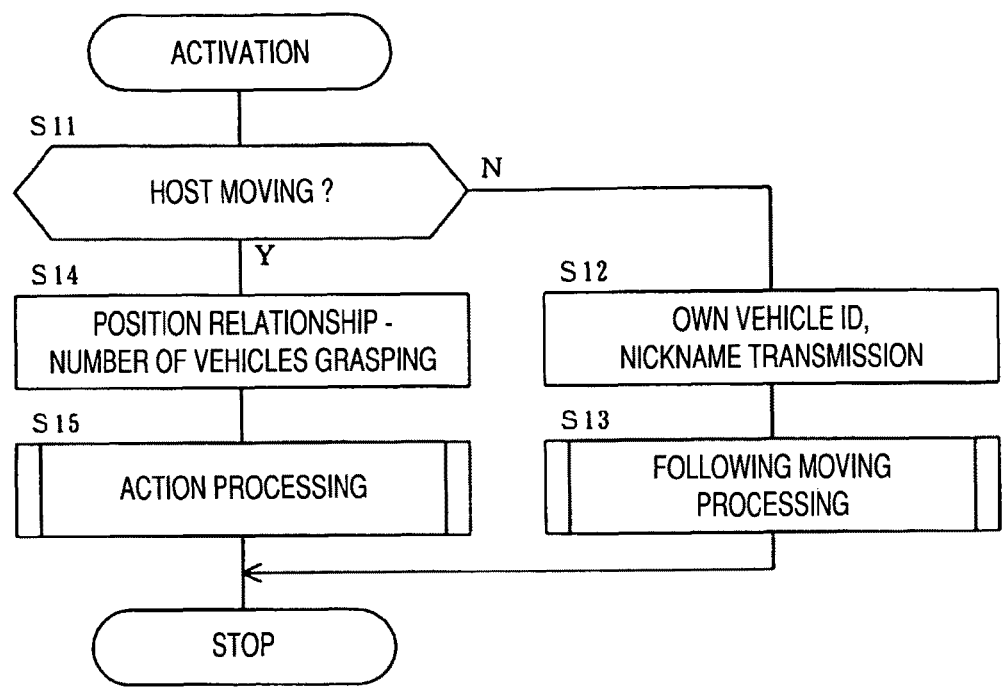
FIG. 6 is a flowchart representing a linkage moving processing.

FIG. 6 is a flowchart representing a linkage moving processing.

First, when vehicles conduct a linkage moving, an occupant in each vehicle performs selection about whether a vehicle on which he/she rides conducts host moving as a host vehicle or it conducts following moving as a following vehicle according to his/her operation to the input section 172.

Thereafter, the main control device 161 in each vehicle makes determination about whether the host moving is selected or the following moving is selected (step 11).

When the following moving is selected (step 11; No), the main control device 171 in the vehicle reads an own vehicle ID and an own vehicle nickname (handle name) stored in the storage section 164 to transmit them to the host vehicle (step 12), and it continues to move in a linkage manner with the host vehicle based upon moving information or the like transmitted from the host vehicle according to a following moving processing described later (step 13).

On the other hand, when the host moving is selected (step 11; Yes), the main control device 161 in the vehicle stores the own vehicle ID and the handle name transmitted from each following vehicle in the storage section 164 as the following vehicle ID to grasp the total number of vehicles including the own vehicle (the number of following vehicles+1) and grasp a arrangement relationship among the respective vehicles (step 14).

Each following vehicle ID is attached to moving information to be transmitted so that each following vehicle can make discrimination about whether the moving information is moving information to the own vehicle or it is moving information to another vehicle.

Grasping of the arrangement relationship among respective vehicles is conducted in the following manner.

That is, the main control device 161 displays moving formations (arrangement diagram of respective vehicles such as shown in FIG. 4) which can be taken by the total number of vehicles grasped on the display section 172 to prompt an occupant (an occupant in the host vehicle) to select one from the moving formations.

When the occupant selects either of the moving formations, the handle names of the respective following vehicles together with the arrangement diagram of the moving formation is displayed on a screen in a listing manner so that determination of a arrangement relationship between the own vehicle and the respective following vehicles is prompted. After the occupant first selects the handle name, he/she selects the arrangement position (moving position), so that the arrangement relationship among all the vehicles is determined to be stored in the RAM in the main control device 161.

When the moving formation and the arrangement relationship are determined, the moving formation is first transmitted to each host vehicle and, thereafter, when the moving formation is changed, the moving formation after changed is transmitted.

When grasping of the arrangement relationship and the number of vehicles is completed (step 14), the main control device 161 in the host vehicle performs an operation processing for performing moving control regarding moving of the own vehicle and transmission/reception of moving information regarding moving control of the following vehicles and status information according to input from the steering apparatus 15 (step 15).

Figure 7:
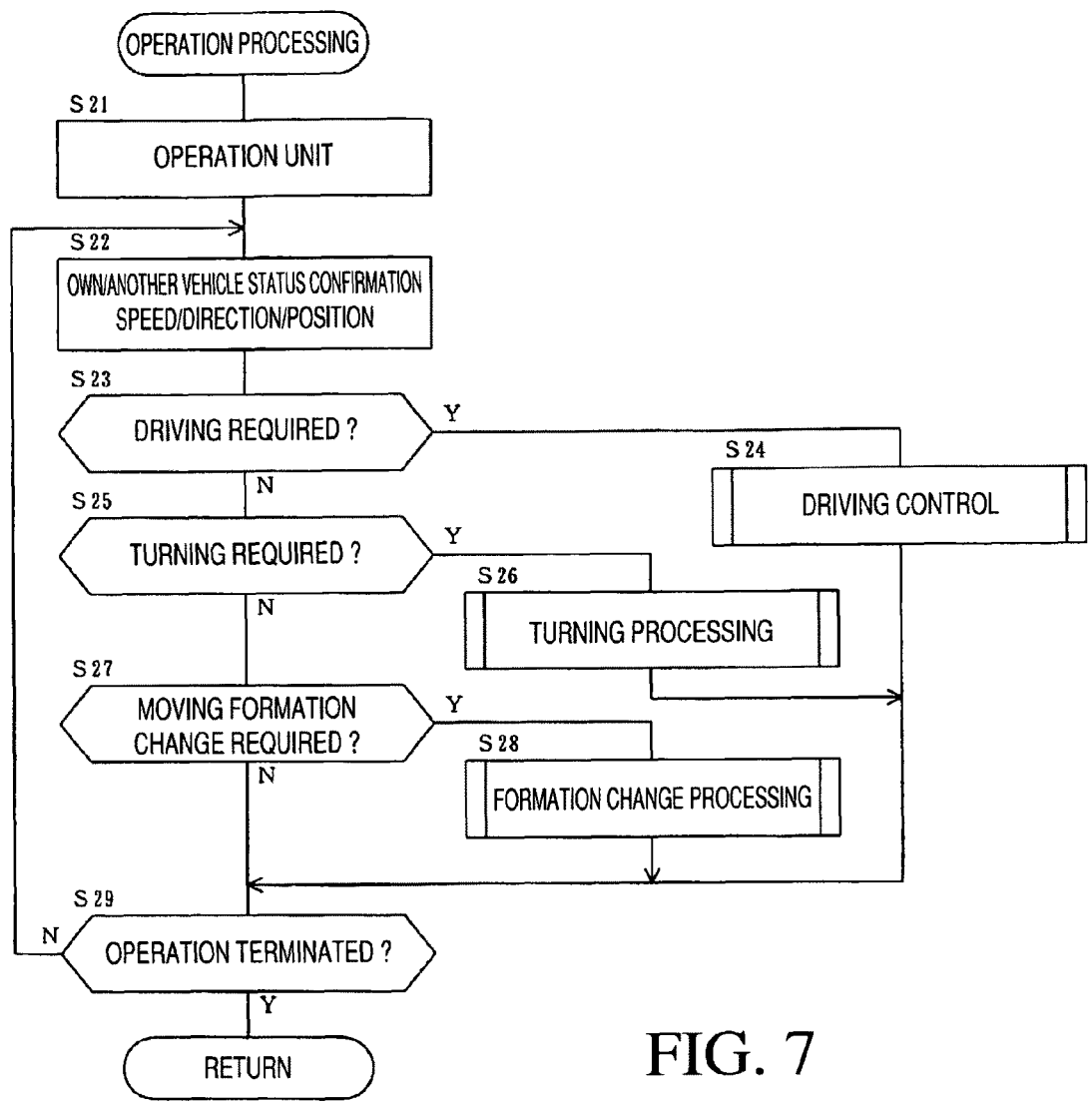
FIG. 7 is a flowchart representing contents of an operation processing.

FIG. 7 is a flowchart representing contents of the operation processing.

The main control device 161 in the host vehicle receives operation input from the steering apparatus 15 conducted by the occupant (step 21) and confirms statuses (speeds, directions, positions) of the own vehicle and the other vehicles (step 22). The status of the other vehicles is grasped from status information transmitted from the respective following vehicles.

Next, according to the inputted operation contents and the confirmed own vehicle information, the main control device 161 determines whether or not drive is required (step 23), whether or not turning is required (step 25), and whether or not change of the moving formation is required (step 27).

Whether or not the change of the moving formation is required is determined based upon the formation change criteria illustrated in FIG. 4 and based upon a demand of the formation change inputted by the occupant manually.

Incidentally, the determination about whether or not drive is required at step 23 does not include drive based upon turning.

When drive which does not include turning is required (step 23; Yes), the main control device 161 performs drive control (step 24) and it proceeds to step 29.

In the drive control, the main control device 161 determines drive torque corresponding to an inputted operation amount to instruct to the motor control device 163. The motor control device 163 performs control so as to determine a current corresponding to the drive torque instructed by the main control device 161 from a torque-current map to output the same to the drive motor 12.

In the drive control (step 24), the main control device 161 transmits moving information for moving while maintaining a moving formation with the own vehicle to each following vehicle.

As the moving information, a moving speed changing according to the drive torque which the main control device 161 in the own vehicle has instructed to the motor control device 163 is transmitted. However, since the drive control in this case does not include turning and is straight, the drive torque instructed from the main control device 161 to the motor control device 163 may be instructed to each following vehicle.

On the other hand, when turning is required (step 25; Yes), after the main control device 161 controls drive of the own vehicle position according to a turning processing described later and performs the turning processing for determining moving information for turning to transmit the same to each following vehicle (step 26), the main control device 161 proceeds to step 29.

Further, when change of the moving formation is required (step 27; Yes), the main control device 161 performs a formation changing processing described later (step 28), and then it proceeds to step 29.

At step 29, the main control device 161 determines whether or not the operation is terminated (step 29).

That is, when termination of the linkage moving is inputted from the input section 171, the main control device 161 terminates the operation processing when changing operation of the host vehicle has been conducted (step 29; Yes).

Unless the operation processing is terminated, the main control device 161 returns back to step 22 to continue the operation for the linkage moving.

Figure 8:
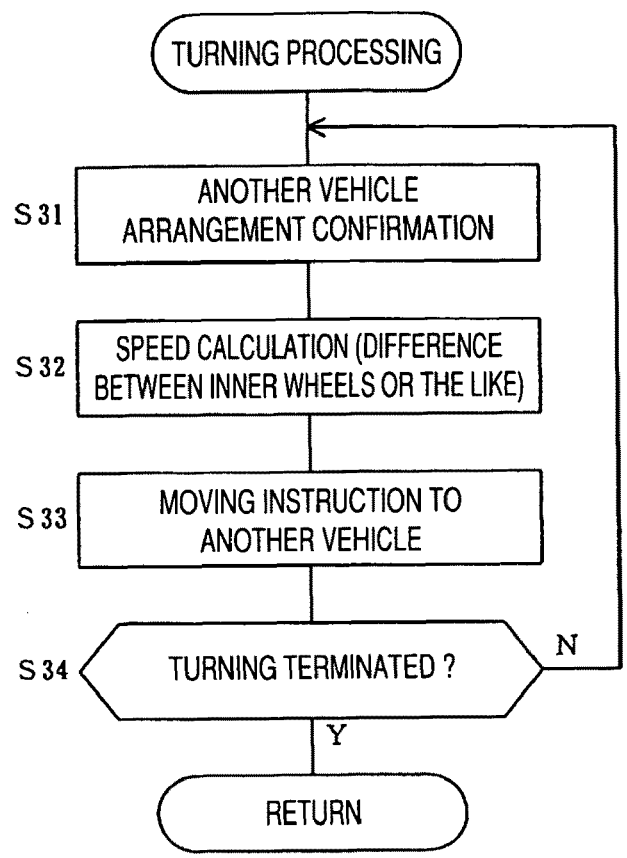
FIG. 8 is a flowchart representing contents of a turning processing in the host vehicle.

FIG. 8 is a flowchart representing contents of the turning processing in the host vehicle.

In the turning processing, the main control device 161 in the host vehicle first confirms arrangement of the other vehicles, namely, confirms a moving position of each following vehicle in the current moving formation stored in the RAM (step 31).

The main control device 161 selects the following vehicle denoted by reference numeral 1 and calculates a speed corresponding to the arrangement position and the turning angle considering to a difference between inner wheels and the like (step 32), and it attaches the following vehicle ID of the following vehicle to transmit them together with direction information as the moving information (step 33).

Whether or not the turning has been terminated, namely, whether or not moving information for turning has been transmitted to all the following vehicles and status information after turned has been fed back from all the vehicle, is determined, and unless the turning of all the vehicles has been terminated (step 34; No), the control returns back to step 31, where the turning processing about the next following vehicle is performed.

On the other hand, when the processing regarding all the following vehicles is terminated so that the turning is completed (step 34; Yes), the main control device 161 returns back to the main routine.

Figure 9:
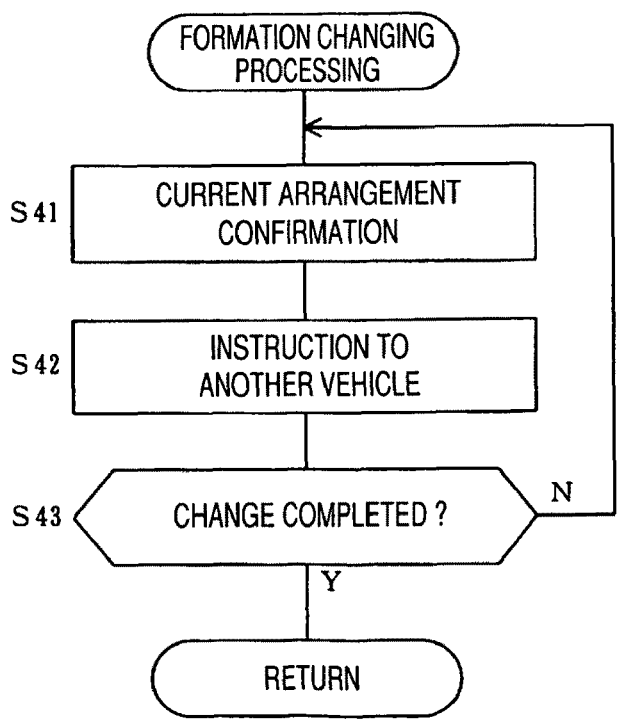
FIG. 9 is a flowchart representing contents of a formation changing processing.

FIG. 9 is a flowchart representing contents of the formation changing processing.

The main control device 161 of the host vehicle confirms the current arrangement of the vehicles with the contents stored in RAM in the formation change processing.

The main control device 161 reads the changing procedure from the current moving formation to a moving formation after changed from the storage section 164 to sequentially instruct on changes of the moving positions to the other following vehicles according to the changing procedure as explained in FIG. 5 (step 42).

As the changing instruction of the moving position, the main control device 161 transmits the moving formation after changed, the arrangement relationship after changed, and the vehicle speed to each following vehicle considering the current moving vehicle speed.

The main control device 161 determines whether or not change about all the following vehicles has been completed from the status information transmitted from the following vehicles in a feedback manner, and unless the change has been completed (step 43; No), the main control device 161 returns back to step 41 to continue the formation changing processing to the next following vehicle, but if the change has been completed (step 43; Yes), the main control device 161 returns to the main routine.

Figure 10:
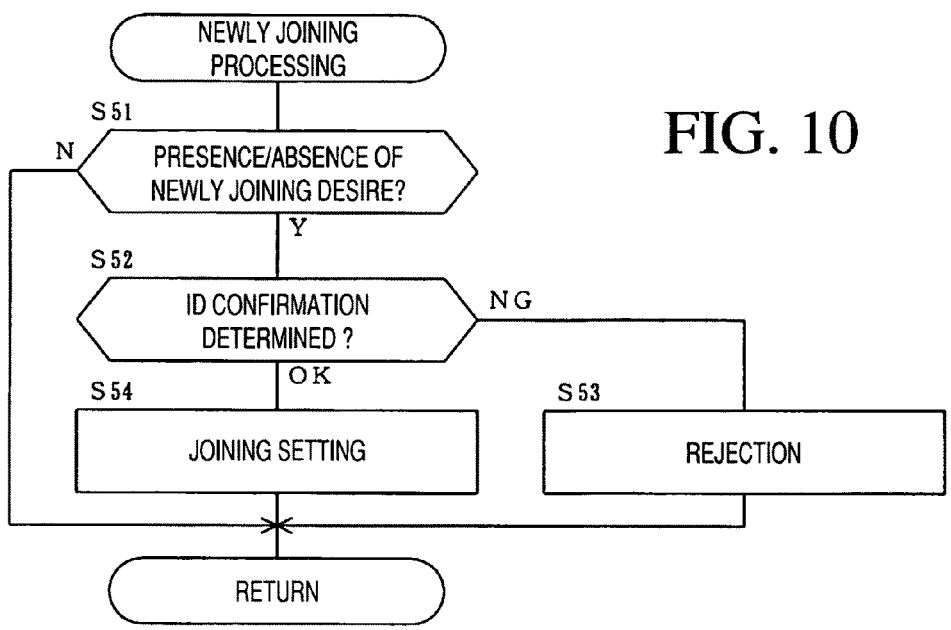
FIG. 10 is a flowchart representing contents of a newly joining processing in the host vehicle.

FIG. 10 is a flowchart representing contents of a newly joining processing in the host vehicle.

In the main control device 161 in the host vehicle, the newly joining processing is performed separately from the operation processing.

A vehicle desiring to newly join a vehicle group moving in a linkage manner as a following vehicle selects following moving and selects a newly joining button from the input section 171. Thereby, a main control device 161 in the vehicle transmits an own vehicle ID and nickname stored in a storage section 164 to the host vehicle moving in the linkage manner as information desiring newly joining.

The main control device 161 in the host vehicle monitors presence/absence of newly joining desire (step 51).

When the main control device 161 newly receives an own vehicle ID and nickname from a vehicle other than the vehicles currently moving in a linkage manner, it determines that a desire of newly joining has been issued (step 51; Yes), and it determines whether or not the received own vehicle ID is a registered them in the following vehicle IDs of the storage section 164 (step 52).

When the received own vehicle ID has not been registered (step 52; NG), the main control device 161 transmits rejection information to newly joining together with the received own vehicle ID (step 53) to return.

On the other hand, when the received own vehicle ID has not been registered (step 52; OK), the main control device 161 performs joining setting (step 54) to return to the main routine.

In the joining setting, the main control device 161 displays, on the display section 172, moving formations which can be taken by the number of vehicles obtained by adding one vehicle to the current moving formation stored in the RAM. For example, when the current moving formation is the basic moving formation shown in FIG. 4, a position just after the following vehicle 3, a position just after the following vehicle 4, a position spaced from a position between the following vehicles 3 and 4 rearward by a predetermined distance, and the like taken by the vehicle to be newly joined are displayed as selectable moving formations.

Incidentally, it is assumed that the positions of the other vehicles (the vehicle 1 to vehicle 4 in the example shown in FIG. 4) before newly joining are not changed.

In this state, the occupant in the host vehicle selects either one of these moving formations.

Incidentally, when a desire for newly joining is issued during moving, one of the formations is automatically determined and change to another formation is conducted manually.

When automatic determination is performed, a basic moving formation determined for each of the numbers of vehicles is selected.

When the moving formation is determined, the main control device 161 transmits the moving formation attached with a moving position of the newly joining vehicle and an own vehicle ID of the newly joining vehicle in newly determined moving formation to the newly joining vehicle.

The main control device 161 further changes the moving formation stored in the RAM to the moving formation for a new number of vehicles and stores the moving position of the new joining vehicle in the RAM.

Further, the main control device 161 transmits change of the moving formation to the other following vehicles moving in the linkage manner prior to newly joining.

Figure 11:
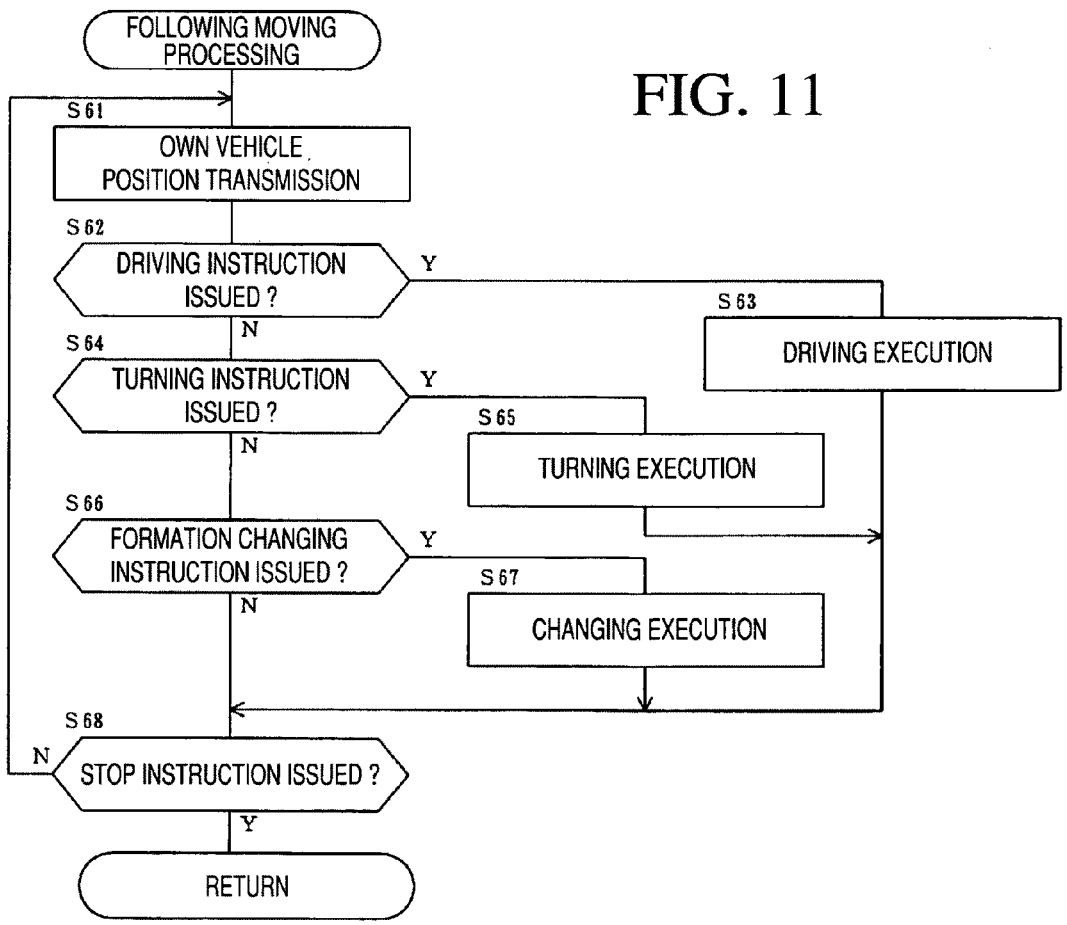
FIG. 11 a flowchart representing contents of a following moving processing in a following vehicle.

FIG. 11 is a flowchart representing contents of the following moving processing in the following vehicles.

The main control device 161 in the following vehicle transmits the own vehicle position to the host vehicle (step 61). The own vehicle position corresponds to feedback of the status information.

Here, the own vehicle position transmitted to the host vehicle is a relative position of the own vehicle position to the host vehicle and it is represented by a distance and a direction to the host vehicle. The value of the own vehicle position is detected by the relative position detecting section 19.

When the main control device 161 in the following vehicle receives moving information added with its own vehicle ID transmitted from the host vehicle, it determines whether the moving information is an ordinary drive instruction (an instruction which does not include a turning instruction (step 62) or, a turning instruction (step 64) or, and a formation changing instruction (step 66).

When the moving information is the drive instruction (step 62; Yes), the main control device 161 drive-controls the motor control device 163 so as to attain a position, a direction, and a speed indicated by the received moving information (step 63) and it proceeds to step 68.

On the other hand, when the moving information is the turning instruction (step 64; Yes), the main control device 161 controls the vehicle speed and the direction according to the received moving information (step 65) and it proceeds to step 68.

Further, when the moving information is the formation changing instruction (step 66; Yes), the main control device 161 stores the moving formation after changed received from the host vehicle and the arrangement relationship of the own vehicle in the RAM and drive-controls the motor control device 163 such that the own vehicle moves to the position designated by the moving information (step 67) and it proceeds to step 68.

Next, the main control device 161 determines whether or not a stopping instruction has been issued, namely, whether or not termination information of linkage moving has been transmitted from the host vehicle (step 68).

When the stopping instruction has not been issued (step 68; No), the main control device 161 returns back to step 61 to continue following moving according to moving information and the like received from the host vehicle.

On the other hand, when the stopping instruction has been issued (step 68; Yes), the main control device 161 returns back to the main routine.

As explained above, according to the first embodiment, since a plurality of vehicles can move in a linkage manner or each vehicle can move independently, moving can be performed with an optimal vehicle size with a high flexibility corresponding to the number of occupants from one occupant to many occupants.

One embodiment in the vehicle of the present invention has been explained above, but the present invention is not limited to the explained first embodiment and it can be modified variously within the range described in each claim.

For example, in the first embodiment explained, the case that the relative position detecting section 19 is provided with the radar and the gyro so that a relative position of an own vehicle (a following vehicle) to a host vehicle is detected and the relative position is fed back to the host vehicle as status information has been explained, but the following configuration can be adopted.

That is, the current position detecting device 18 for each vehicle is configured by using a GPS receiving device. Such a configuration can be adopted that the host vehicle calculates a coordinate position corresponding to a moving position of each following vehicle from the detected vehicle current position to transmit the same to the following vehicle.

In the explained first embodiment, such a configuration is adopted that a vehicle speed and a position at which each following vehicle should move, and the like are calculated according to a moving demand by operation to the steering apparatus 15 of the host vehicle to be transmitted to each following vehicle.

On the other hand, such a configuration can be adopted that the host vehicle transmits a moving demand according to the steering apparatus 15 to each following vehicle, while the main control device 161 in each following vehicle calculates a vehicle speed, a direction needed, and the like according to a moving position (arrangement relationship) of an own vehicle to control the motor control device 163.

(2-1) Next, a Second Embodiment Will be Explained

Incidentally, when explanation is made in the second embodiment using a reference numeral in the figures, the reference numeral corresponds to a reference numeral attached on other figures in the second embodiment and a figure designated especially, and it does not means a reference numeral in figures in other embodiments except for a figure especially designated (the same in the following embodiments).

The second embodiment relates to a vehicle, for example, a technique for separating a plurality of vehicles, which has been integrated at a time of emergency to divide/separate them from each other utilizing a method other than friction of a tire, thereby avoiding an obstacle.

(2-2) Background Art in Second Embodiment

In a conventional vehicle such as an automobile, since its size cannot be changed regardless of the number of occupants, even when a vehicle moves with only one occupant, the vehicle must move together with an empty seat and a space unneeded, which results in much wasteful weight and space and deterioration of an efficiency of fuel consumption relative to the number of occupants.

Further, a driver's seat is fixed, and a driver and an occupant must once get out of a vehicle to change seats with each other at such a time as change of driving. Furthermore, since a size of the vehicle is fixed, a place where the vehicle can move is limited.

In the first embodiment, therefore, such a vehicle has been proposed that a plurality of single-seat vehicles which can move independently are combined and they can move integrally while maintaining a predetermined moving formation through linkage among the respective vehicles.

In this technique, the joint number of vehicles is increased or decreased according to the number of occupants (the number of vehicles) so that movement is made possible with an optimal size. Even in a joined state of many occupants, a driver is only a host vehicle, and the others are controlled in a cooperating manner based upon moving information transmitted from the host vehicle in charge of steering.

By this technique, a plurality of vehicles connected can be operated integrally as if they were one vehicle.

However, the first embodiment relates to a technique where a plurality of vehicles moves in a coordinated manner, which does not describe a method for avoiding an obstacle.

By providing an effective obstacle-avoiding technique in addition to the technique for moving in a coordinated manner, the degree of completion of a coordinated moving technique having a plurality of integrated vehicles can be made higher.

Therefore, an object of the second embodiment is to avoid an obstacle at a time of emergency of a plurality of integrated vehicles.

(2-3) The Second Embodiment for Solving the Abovementioned Problem Adopts the Following Configuration (a) The above object is achieved by providing a vehicle having connecting means for connecting the vehicle to another vehicle, a sensor for detecting an obstacle, avoidance-determining means for determining whether or not collision against the obstacle is avoidable, disconnecting means for disconnecting the connecting means when it is determined that collision is unavoidable in a state that the vehicle has been connected to the another vehicle, and repelling force generating means for causing repelling force to act on both the vehicles connected.
(b) The vehicle in the abovementioned configuration (a) is characterized in that the avoidance-determining means determines whether or not collision is avoidable based upon a vehicle speed and a position of the obstacle.
(c) The vehicle in the abovementioned configuration (a) or (b) is characterized in that the repelling force generating means causes repelling force having either one of elastic force, magnetic force, wind force, and explosion force to act on both the vehicles.
(d) The vehicle in the abovementioned configuration (a), (b), or (c) is characterized in that the connecting means comprises a connecting mechanism provided with a lock mechanism, and the disconnecting means comprises a disconnecting mechanism for unlocking the lock mechanism.
(e) The vehicle described in the abovementioned configuration (a), (b), or (c) is characterized in that the vehicle is provided with a magnetic force generating device for generating magnetic force, the connecting means connects both the vehicles by generating attracting force by the magnetic force generating device, the disconnecting means disconnects connection of the both the vehicles by stopping magnetic force generated by the magnetic force generating device, and the repelling force generating means causes repelling force to act on both the vehicles by generating repelling force by the magnetic force generating device.
(f) The vehicle described in any one of the abovementioned configurations (a) to (e) is characterized in that the vehicle is provided with a driving wheel disposed on one axis, a boarding portion disposed above the driving wheel, and drive-control means for drive-controlling the driving wheel according to a moving demand by running operation while maintaining an attitude of the boarding portion.

(2-4) Effect of Second Embodiment

According to the present invention, since whether or not an obstacle detected by the sensor is avoidable is determined, and, when it is determined that collision is unavoidable in a state that the vehicle has been connected to another vehicle, together with the disconnecting means for disconnecting the connecting means repelling force is caused to act on both the vehicles connected by a method other than tire frictional force, an obstacle can be avoided at a time of emergency of the vehicle.

(2-5) Brief Overview of Second Embodiment

A plurality of connected vehicles which move in a linkage manner detects approach of an obstacle during moving by a sensor.

When avoidance utilizing braking or turning is difficult, connection of the vehicles are released and the vehicles are divided to individual vehicles, the vehicles are further separated by repelling force so that an advancing direction of each vehicle is deviated from an obstacle.

Thus, each vehicle can avoid the obstacle individually by dividing/separating the linked vehicles.

As the repelling force, it is effective to use, for example, elastic force of a spring, magnetic force of an electromagnet, explosion force of powder, wind force, or the like other than frictional force of a tire.

Even when avoidance of collision utilizing braking, acceleration, turning, or the like is difficult, which is different from a independent vehicle, an obstacle-avoiding technique utilizing a feature that a plurality of vehicles are connected can be realized by releasing connection of respective vehicles.

(2-6) Details of Second Embodiment

The vehicle of the second embodiment configures vehicles obtained by connecting a plurality of single-seat vehicles which can move independently to connect and the vehicles move integrally while maintaining a predetermined moving formation by linking respective vehicles.

One vehicle of the integrated vehicles serves as a host vehicle to transmit moving information to the other following vehicles, thereby performing steering of the whole vehicles.

In the second embodiment, an assembly of vehicles configured by connecting a plurality of vehicles centering a host vehicle is called "integrated vehicles".

Figure 12A:
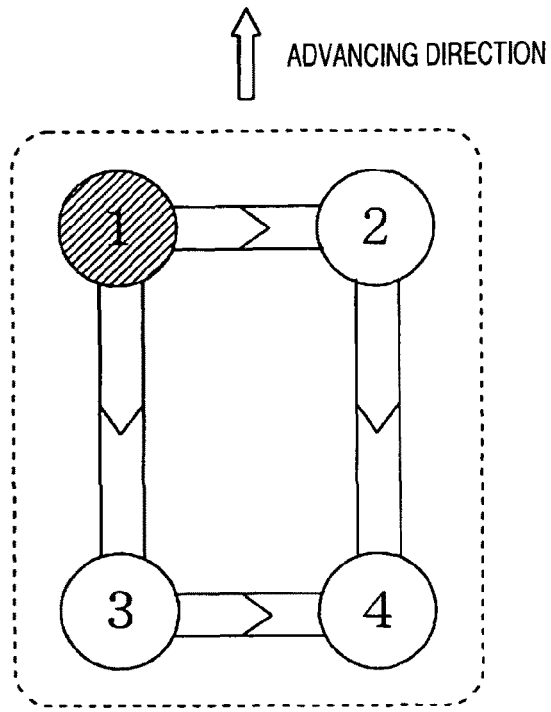
FIG. 12 is a diagram illustrating a relationship between a host vehicle and following vehicles when four vehicles conduct linkage moving.

FIG. 12A is a diagram illustrating a relationship between a host vehicle and following vehicles when four vehicles move in a linkage manner.

In the example shown in FIG. 12, a vehicle No. 1 shaded of four vehicles 1 to 4 serves as a host vehicle and an occupant of the host vehicle is a driver for linkage moving.

Incidentally, the host vehicle is limited to one vehicle, but any vehicle of the vehicles 1 to 4 can be the host vehicle, and an arrangement formation (moving formation) can be selected arbitrarily within a predetermined range of moving formations preset, so that vehicles are connected in a selected formation.

Each vehicle is provided with connecting devices at four positions of front, rear, left, and right positions, so that respective vehicles are connected by connecting these connecting devices. In FIG. 12A, connecting devices used for connecting respective vehicles are shown illustratively.

The connecting devices may be provided on respective vehicles in advance, or they may be provided on respective vehicles in add-on manner.

Incidentally, in the vehicle in the present embodiment, respective vehicles are physically connected by using the connecting devices, but, using moving information transmitted from the host vehicle to the following vehicles, they may be connected through soft connection where the vehicles move while following vehicles are maintaining a connected state (distances and a arrangement relationship among respective vehicles), as disclosed in Patent Literature 1.

The connecting devices in the second embodiment fix an arrangement relationship among vehicles structurally. Therefore, each vehicle is configured such that its axle rotates in a turning direction to its vehicle main body including a boarding portion in order for integrated vehicles to turn.

Incidentally, as the connecting device, one having a structure deformable within a predetermined allowable range can be used by using rod members or the like articulated by a bellows or a hinge.

When such a deformable connecting device is used, a vehicle body and an axle may be fixed to each other, or an axle may be configured so as to rotate to a vehicle body like the second embodiment.

Figure 12B:
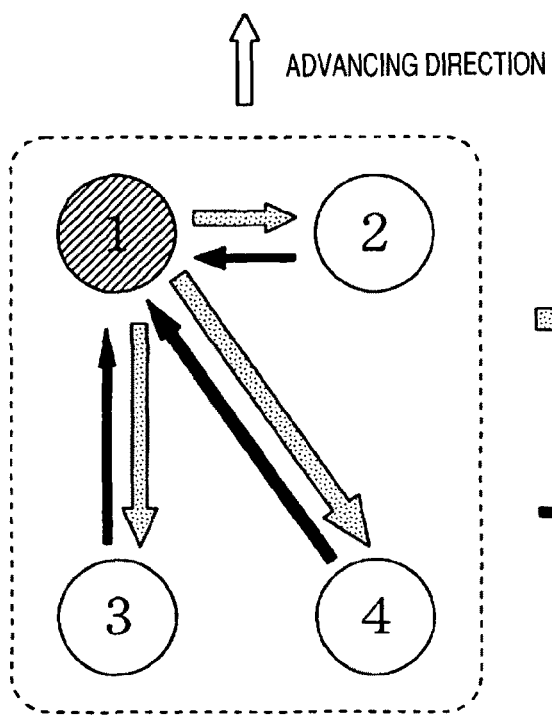

FIG. 12B is a diagram for explaining moving information transmitted/received between a host vehicle and following vehicles.

The host vehicle 1 performs necessary drive at speed/in direction corresponding to running operation performed by an occupant.

Simultaneously therewith, the host vehicle 1 instructs the following vehicles 2 to 4 to synchronize (follow) the own vehicle. That is, the host vehicle 1 transmits a speed, a direction, and relative positions to the own vehicle (host vehicle 1) to other following vehicles 2 to 4 as moving information (a follow-up instruction) in order to cause the following vehicles to synchronize the own vehicle (maintain the linkage relationship).

On the other hand, the following vehicles 2 to 4 move based upon the follow-up instruction and feed status information having a speed and a direction of an own vehicle and an own vehicle position back to the host vehicle 1 as own vehicle information.

The host vehicle 1 prepares moving information according to each status information fed back and a moving state and running operation of a current own vehicle to transmit the same to the following vehicles 2 to 4.

Thus, the vehicles move while they repeat the follow-up instruction from the host vehicle and feedback of the status information from the following vehicles so that the linkage moving can be maintained without applying force to the connecting devices as much as possible.

Especially, when the connecting device has a deformable structure, flexible moving can be made possible by using software-like connection using physical connection and feedback at the same time.

Thus, a plurality of vehicles of the second embodiment move in a linkage manner, so that moving is made possible with an optimal vehicle body size corresponding to the number of occupants including one occupant to many occupants.

Any occupant (any vehicle) can steer his/her own vehicle as the host vehicle at any place in the linkage moving state. By changing an occupant in charge of the host vehicle to an occupant of another vehicle, driver change can be performed without changing seats between occupants or changing moving positions.

Since flexibility of changing the vehicle size or the moving formation in the connected state is high, for example, vehicles can move on a narrow alley in one line row, so that places where the vehicle can move are expanded.

Each figure of FIG. 13 represents an avoiding method when an obstacle is present ahead of integrated vehicles in the second embodiment.

FIG. 13A is a diagram representing a case that an obstacle 300 is present in front of integrate vehicles 500 in an advancing direction (moving direction) thereof.

The obstacle 300 is a static material such as a large item left on a road or a moving body such as a car coming from a front of the integrated vehicles toward the integrated vehicles 500.

More specifically, as the obstacle 300, for example, another vehicle, a pedestrian, a sign, a traffic light, a wall, a tree, and the like are thought.

The integrated vehicles 500 search for an obstacle around the integrated vehicles 500 using sensors of the host vehicle 1 and the following vehicles 2 to 4, and information obtained by the searching are collected to the host vehicle 1.

The host vehicle 1 determines whether or not avoidance by braking conducted by a brake or turning of the integrated vehicles 500 can be possible based upon the arrangement relationship between the integrated vehicles 500 and the obstacle 300 and a moving state (a vehicle speed).

When it is determined that the avoidance is possible, the host vehicle 1 selects avoidance according to these methods, but when the avoidance is difficult, the host vehicle 1 releases connection among the respective vehicles and causes the respective vehicles to react mutually, thereby deconcentrating the vehicles. Thereby, advancing directions of respective vehicles are deviated from the obstacle 300, so that frontal collision or lateral collision between respective vehicles and the obstacle 300 can be avoided.

FIG. 13B represents a state that connection of respective vehicles has been released and the integrated vehicles 500 have been disjoined.

In an example shown in FIG. 13B, repelling force acts between the host vehicle 1 and the following vehicle 2 so that advancing directions where the vehicles are remote from each other are changed. Thereby, both of the host vehicle 1 and the following vehicle 2 can avoid collision against the obstacle 300.

Similarly, repelling force also acts between the following vehicle 3 and the following vehicle 4 so that both the vehicles avoid collision against the obstacle 300.

In general, the integrated vehicles 500 can avoid frontal collision against the obstacle 300 by generating repelling force in a direction perpendicular to an approaching direction of the obstacle.

Incidentally, it is also possible to generate repelling force between the host vehicle 1 and the following vehicle 3 or between the following vehicle 2 and the following vehicle 4, but since the vehicle (the host vehicle 1, the following vehicle 2) on the side of the advancing direction is accelerated in the advancing direction according to action-reaction law, it is desirable that repelling force on the side of the advancing direction is not generated in the case of frontal collision avoidance. In this case, the vehicles are divided to the left side and the right side in a state that the host vehicle 1 and the following vehicle 3 have been connected and in a state that the following vehicle 2 and the following vehicle 4 have been connected.

Each figure of FIG. 14 represents an avoiding method performed when an obstacle approaches integrated vehicles from a side face thereof (on the side where the following vehicle 2 and the following vehicle 4 are disposed).

Figure 14A:
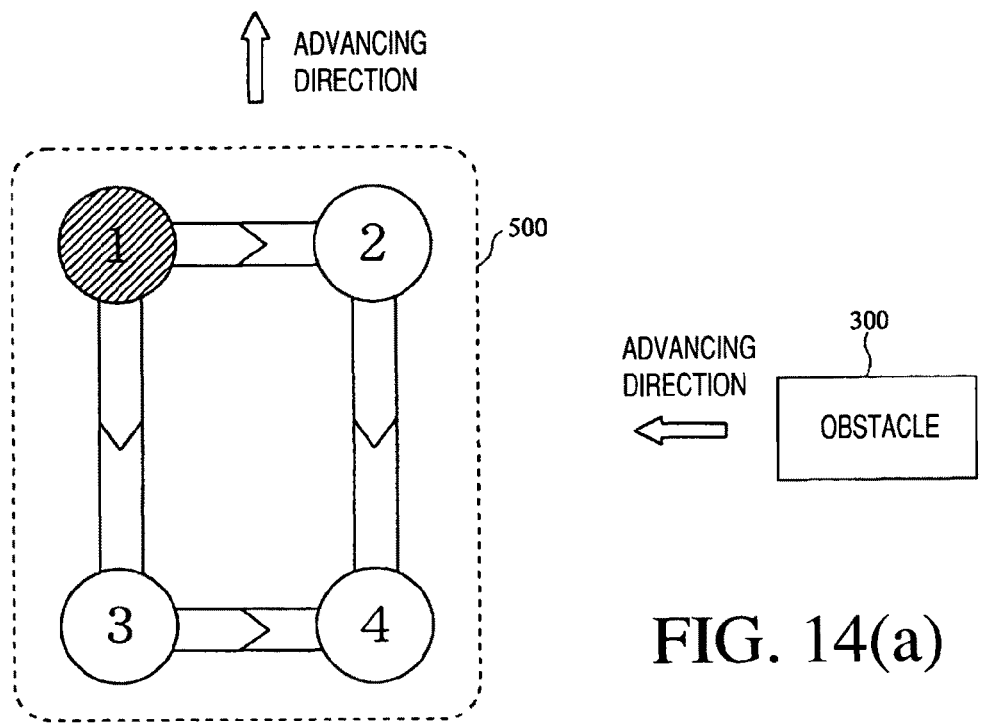
FIG. 14 is a diagram for explaining an avoiding method when an obstacle approaches the integrated vehicles from its side face.

FIG. 14A represents a case that an obstacle 300 approaches integrated vehicles 500 from a side face thereof.

The obstacle 300 is, for example, a moving body such as a vehicle moving toward in a direction of the integrated vehicles from a side face of the integrated vehicles, and as such a moving body, a vehicle entering an intersection from a side face of the integrated vehicles at a passage time of the intersection, a train approaching the integrated vehicles stuck at a railroad crossing, and the like is considered.

When avoidance by braking of a brake or the like, avoidance by acceleration, or avoidance by turning of the integrated vehicles 500 is possible, the host vehicle 1 avoids collision against the obstacle 300 by braking, accelerating, or turning the integrated vehicles 500, but when avoidance utilizing these methods is difficult, the host vehicle 1 releases connection among the respective vehicles and causes the respective vehicles to react against the respective vehicles, thereby avoiding collision against the obstacle 300.

Figure 14B:
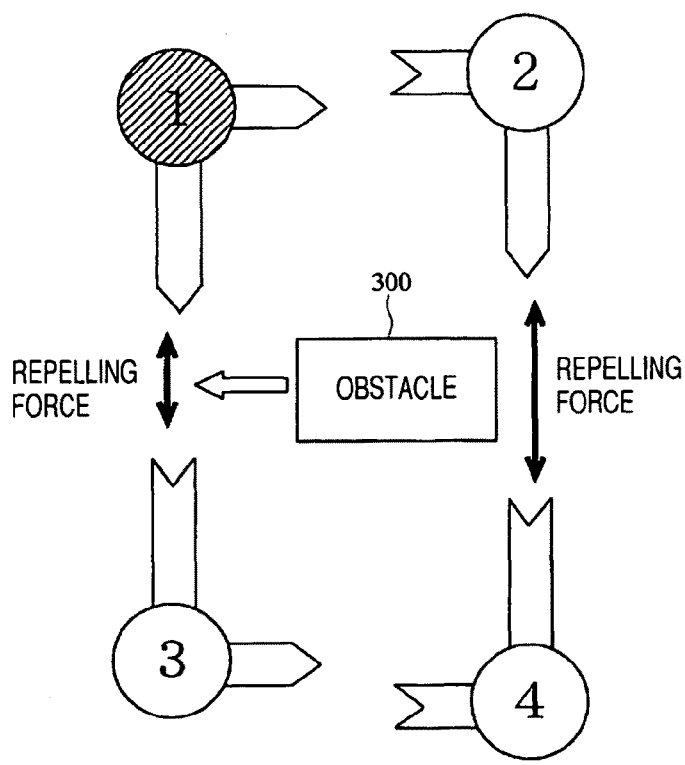

FIG. 14B is a diagram representing a state where connection of respective vehicles has been released and the integrated vehicles 500 has been disassembled.

In the example illustrated, repelling force acts between the following vehicle 2 and the following vehicle 4 so that a motion state is changed in directions where both the vehicles are separated away from each other. Thereby, the obstacle 300 passes through a clearance between the following vehicle 2 and the following vehicle 4 so that both the vehicles can avoid collision against the obstacle 300.

Similarly, repelling force also acts between the host vehicle 1 and the following vehicle 3 so that both the vehicles avoid collision against the obstacle 300.

Incidentally, it is possible to generate repelling force between the host vehicle 1 and the following vehicle 2 or between the following vehicle 3 and the following vehicle 4 too, but in this case, the following vehicle has a motion component in the direction of the obstacle. Therefore, in order to avoid lateral side collision, it is preferable that the vehicles are divided from each other in a state that the host vehicle 1 and the following vehicle 2 have been connected and in a state that the following vehicle 3 and the following vehicle 4 have been connected.

An appearance configuration of the vehicle in the second embodiment is as explanation in FIG. 2 and the first embodiment.

Incidentally, though not illustrated in FIG. 2, the inversed-pendulum vehicle is provided with an obstacle-detecting sensor for detecting an obstacle around the vehicle utilizing infrared ray, ultrasonic wave, laser, or the like. Thereby, when the inverted-pendulum vehicles are moving as the integrated vehicles 500, they can detect an obstacle 300.

Though not illustrated in FIG. 2, the inverted-pendulum vehicle is provided with the connecting devices for connection with front side, rear side, left side, and right side other inverted-pendulum vehicles and the repelling devices, or these devices are provided on the inverted-pendulum vehicle. Specific configurations of the connecting device and the repelling device will be described later.

Figure 15:
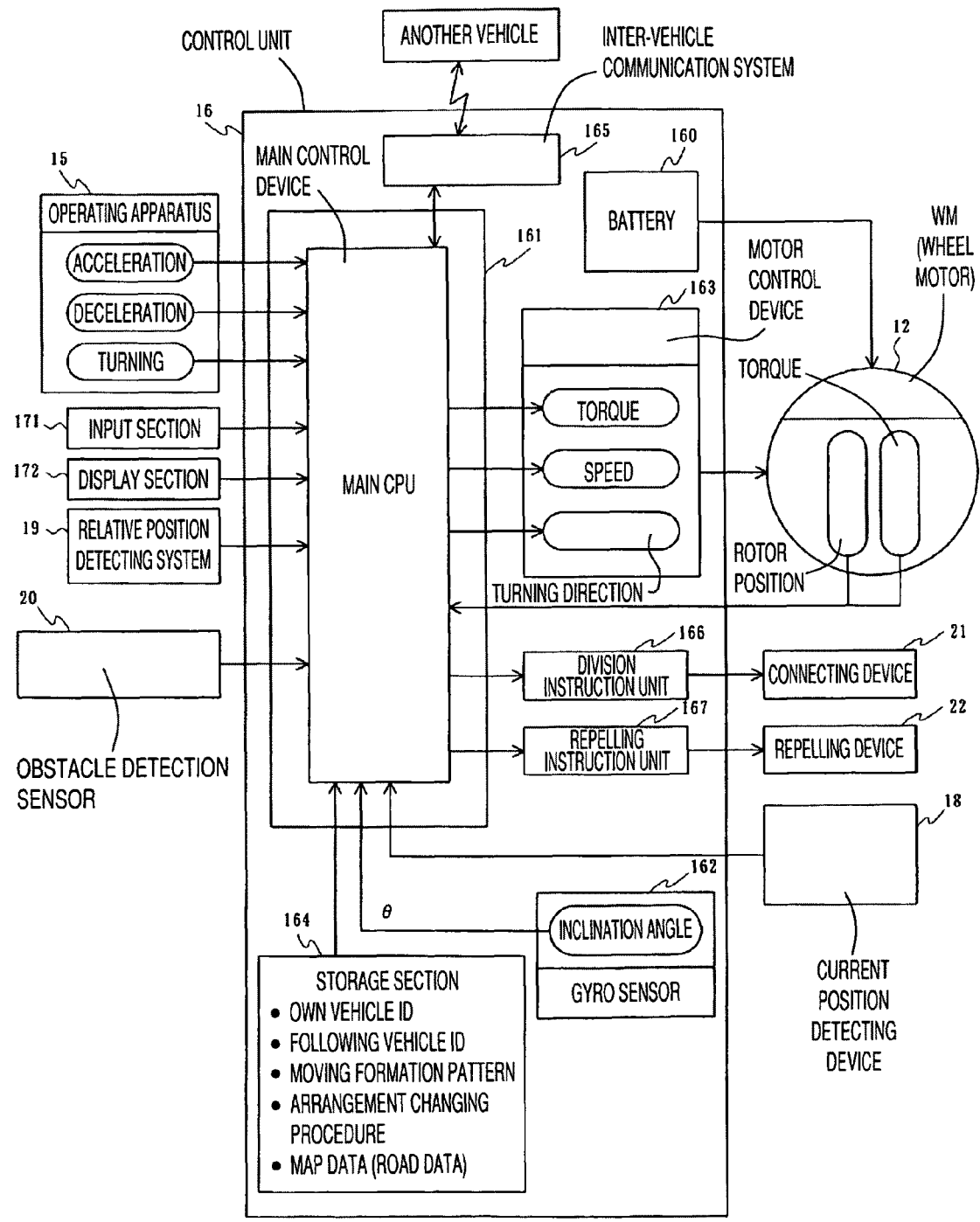
FIG. 15 is a diagram representing a configuration of a control unit for an inverted-pendulum vehicle.

FIG. 15 is a diagram representing a configuration of the control unit 16 of the inverted-pendulum vehicle.

The control unit 16 is provided with a battery 160, a main control device 161, a gyro sensor 162, a motor control device 163, a storage section 164, an inter-vehicle communication system 165, a division instructing section 166, and a repellence instructing section 167.

The battery 160 supplies power to the drive motor 12. The battery 160 also supplies power source with a low voltage for control to the main control device 161.

The main control device 161 is provided with a main CPU, and it is configured using a computer system provided with a ROM in which various programs and data have been stored, a RAM used as a working area, an external storage device, an interface section, and the like (not shown).

An attitude control program for holding an attitude of an inverted-pendulum vehicle, a moving control program for controlling moving based upon various instructions from the steering apparatus 15, a program for executing various linkage moving processings for conducting linkage moving in a coordinated manner with another vehicle, various programs such as a collision-avoiding program for avoiding an obstacle at a time of emergency of the present embodiment are stored in the ROM (or the storage section 164), and the main control device 161 executes these various programs to perform corresponding processings.

The gyro sensor 162 functions as an attitude sensing sensor for sensing an attitude of the boarding portion 13.

The gyro sensor 162 detects an angular acceleration and an inclination angle θ of the boarding portion 13 as physical quantity based upon an inclination of the boarding portion 13.

The main control device 161 recognizes an inclination direction from the inclination angle detected by the gyro sensor 162.

Incidentally, the gyro sensor 162 in the second embodiment detects an angular acceleration and an inclination angle to supply them to the main control device 161, but it may detect only the angular acceleration.

In this case, the main control device 161 accumulates velocities supplied from the gyro sensor 162, thereby calculating an angular acceleration and an angle to acquire an inclination angle.

Further, various sensors outputting a signal according to an angular acceleration when the boarding portions 13 such as a liquid rotor type angular accelerometer or an eddy current type angular accelerometer incline may be used as the attitude sensing sensor other than the gyro sensor 162.

Instead of a pendulum in a servo type accelerometer, the liquid rotor type angular accelerometer detects motion of liquid to measure an angular acceleration from a feedback current when motion of the liquid is balanced by a servo mechanism. On the other hand, the angular accelerometer utilizing an eddy current configures configuring a magnetic circuit using a permanent magnet and disposing a cylindrical rotor made of aluminum in the circuit, and it detects an angular acceleration based upon magnetic electromotive force generated according to change of a rotating speed of the rotor.

The motor control device 163 controls the drive motor 12.

That is, the motor control device 163 controls the drive motor 12 according to respective instruction signals of a drive torque, a speed, and a rotation direction supplied from the main control device 161.

The main control device 161 supplies respective instruction signals of a drive torque, a speed, and a rotation direction to the motor control device 163 based upon a moving demand from the steering apparatus 15 when the own vehicle moves as a host vehicle and based upon moving information received from the host vehicle when the own vehicle moves as a following vehicle.

The motor control device 163 is provided with a torque-current map for the drive motor 12.

The motor control device 163 controls so as to output a current corresponding to drive torque supplied from the main control device 161 to the drive motor 12 according to the torque-current map. Incidentally, the drive torque supplied from the main control device 161 is a torque instruction value T for attitude control when the vehicle is stopping and a value obtained by adding/subtracting the torque instruction value T for an attitude control to/from a torque instruction value according to a drive demand of a driver while the vehicle is moving.

Various data items such as an identification number of an own vehicle (own vehicle ID), an identification number of a following vehicle (following vehicle ID), moving formation patterns and arrangement-changing conditions, an arrangement-changing procedure, and map data (road data) are stored in the storage section 164 as various information items required for linkage moving.

Nickname (handle name) of each vehicle can be registered as being related to an own vehicle ID (following vehicle ID). The handle name together with the following vehicle ID is transmitted to the host vehicle. In the host vehicle, for example, when an occupant thereof makes determination about where respective following vehicles should be arranged in the determined moving formation, he/she displays the determined moving formation and all the handle names received on the display section 172 so that he/she can select the handle names and positions in the moving formation displayed to determine his/her vehicle position easily.

Assuming that the own vehicle is the host vehicle, the following vehicle ID is an ID number of another vehicle which can conduct linkage moving together with the own vehicle, and an ID number registered in advance according to a following vehicle registration operation from the input section 171 is stored as the following vehicle ID.

The main control device 161 transmits moving information to each following vehicle, but the contents of the moving information differ according to an arrangement relationship with the host vehicle in the determined moving formation, so that the main control device transmits the moving information attached with the following vehicle IDs to the following vehicles and each following vehicle adopts only moving information attached with its own ID.

The inter-vehicle communication system 165 conducts transmission/reception of moving information (a follow-up instruction) and status information between the host vehicle and a following vehicle present within a predetermined distance.

The inter-vehicle communication system 165 performs transmission/reception of information through wireless communication utilizing radio wave, infrared ray, or the like.

The inter-vehicle communication system 165 in the second embodiment transmits communication data to respective vehicles present in a plurality of peripheral regions by using broadcast, but it may transmit communication data to the plurality of vehicles utilizing multicast or the like.

The input section 171 is disposed on the display/operation section 17 (see FIG. 2), and it functions as input means for inputting various data or conducting instruction and selection.

The input section 171 comprises a touch panel and exclusive selection buttons disposed on the display section 172. Regarding the touch panel portion, a position pressed (touched) by a passenger is detected corresponding to each of various selection buttons displayed on the display section 172 so that selection content is acquired from the pressed position and the display content thereof.

The display section 172 is disposed on the display/operation section 17. Buttons to be selected or inputted from the input section 171, explanation, and the like are displayed on the display section 172.

As the selection buttons displayed on the display section 172, various buttons such as, for example, a moving mode selection button, a moving formation selection button, a following vehicle ID selection button (the handle name is displayed), and a moving position (arrangement relationship) selection button are displayed.

Further, a midstream joint button utilized when a vehicle joins a vehicle group which is moving in a linkage manner in the middle of moving is also displayed. When the midstream joint button is selected, an own vehicle ID and a handle name (when it has been registered) are transmitted from the inter-vehicle communication system 165 as information representing joint application.

On the other hand, when the host vehicle moving in the linkage manner receives the own vehicle ID and the handle name, if the own vehicle is a vehicle registered in the storage section 164 as the following vehicle ID, display indicating that there is a vehicle wishing to join is performed on the display section 172, and a permission button which permits joint and a rejection button which rejects joint are displayed.

When the joint permission button is selected, a current moving formation and an arrangement relationship (the handle names are displayed) are displayed on the display section 172, and a possible arrangement position of a new joint vehicle is displayed. Regarding the possible arrangement position, another moving formation maintaining a current moving formation is read from the storage section 164 and an empty position is displayed as the possible arrangement position. When a plurality of possible arrangement positions is present, one arrangement position is determined by selection conducted by an occupant in the host vehicle.

A current position detecting device 18 is for detecting a current position (an absolute coordinate value having a latitude and a longitude) of a vehicle, and one or more of a GPS (Global Positioning System) receiving device for measuring a position of a vehicle utilizing an artificial satellite, a geomagnetic sensor which detects geomagnetism to obtain an orientation of a vehicle, a gyro sensor, a vehicle speed sensor, and the like are used.

Road width information is acquired by specifying a road on which a vehicle is currently moving from a current position detected by the current position detecting device 18 and map data in the storage section 164 through map matching (road width information acquiring means) and it is used for determination about whether or not change of a moving formation is required.

Incidentally, the road width information acquiring means comprises the map information, the current position detecting device 18, and the mapping matching processing, but it may comprise an imaging device for imaging both sides of a vehicle and detecting a road width according to image recognition of an imaged image.

A relative position detecting section 19 is provided with a radar and a gyro, and it detects a relative position to a host vehicle. A distance to the host vehicle is detected by the radar, and a moving amount (direction) is detected by the gyro.

The detected relative position relationship is fed back to the host vehicle as status information together with a vehicle speed detected by the vehicle speed sensor (not shown).

The main control device 161 is supplied with information items corresponding to respective devices and equipments from the drive motor (wheel motor) 12, the steering apparatus 15, and the gyro sensor 162, the current position detecting device 18, the input section 171, and the relative position detecting section 19, so that respective controls of attitude control, moving control, and braking control, and the linkage moving control in the second embodiment are performed according to these information items.

Information indicating a torque and a rotor position is supplied from the drive motor 12, acceleration instruction information, deceleration instruction information, and turning information showing a turning direction are supplied from the steering apparatus 15, an angular velocity of the boarding portion 13 is supplied from the gyro sensor 162, a current position (a latitude, a longitude) of a vehicle is supplied from the current position detecting device 18, selection information of an occupant to respective buttons displayed on the display section 172 is supplied from the input section 171, and a relative position relationship to a host vehicle is supplied from the relative position detecting section 19.

The main control device 161 is supplied with detection information from the obstacle detecting sensor 20. Thereby, the main control device 161 can acquire a position where an obstacle is present and a relative position to the obstacle.

The obstacle detecting sensors 20 are disposed at a plurality of portions of the vehicle. Specifically, the obstacle detecting sensors 20 are disposed at four portions of at least a front portion, a rear portion, a left side portion, and a right side portion, but it is preferable that obstacle detecting sensors 20 are further disposed at four corners of the vehicle, so that a total of eight obstacle detecting sensors are provided.

The obstacle detecting sensor 20 detects presence/absence of an obstacle and a relative distance from an own vehicle to the obstacle.

When the vehicle is a following vehicle, obstacle information detected by the obstacle detecting sensor 20 (a position (the front portion, the right and front corner, or the like) and a distance to the obstacle) is transmitted to the host vehicle via the inter-vehicle communication system 165.

Incidentally, the obstacle detecting sensor 20 of the respective obstacle detecting sensors 20 which is positioned in a predetermined position due to connection of the connecting devices 21 is turned OFF so that an internal direction of the integrated vehicles is prevented from being detected.

For example, in FIG. 12, the obstacle detecting sensors disposed at the front portion, the left side portion, and the left corner of the following vehicle 4 are turned OFF.

That is, the obstacle detecting sensor 20 disposed in a direction where vehicles are being connected by the connecting device 21 is turned OFF. Further, when a plurality of connecting devices 20 and when the connecting devices 20 are perpendicular to each other, an obstacle detecting sensor disposed at a corner between both the connecting devices 20 and 20 turned OFF.

The division instructing section 166 activates the connecting device 21 according to a division instruction signal from the main control device 161 to disconnect the connecting device 21.

Incidentally, the connecting device 21 configures connecting means for connection with another vehicle and the division instructing section 166 configures disconnecting means for disconnecting the connecting device 21.

The repulsion instructing section 167 activates the repelling device 22 by a repulsion instruction signal from the main control device 161 to generate repelling force. The repelling device 22 configures repelling force generating means for causing repelling force to act between both the vehicles connected to each other.

Incidentally, in FIG. 15, the connecting device 21 and the repelling device 22 are each shown as a single device, but they are provided at the front, rear, left, and right portions of the inverted-pendulum vehicle, and the division instructing section 166 and the repulsion instructing section 167 can actives these devices individually.

In the case that the own vehicle is the host vehicle, when the main control device 161 determines that a current situation is an emergency situation (collision cannot be avoided by acceleration, deceleration or turning of the vehicle) based upon a vehicle speed, a detection signal obtained by the obstacle detecting sensor 20 of the own vehicle, and obstacle information received from the following vehicle, it supplies a division instruction signal and a repulsion instruction signal to the division instructing section 166 and the repulsion instructing section 167, respectively and it supplies the division instruction signal and the repulsion instruction signal to the following vehicles via the inter-vehicle communication system 165.

On the other hand, in the case that the own vehicle is a following vehicle, the main control device 161 supplies a division instruction signal and a repulsion signal received from the host vehicle to the division instructing section 166 and the repulsion instructing section 167.

Figure 16A:
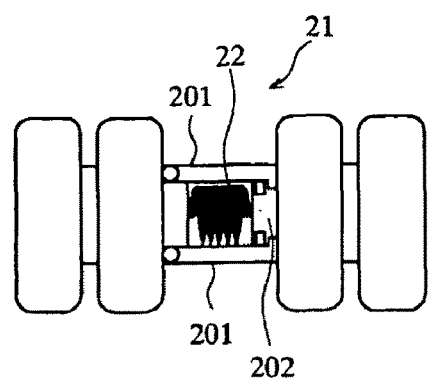
FIG. 16 is a plan view showing one example of a connecting apparatus and a repelling apparatus utilizing elastic force.

FIG. 16A is a plan view showing one example of the connecting device and the repelling device, representing a connected portion viewed from the above (an inversion direction of the inverted-pendulum vehicle). Incidentally, FIG. 17 to FIG. 19 explained below is similar to the above.

As shown in FIG. 16A, the connecting device 21 comprises plate-like connecting members 201 which are fixed to one vehicle side via hinges so as to be openable/closable and are provided with protrusion portions on the side of the other vehicle, and a fixing plate 202 configured on the side of the other vehicle and provided with recesses fitted with the protrusions of the connecting members 201.

Thus, the connecting members 201 and the fixing plate 202 configure a lock mechanism where the protrusion portions are fitted into the recesses.

The connecting members 201 are provided at a front side and a rear side one by one, and the repelling device 22 is accommodated between the connecting members. The repelling device 22 comprises a compressed spring.

Repelling force due to elastic force of the repelling device 22 acts on both the vehicles, but the repelling force is held by connection of the connecting device 21 without being released.

Figure 16B:
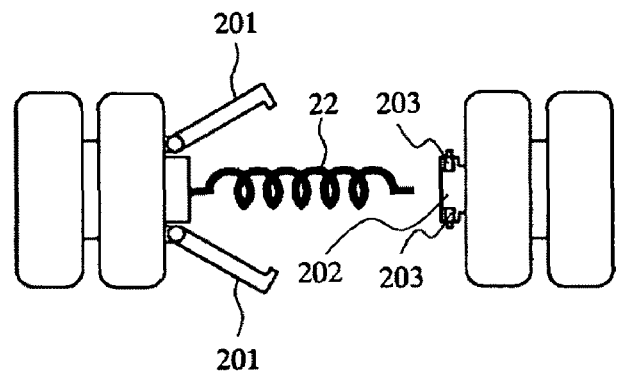

FIG. 16B represents a state that the connecting device 21 and the repelling device 22 have been activated at a time of emergency.

The fixing plate 202 accommodates therein releasing devices 203 protruding pins electromagnetically to move the connecting device 21 in an opening direction thereby releasing connection of the protrusions and the recesses. In the figures, the releasing devices 203 are activated by an instruction from the division instructing section 166 (FIG. 15) so that the connecting device 21 is in an opened state.

When the connecting device is changed to an opened state, repelling force of the repelling device 22 is released so that both the vehicles are pushed in a direction in which they become remote from each other.

Thus, in this example, the disconnecting mean comprises the canceling mechanism for canceling the lock mechanism.

Incidentally, in this example, since connection of the connecting device 21 is cancelled and repelling force of the repelling device 22 is automatically released so that the repelling force acts, the repulsion instructing section 167 is not required.

Figure 17A:
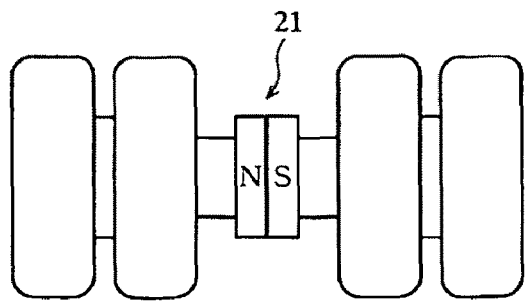
FIG. 17 is a plan view showing one example of a connecting apparatus and a repelling apparatus utilizing magnetic force.

FIG. 17A is a diagram representing another example of the connecting device 21 and the repelling device 22.

The connecting device 21 comprises an electromagnet formed with magnetic pole in a connecting direction. The electromagnet configures a magnetic force generating device.

When vehicles are connected to each other, different magnetic poles are formed on coupling portions, respectively, so that connection is performed by attracting force by magnetic force. In the example in figure, an N pole is formed on the side of one vehicle, while an S pole is formed on the side of the other vehicle.

The kinds of magnetic poles and intensities of magnetic forces formed on electromagnets of the connecting device 21 are controlled by the division instructing section 166.

Figure 17B:
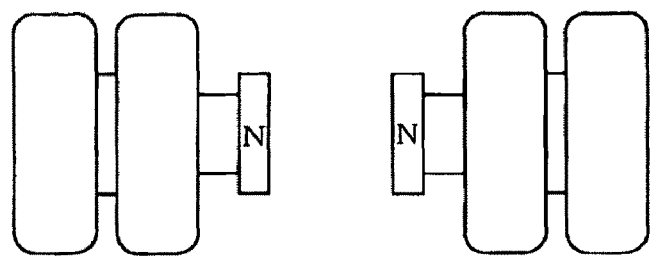

FIG. 17B is a diagram representing a state that the electromagnets have repelled to each other at a time of emergency In this example, repelling force by magnetic force is generated between the electromagnets by reversing the magnetic pole of one of the electromagnets of the connecting devices 21, so that both the vehicles are disconnected to each other and they are repelled against each other. In figure, the magnetic pole which is S pole is reversed to N pole, but the N pole side may be reversed to S pole.

More specifically, the division instructing section 166 disconnects connection of both the vehicles by stopping magnetic force generated by one electromagnet and then generates repelling force by magnetizing the electromagnet to reverse polarity.

Thus, in this example, since the connecting device 21 also has a function of the repelling device 22, it is unnecessary to provide the repellence instructing section 167 and the repelling device 22 in the inverted-pendulum vehicle.

The host vehicle 1 determines which polarity of an electromagnet in the connecting devices 21 forming the integrated vehicles 500 should be reversed, to supply an instruction signal to the following vehicle.

Figure 18A:
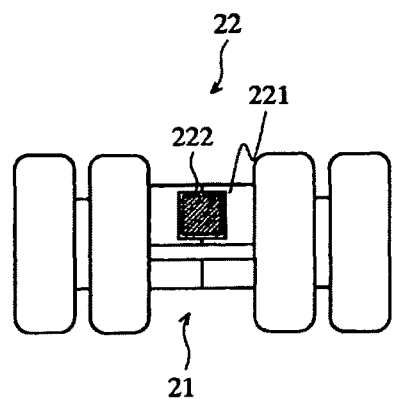
FIG. 18 is a plan view showing one example of a connecting apparatus and a repelling apparatus utilizing explosive force.

FIG. 18A is a diagram representing still another example of the connecting device 21 and the repelling device 22.

In this example, the connecting device 21 and the repelling device 22 are disposed in parallel between the both vehicles.

Figure 18B:
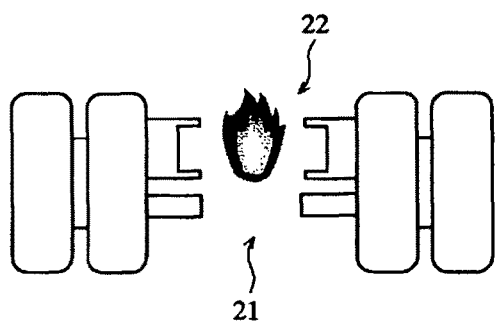
Figure 18C:
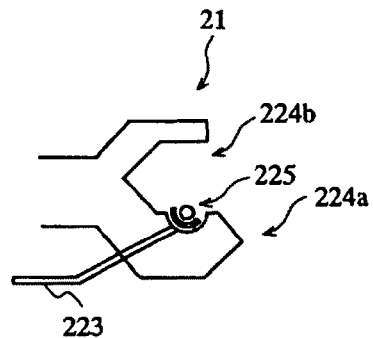

The connecting device 21 has, for example, the same configuration as a connecting device for a train, and it is formed at a distal end portion thereof with a protrusion 224a fitted with a recess of a counterpart and a recess 224b fitted with a protrusion of the counterpart, as shown in FIG. 18C.

Further, the connecting device 21 is also formed with a connection holder 225 for holding such that fitting with the counterpart is not cancelled, where holding and canceling of the holding can be performed by operation of a releasing lever 223. The connection holder 225 may comprise, for example, a swivel.

Operation of the releasing lever 223 is basically performed manually, but holding is cancelled automatically by an instruction from the division instructing section 166 at a time of emergency.

On the other hand, the repelling device 22 is configured using a column-like member 221 which is formed with a hollow portion at a central section thereof in an axial direction, as shown in FIG. 18A.

The hollow section configures a powder chamber, in which powder 222 is provided. A detonator (not shown) is provided corresponding to the powder 222, and the detonator explodes the powder 222 by an instruction from the repelling instruction portion 167.

The column-like member 221 is configured such that it is divided from its central portion, and when the powder 222 is exploded, the column-like member 221 is divided and repelling force is further generated between pieces of the column-like member divided by explosion.

FIG. 18B represents a state where both vehicles are repelled against each other.

As shown in FIG. 18B, the connecting device 21 is disconnected by an instruction of the division instructing section 166, and the repelling device 22 explores by an instruction of the repelling instructing section 167 so that pressure of explosion (explosive force) acts between the divided pieces of the column-like member.

In this example, the repelling force is generated by the powder 222 as one example, but such a configuration can be adopted instead that compressed air is charged in the column-like member 221 and it is instantaneously released or an air bag is accommodated therein and the air bag is inflated rapidly to generate repelling force.

Figure 19A:
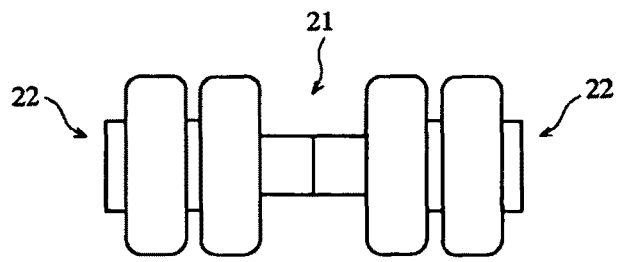
FIG. 19 is a plan view showing one example of a connecting apparatus and a repelling apparatus utilizing wind force.

FIG. 19A is diagram representing still another example of the connecting device 21 and the repelling device 22.

In this example, the connecting device 21 is formed between both vehicles, and repelling devices 22 are formed on outsides of both the vehicle.

The connecting device 21 may be any device which can perform disconnection at a time of emergency, such as a device where attraction is conducted by an electromagnet or a device where connection is performed mechanically.

On the other hand, a wing member is accommodated in the repelling device 22 in a folded manner and the wing member is spread in a vehicle side face direction by an instruction of the repelling instructing section 167 at a time of emergency.

Figure 19B:
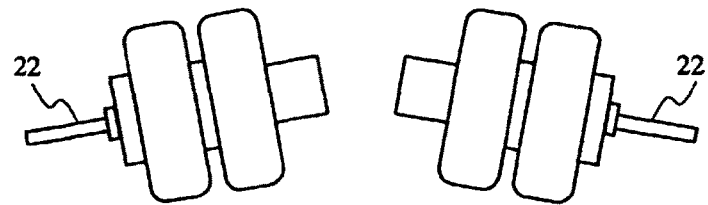

FIG. 19B is a diagram representing a state where both the vehicles have been remote from each other at a time of emergency.

Connection of the connecting device 21 is disconnected by an instruction from the division instructing section 166 at a time of emergency and the wing member of the repelling device 22 is spread by an instruction of the repelling instruction section 22.

Since wind force acts on the wind members in a direction opposite to an advancing direction of the vehicles, torques are generated to the vehicles so that advancing tracks of both the vehicle are changed in directions in which the vehicles become remote from each other. Thereby, both the vehicles become remote each other. Further, since the vehicles are decelerated due to wind pressure so that safety is further improved.

Figure 20:
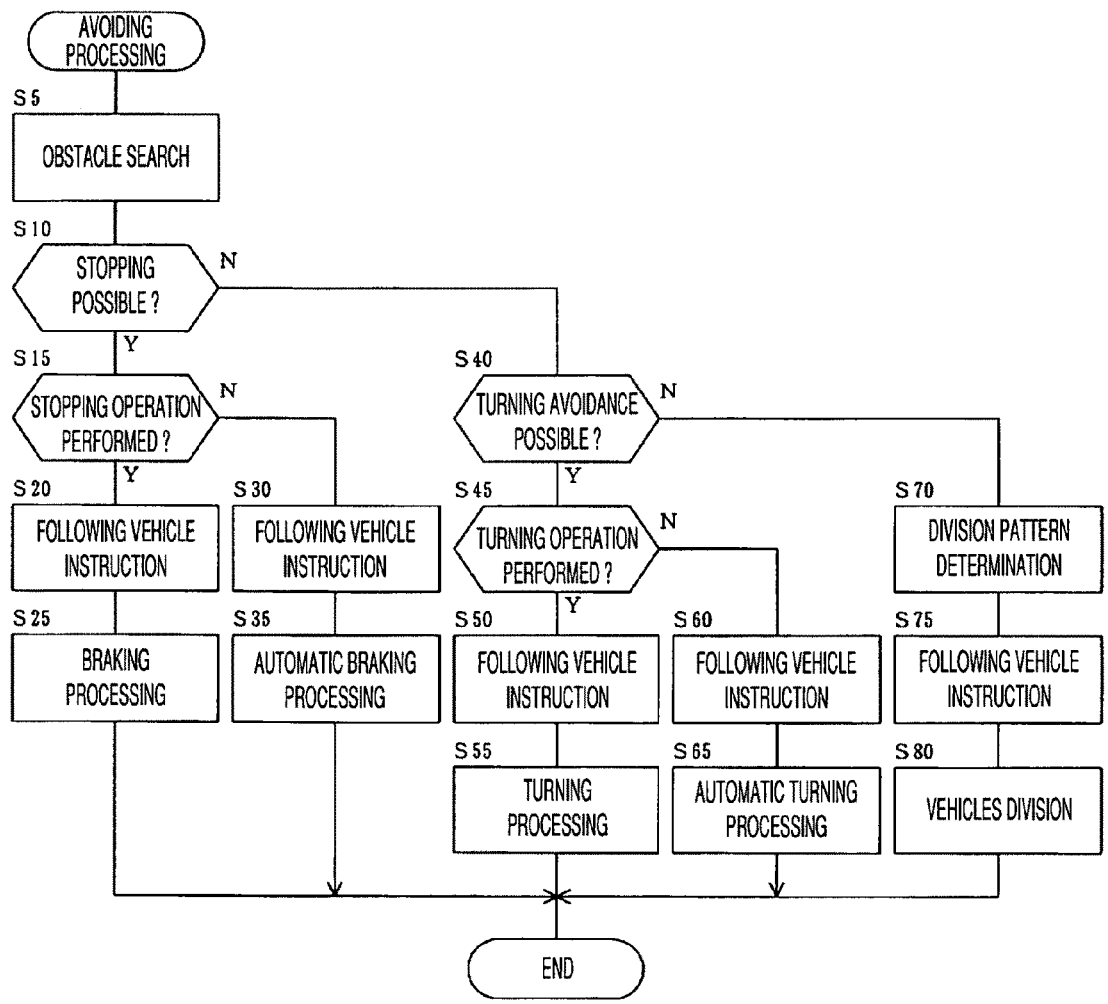
FIG. 20 is a flowchart for explaining a procedure for a host vehicle to release connection of integrated vehicles to avoid collision against an obstacle.

Next, a collision avoiding control procedure performed by the host vehicle 1 for canceling connection of the integrated vehicles 500 to avoid collision against an obstacle 300 will be explained with reference to a flowchart shown in FIG. 20.

The following processing is performed by the main control device 161 of the host vehicle 1 according to a collision avoiding program.

First, the main control device 161 detects an obstacle by a signal from the obstacle detecting sensor 20 in the own vehicle or signals from the obstacle detecting sensors 20 in the following vehicles 2 to 4 (step 5).

Next, the main control device 161 determines whether or not the integrated vehicles 500 can stop before collision by braking conducted by a brake using a position of an obstacle 300, a relative moving speed thereto, and the like (step 10).

When the integrated vehicles can stop (step 10; Yes), the main control device 161 waits for a stop operation performed by a driver for a predetermined time.

When a stop operation by the driver issues (step 15; Yes), the main control device 161 instructs the following vehicles 2 to 4 to stop (step 20) and further performs braking processing regarding the own vehicle (step 25).

The following vehicles 2 to 4 also perform braking processing by a stop instruction from the host vehicle 1 so that the integrated vehicles 500 stop before collides against the obstacle 300.

When the stopping operation has not been performed by a driver within the predetermined time at step 15 (step 15; No), the main control device 161 instructs the following vehicles 2 to 4 to conduct braking processing (step 30), and the main control device 161 itself performs braking processing automatically (step 35).

Thereby, even if the driver has not conducted stopping operation, the integrated vehicles 500 can stop before colliding against the obstacle 300.

On the other hand, when it is determined that collision avoidance cannot be achieved by stopping depending on brake operation (step 10; No), the main control device 161 further determines whether or not collision against the obstacle 300 can be avoided by turning the integrated vehicles 500 to change an advancing direction (step 40).

When it is determined that avoidance depending on the turning is possible (step 40; Yes), the main control device 161 waits for turning operation conducted by the driver for a predetermined time.

When turning operation is performed by the driver (step 45; Yes), the main control device 161 instructs the following vehicles 2 to 4 to turn (step 50), and it further performs turning processing regarding the own vehicle (step 55).

The following vehicles 2 to 4 also conducts turning processing according to turning instruction from the host vehicle 1 and the integrated vehicles 500 can turn before it collides against the obstacle 300 to avoid the same.

When the driver has not conducted the turning operation within the predetermined time (step 45; No), the main control device 161 instructs the following vehicles 2 to 4 to conduct turning processing (step 60) and the main control device 161 itself conducts turning processing automatically (step 65).

Thereby, even if the driver has not conducted turning operation, the integrated vehicles 500 can turn before they collide against the obstacle 300.

On the other hand, when it is determined at step 40 that the integrated vehicles 500 cannot avoid collision by turning operation (step 40; No), the main control device 161 determines a division pattern of the integrated vehicles 500 (step 70).

The division pattern is determined according to any one of the repelling devices 22 provided on the integrated vehicles 500 which should be activated, and such a pattern that respective vehicles do not collide against the obstacle is determined by the main control device 161 from an advancing direction of the integrated vehicles 500 and the position of the obstacle, as shown in FIG. 13 or FIG. 14.

More specifically, the main control device 161 stores, in a database, collision patterns having a collision site of the integrated vehicles 500, a collision direction, a speed to an obstacle, and the like and a division pattern corresponding thereto. The main control device 161 predicts a collision site, a collision direction, and the like using the position of the obstacle and the vehicle speed to the obstacle obtained from the obstacle detecting sensor 20 and it matches them to the database to determine a division pattern.

After determines the division pattern, the main control device 161 instructs regarding division and repellence to the respective following vehicles 2 to 4 (step 75).

Regarding the division, each vehicle is instructed so as to disconnect connection utilizing the connecting device 21, and regarding the repellence, the following vehicle connected is instructed so as to exert repellence at a site requiring repellence in the division pattern.

After issuing instruction about the division and repellence, the main control device 161 disconnects the connecting devices 21 in the own vehicle and activates the repelling device 22 in the own vehicle if necessary (step 80).

The following vehicles 2 to 4 also disconnect the connecting devices 21 according to an instruction from the host vehicle 1 and further activate the repelling devices 22 if instructed.

The main control device 161 can avoid collision of the integrated vehicles 500 against the obstacle according to any one of the braking processing (step 25), the automatic braking processing (step 35), the turning processing (step 55), the automatic turning processing (step 65), and the vehicle division (step 80).

Next, modified embodiment of the formation of the integrated vehicles will be explained with reference to respective figures of FIG. 21.

FIG. 21A is a diagram showing an example where the host vehicle 1 and the following vehicles 2 to 4 are aligned in one line and connected in an advancing direction of the vehicles.

By arranging respective vehicles in one line in this manner, the vehicles can move easily even on a road with a narrow width or a congested road.

In this example, the connecting portions are provided at four portions arranged in a lengthwise direction, but when an obstacle advances from a side face of the integrated vehicles, the host vehicle 1 predicts the connecting portion against which the obstacle 300 collides to activate the repelling device 22 positioned at the site.

It is unnecessary to disconnect the connecting devices 21 at sites other than the site where the repelling device 22 has been activated, but when disconnection is performed, after the repelling devices 22 have been activated, disconnection is performed. Thereby, repelling force is transmitted to all the vehicles.

FIG. 21B shows an example where the following vehicles 2 to 4 are arranged in one line in a perpendicular direction to an advancing direction and the host vehicle 1 is disposed in front of the following vehicles 2 to 4.

In this formation, occupants in the following vehicles 2 to 4 can take communication with one another and a driver in the host vehicle 1 can concentrate on driving.

In this case, when an obstacle is found at the front of the formation, the host vehicle 1 activates the repelling device 22 positioned on one of a side of the following vehicle 2 and the following vehicle 3 or a side of the following vehicle 3 and the following vehicle 4 which has higher possibility of colliding against the obstacle.

Incidentally, when connection between the host vehicle 1 and the following vehicle 3 is disconnected before repelling, repelling force does not act on the host vehicle 1, so that after repelling force acts on the following vehicle 3, the host vehicle 1 disconnects the host vehicle 1 and the following vehicle 3.

On the other hand, when an obstacle advances from a side face direction, the host vehicle 1 activates the repelling device 22 positioned between the host vehicle 1 and the following vehicle 3. In this case, when connection between the following vehicle 3 and the following vehicle 2, and connection between the following vehicle 3 and the following vehicle 4 are disconnected, repelling force does not act on the following vehicle 2 and the following vehicle 4, so that after repelling devices 22 are activated, the host vehicle 1 disconnects connection of the following vehicle 2 and connection of the following vehicle 4.

FIG. 21C is a diagram showing one example where the host vehicle 1 and the following vehicles 2 to 4 are arranged in one line perpendicular to an advancing direction of the vehicles.

In this formation, occupants in the host vehicle 1 and the following vehicles 2 to 4 can have communication.

In this example, four connecting portions are disposed in a direction perpendicular to an advancing direction of the vehicle, but when an obstacle is found at the front of the formation, the host vehicle 1 predicts the connecting portion against which the obstacle collides to activate the repelling device 22 positioned at the site.

It is unnecessary to disconnect the connecting devices 21 at sites other than the site where the repelling device 22 has been activated, but when disconnection is performed, after the repelling devices 22 have been activated, disconnection is performed. Thereby, repelling force is transmitted to all the vehicles.

Though the second embodiment has been explained above, these collision avoiding methods are applicable to a case that the host vehicle 1 and the following vehicles 2 to 4 are linked with each other through software.

In this case, for example, repelling force is generated by expanding airbags between adjacent vehicles to push the airbags against each other. The following effects can be obtained by the second embodiment explained above.

(1) Collision of a vehicle and an obstacle against each other can be avoided by performing division/separation of integrated vehicles before collision against the obstacle.

(2) Collision can be avoided by performing division/separation by a method other than frictional force of tires to instantaneously change a direction of vehicles.

(3) A repelling device effective for collision avoidance can be selectively activated by predicting a collision site of a vehicle from a position of an obstacle and a relative vehicle speed to the obstacle.

(4) Division/separation can be performed simultaneously and with obstacle finding by utilizing force directly acting between vehicles mutually, such as elastic force, magnetic force, explosion force, or wind force, as repelling force.

(5) Setting and changing a formation of integrated vehicles such as a formation for moving on a narrow road or a formation taking communication among vehicles can be made possible flexibly for any purpose.

(3-1) Next, a Third Embodiment Will be Explained

The third embodiment relates to a vehicle, for example, independent moving of a portion separated from a vehicle.

(3-2) Background Art in the Third Embodiment

According to increase of families owning a car, opportunities where a driver moves together with members of his/her family, relatives, or people living in the neighborhood increases, and vehicles which can accommodate many people, such as a five-seat car or a seven-seat wagon car gain in popularity.

On the other hand, a single-seat vehicle on which a driver rides alone has been developed. Especially, attention is paid to inverted-pendulum vehicles where a driver rides on a driving wheel disposed above one axis, which move while being balanced like a unicycle. These inverted-pendulum vehicles holds the balance using, for example, a principle of a wheel-type inverted pendulum, and one example of a technique for the balance is disclosed in the following Patent Literature 3.
Patent Literature 1: JP-A-2005-094898

In a case of a conventional vehicle for a large group, for example, such a case that only one person rides on the vehicle for commuting occurs frequently. In such a case, the vehicle must move with a weight of about 2 tons for only the person and the person moves together with a boarding space corresponding to the many people, which results in wastefulness in view of efficiency. Owning not only a car for a large group but also a small-sized car or a single-seat vehicle in preparation for movement with a small group results in deterioration in efficiency in view of a purchase cost, a maintenance cost, and a parking space.

In view of these circumstances, an object of the third embodiment is to separate a driver seat portion from a vehicle for a large group so that the driver seat portion can move independently.

(3-3) The Following Configuration is Adopted for Solving the above Problem in the Third Embodiment (a) The above object is achieved by providing a vehicle having a main body vehicle and an independent vehicle which can be separated from the main body vehicle to move independently, where the independent vehicle is provided with steering means, independent vehicle driving means steered by the steering means, independent vehicle side connecting means connected to the independent vehicle, and moving demand transmitting means which transmits a moving demand caused by the steering means to the main body vehicle during connection, wherein the main body vehicle is provided with main body vehicle side connecting means connected to the independent vehicle, moving demand receiving means which receives the moving demand transmitted during connection, and main body vehicle driving means steered by the received moving demand.

(b) The vehicle with the abovementioned configuration (a) is characterized in that the independent vehicle is provided with a driving wheel disposed on one axis and a boarding portion disposed above the driving wheel, wherein the independent vehicle driving means drives the driving wheel according to a moving demand by the steering means while maintaining an attitude of the boarding portion.

(c) The vehicle in the abovementioned configuration (a) or (b) is characterized in that the independent vehicle side connecting means and the main body vehicle side connecting means perform connection and disconnection by a mechanical connecting mechanism.

(d) The vehicle in the abovementioned configuration (a) or (b) is characterized in that the independent vehicle side connecting means and the main body vehicle side connecting means perform connection and disconnection by electromagnetic binding force.

(e) The abovementioned object is achieved by providing a independent vehicle which can be connected to and disconnected from a main body vehicle driven using a moving demand, where the independent vehicle is provided with steering means, independent vehicle driving means steered by the steering means, independent vehicle side connecting means connected to the main body vehicle, and moving demand transmitting means which transmits a moving demand caused by the steering means to the main body vehicle during connection.

(f) The abovementioned object is achieved by providing a main body vehicle which can be connected to and disconnected from an independent vehicle transmitting a moving demand, where the main body vehicle is provided with main body vehicle side connecting means for connecting with the independent vehicle, moving demand receiving means for receiving a moving demand transmitted from the independent vehicle during connection, and main body vehicle driving means steered according to the moving demand received.

(3-4) Effect of Third Embodiment

According to the third embodiment, a driving seat portion can be separated from a vehicle for a large group to be caused to move independently.

(3-5) Brief Overview of Third Embodiment

A driving seat portion comprises an independent vehicle which can be separated from and connected to a vehicle main body, and a main body vehicle other than a driver seat comprises the same configuration as that of an ordinary passenger vehicle. The independent vehicle comprises, for example, an inverted-pendulum vehicle and it can be separated from the main body vehicle to move independently.

When a driver utilizes the vehicle alone, the independent vehicle is disconnected from the main body vehicle to move independently, and when the vehicle is utilized by a large group, the independent vehicle and the main body vehicle are connected so that the connected vehicles are utilized as an ordinary vehicle.

The independent vehicle and the main body vehicle are each provided with a driving mechanism and a control mechanism, and when the independent vehicle and the main body vehicle run in a connected (integrated) manner, the main body vehicle performs drive/control based upon a moving demand issued by the independent vehicle.

By configuring a vehicle to be separable and joinable in this manner, one vehicle can be employed by two using methods of independent moving of using one vehicle as a single-seat vehicle and linkage moving of a car for a large group, so that reduction of employment cost and high efficiency of use energy can be achieved.

(3-6) Details of Third Embodiment

A vehicle according to the third embodiment will be explained in detail below with reference to FIG. 22 to FIG. 28.

FIG. 22 is a diagram representing an employment state of a vehicle or the like according to the third embodiment.

Figure 22A:
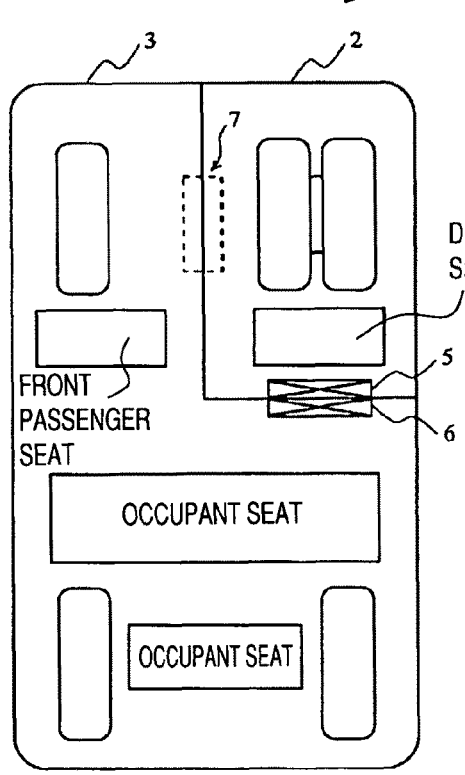
FIG. 22 is a diagram for explaining an operating method of a vehicle in a third embodiment.

As shown in FIG. 22A, a vehicle 1 comprises an independent vehicle 2 provided with a driver seat and a main body vehicle 3 provided with a front passenger seat and a passenger seats (rear seats).

The main body vehicle 3 is provided with an accommodating space 4 for assembling the independent vehicle 2, and the independent vehicle 2 is accommodated in the accommodating space 4 so that it is integrated to the main body vehicle 3.

The independent vehicle 2 is provided with a connecting device 5 behind a driver seat.

On the other hand, the main body vehicle 3 is also provided with a connecting device 6 at a position corresponding to the connecting device 5 of the independent vehicle 2.

These connecting devices 5, 6 can be connected to and disconnected from each other, and FIG. 22A represents a state where the connected devices have been connected to each other.

Incidentally, installation positions of the connecting devices 5, 6 are shown as one example, and, for example, the connecting devices 5, 6 may be provided at a side face site 7 of the independent vehicle 2 and the accommodating space 4, or they may be provided at both of a side behind the driver seat and a side face site 7.

When the independent vehicle 2 and the main body vehicle 3 are connected to each other, the driving wheel of the independent vehicle 2 functions as a front wheel of the vehicle 1.

Figure 22B:
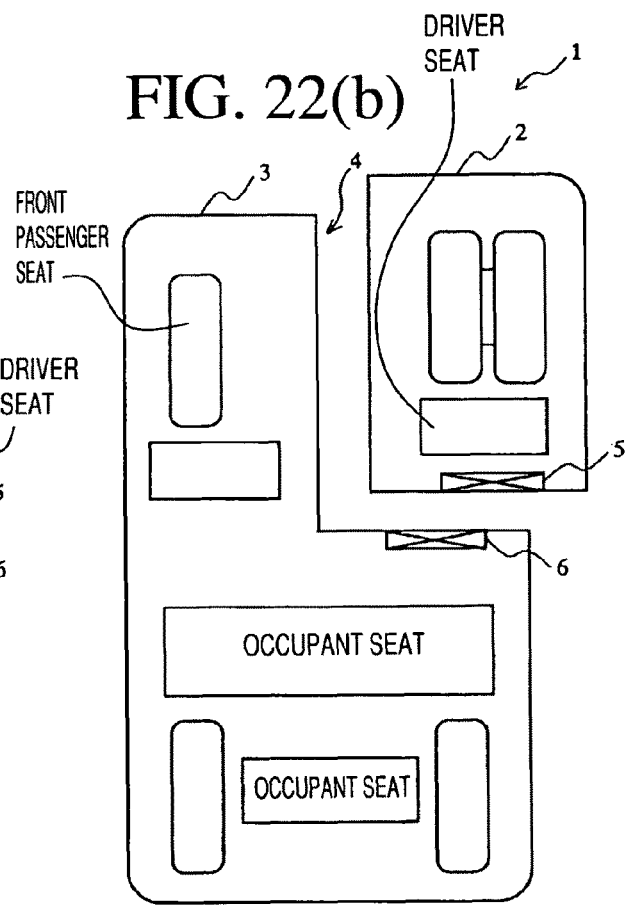

FIG. 22B is a diagram representing a state that the independent vehicle 2 has been separated from the main body vehicle 3.

As shown in FIG. 22B, by disconnecting the connecting device 5 and the connecting device 6 from each other, the independent vehicle 2 is disconnected from the vehicle 1 and the independent vehicle 2 can move independently while the main body vehicle 3 is left parked.

By adopting a configuration where the independent vehicle 2 can be separated from the main body vehicle 3 to move independently in this manner, when a driver moves alone for shopping or the like, the independent vehicle 2 is disconnected from the main body vehicle 3 to be utilized, and when plural persons move, the independent vehicle 2 and the main body vehicle 3 can be connected (integrated) to each other to be utilized as the vehicle 1.

One example of an appearance configuration of the independent vehicle in the third embodiment is as explained in FIG. 2 and the first embodiment.

Incidentally, an axle of driving wheels 11a, 11b in the third embodiment is rotated about an inverted direction in left and right directions relative to a vehicle body of the independent vehicle 2, and when the independent vehicle 2 is connected to the main body vehicle 3, the driving wheels 11a, 11b are rotated in a turning direction in synchronism with the front wheel of the main body vehicle 3 at a time of tuning.

On the other hand, when the independent vehicle 2 has been disconnected from the main body vehicle 3, the independent vehicle 2 is turned without rotating the axle of the driving wheels 11a, 11b by making the rotation number of one of the driving wheels 11a, 11b which is positioned on the side of a turning direction less than that of the other. Turning may be performed by performing weight movement of an occupant or providing a mechanism for moving the gravity center of the independent vehicle to lean the vehicle body in a turning direction.

Further, since the case that the independent vehicle 2 together with the main body vehicle 3 moves in a connection manner becomes heavier in vehicle weight than the case where the independent vehicle 2 moves independently, the former case becomes larger in kinetic energy than the latter case. Therefore, a brake system provided for the driving wheels 11a, 11b has a structure which can endure a load at a time of connection with the main body vehicle 3.

A steering apparatus 15 is disposed on the left side of the boarding portion 13. The steering apparatus 15 is steering means for issuing instructions for acceleration, deceleration, turn, rotation, stop, braking, and the like of the inverted-pendulum vehicle during independent moving and performing steering of the vehicle 1 during connection moving by operation of a driver.

Further, though not illustrated, a connecting device 5 is disposed behind the independent vehicle 2.

Further, an inter-vehicle interface for connection of a signal cable for transmitting a moving demand from steering of a driver to the main body vehicle 3 side is disposed near the connecting device 5. Incidentally, the inter-vehicle interface may be incorporated into the connecting device 5.

Next, the connecting device 5 and the connecting device 6 will be explained.

Figure 23A:
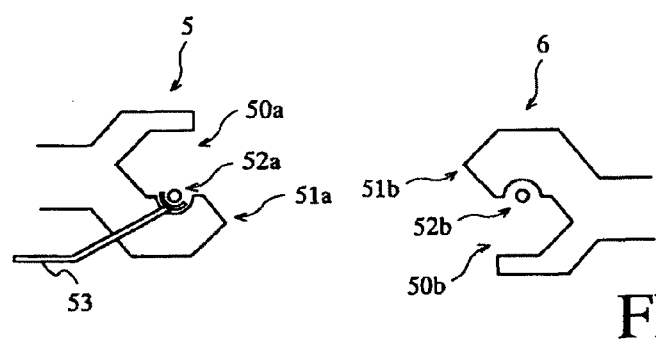
FIG. 23 is a diagram showing an example of an aspect of a connecting apparatus.

FIG. 23A is a diagram representing one example of the connecting device 5 and the connecting device 6.

The connecting devices 5, 6 have a configuration similar to a connecting device used for connection of a train or the like.

The connecting device 5 and the connecting device 6 configure connecting means for performing connection and disconnection by a mechanical connecting mechanism, and the connecting device 5 corresponds to independent vehicle side connecting means, while the connecting device 6 corresponds to main body vehicle side connecting means.

The connecting device 5 is formed with a recessed portion 50a, a protrusion portion 51a, and a swivel 52a. On the other hand, the connecting device 6 is also formed with a recessed portion 50b, a protrusion portion 51b, and a swivel 52b.

The recessed portion 50a and the protrusion portion 51b face each other, and the protrusion portion 51a and the recessed portion 50b face each other, respectively, so that positioning is achieved at a time of connection between the connecting device 5 and the connecting device 6 by fitting these portions to each other.

Further, shaft members of the swivel 52a and the swivel 52b are positioned coaxially at a time of connection, so that the connecting device 5 and the connecting device 6 can be fixed by turning a release lever 53 down to a closing side. On the other hand, fixation of the shaft members is cancelled by turning the releasing lever 53 to an opening side, so that the connecting device 5 and the connecting device 6 can be disconnected from each other.

Incidentally, in the third embodiment, fixation and release of the swivels 52a, 52b are performed manually using the releasing lever 53, but such a configuration can be adopted that the releasing lever 53 is automatically opened and closed using external force such as hydraulic pressure or electromagnetic force.

Further, the connecting device 5 and the connecting device 6 may be other mechanisms, and another mechanical connecting mechanism provided with a positioning mechanism for positioning the connecting device 5 and the connecting device 6 and a locking mechanism for locking the connecting device 5 and the connecting device 6 at positions where the connecting device 5 and the connecting device 6 have been positioned can be adopted.

Figure 23B:
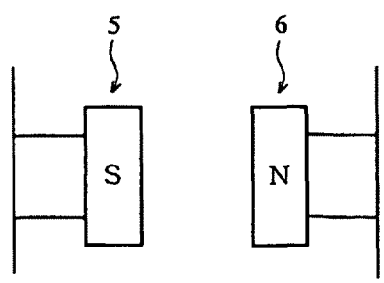

FIG. 23B is a diagram representing another example of the connecting device 5 and the connecting device 6.

The connecting device 5 and the connecting device 6 configure connecting means for performing connection and disconnection by electromagnetic binding force, and the connecting device 5 corresponds to independent vehicle side connecting means, while the connecting device 6 corresponds to main body vehicle side connecting means.

Both the connecting device 5 and the connecting device 6 are electromagnets, where magnetic poles face each other. Both currents supplied to the connecting device 5 and the connecting device 6 are controlled by a control unit 16 of the independent vehicle 2.

When the independent vehicle 2 is connected to the main body 3, the control unit 16 forms different magnetic poles in the connecting device 5 and the connecting device 6, and the independent vehicle 2 and the main body vehicle 3 are connected to each other by attracting force generated by the different magnetic poles. Incidentally, though not illustrated, a mechanism for positioning the connecting device 5 and the connecting device 6 is provided between the independent vehicle 2 and the main body 3, so that the magnetic poles of the connecting device 5 and the connecting device 6 face each other.

When the independent vehicle 2 is disconnected from the main body vehicle 3, the main control device in the independent vehicle 2 stops a current supplied to at least one of the connecting device 5 and the connecting device 6 to eliminate attracting force between the magnetic poles.

Incidentally, when the magnetic pole of one of the connecting device 5 and the connecting device 6 is configured so as to be reversed, repelling force is generated between the connecting device 5 and the connecting device 6 so that disconnecting of the independent vehicle 2 is easier.

Further, such a configuration can be adopted that a mechanism for temporarily connecting the independent vehicle 2 and the main body vehicle 3 mechanically is provided in addition to the connecting device 5 and the connecting device 6, current supplied to the connecting device 5 and the connecting device 6 is stopped and the independent vehicle 2 and the main body vehicle 3 are connected by the temporary connecting device during non-activation of the vehicle 1. In this case, current is not supplied to the connecting device 5 and the connecting device 6 during non-activation of the vehicle 1 so that power consumption can be suppressed.

Figure 24:
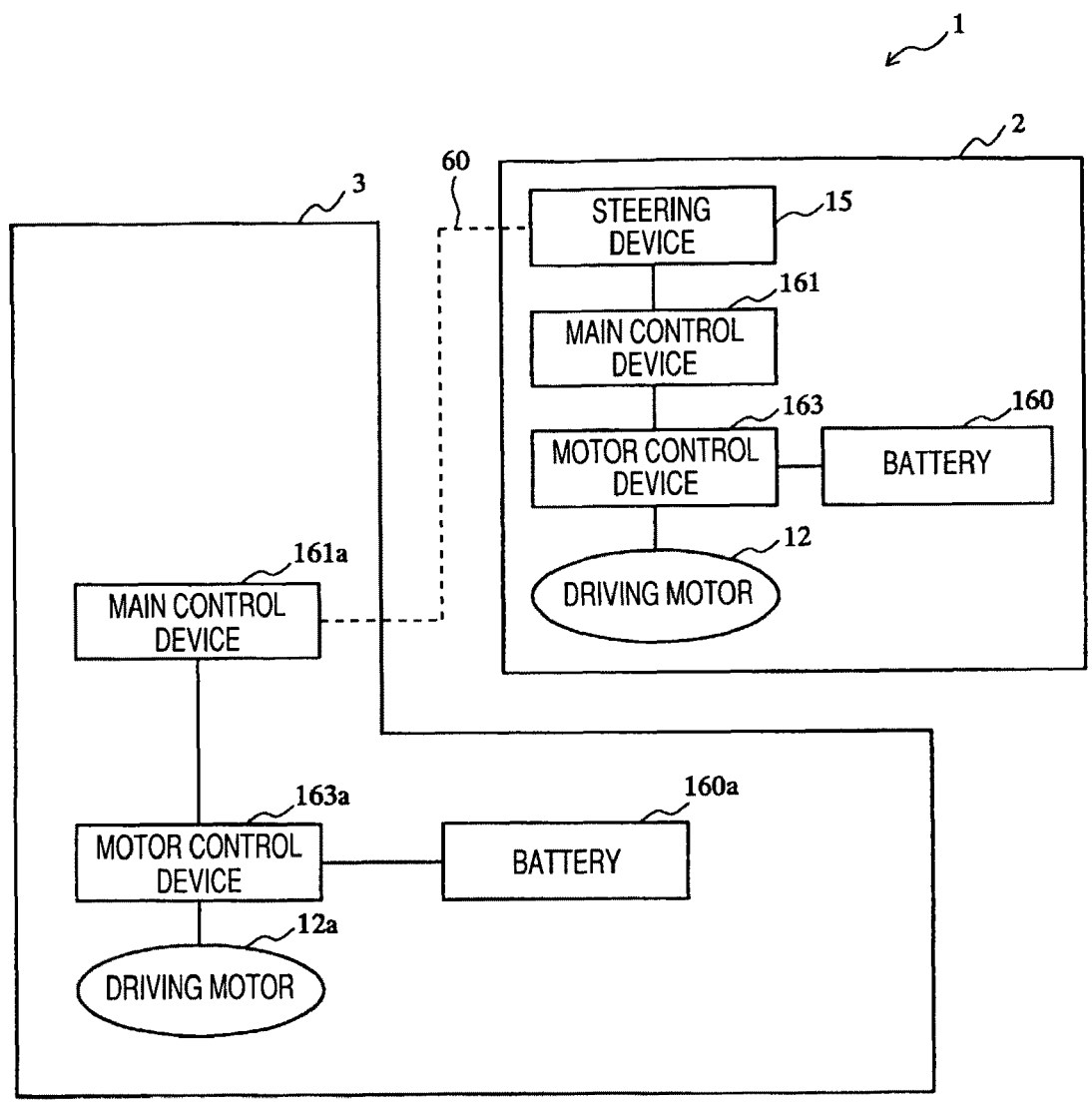
FIG. 24 is a system diagram showing one example of an electric control system of a vehicle.

FIG. 24 is a system diagram showing one example of an electrical control system for the vehicle 1.

The independent vehicle 2 is provided with a steering apparatus 15, a main control device 161, a motor control device 163, a battery 160, and a driving motor 12.

On the other hand, the main body vehicle 3 is provided with a main control device 161a, a motor control device 163a, a battery 160a, and a driving motor 12a.

When the independent vehicle 2 and the main body vehicle 3 are connected to each other, the steering apparatus 15 and the main control device 161a are connected to each other by a signal cable 60, and when the independent vehicle 2 is disconnected from the main body vehicle 3, the signal cable 60 is disconnected.

The steering apparatus 15 is connected to the main control device 161 and it is disposed to be connectable to the main control device 161a.

When a driver performs steering operation, the steering apparatus 15 transmits a moving demand (steering information) such as acceleration, deceleration, turning, rotation, stop, braking, or the like to the main control device 161 or the main control device 161a (when the independent vehicle 2 and the main body vehicle 3 are connected).

When the main body vehicle 3 have been disconnected from the main body vehicle 3, a driver performs steering of the independent vehicle 2 using the steering apparatus 15, and when the independent vehicle 2 and the main body vehicle 3 have been connected, the driver can steer the whole vehicle 1 using the steering apparatus 15.

The main control device 161 has an independent mode applied when the independent vehicle 2 moves independently and a connection mode applied when the independent vehicle 2 is connected to the main body vehicle 3 to move as the vehicle 1.

In case of the independent mode, the main control device 161 performs control such that the independent vehicle 2 operates as the inverted-pendulum vehicle, and in case of the connection mode, the main control device 161 perform control in a coordinated manner with the main control device 161*a* such that the independent vehicle 2 operates as a portion of the vehicle 1.

A difference in operation of the main control device 161 in both modes will be described more specifically, for example, in the following manner.

In case of the independent mode, the main control device 161 controls so as to balance of the independent vehicle 2. Torque control at a time of acceleration/deceleration is control according to a vehicle weight of the independent vehicle 2. Turning is performed by generating a difference in rotation number between the driving wheels 11*a* and 11*b*.

On the other hand, in case of the connection mode, the main control device 161 is not required to hold balance of the independent vehicle 2. Further, the torque control at a time of the acceleration/deceleration is control according to a weight of the independent vehicle 2 plus the main body vehicle 3. Furthermore, turning is performed by synchronizing the driving wheels 11*a*, 11*b* with the front wheel of the main body vehicle 3 to direct in a turning direction.

The motor control device 163 is a device for generating AC current from DC current, and it performs conversion of DC current supplied by the battery 160 according to an instruction from the main control device 161 to act as an AC power source outputting AC current with predetermined phase, frequency, and voltage.

The driving motor 12 is driven by power supplied from the motor control device 163 to drive the driving wheels 11*a*, 11*b*.

On the other hand, the main control device 161*a* in the main body vehicle 3 controls the motor control device 163*a* according to a moving demand transmitted from the steering apparatus 15 via the signal cable 60 at a time of connection. Thereby, the driving motor 12*a* is controlled.

Incidentally, though not illustrated, the main control device 161*a* performs not only control of the motor control device 163*a* but also various controls required for operation of the vehicle 1 on the side of the main body vehicle 3, such as turning of the front wheel, braking of each wheel, lighting-up/lighting-off of an indicating lamp such as a tail lamp.

In the third embodiment, the driving motor 12*a* is disposed on only the front wheels, and when the main body vehicle is integrated with the independent vehicle 2 to move as the vehicle 1, a front drive vehicle is configured.

Incidentally, a four-by-four vehicle may be configured by further disposing a driving motor 12*a* to each of the rear wheels.

In this case, the main control device 161*a* performs drive control on the rear wheels. Further, such a configuration can be adopted that the rear wheels are made to be able to turn and an angle of both the rear wheels (driving wheels) together with an angle of the front wheels (driving wheels) is controlled by the main control device 161*a*.

Figure 25:
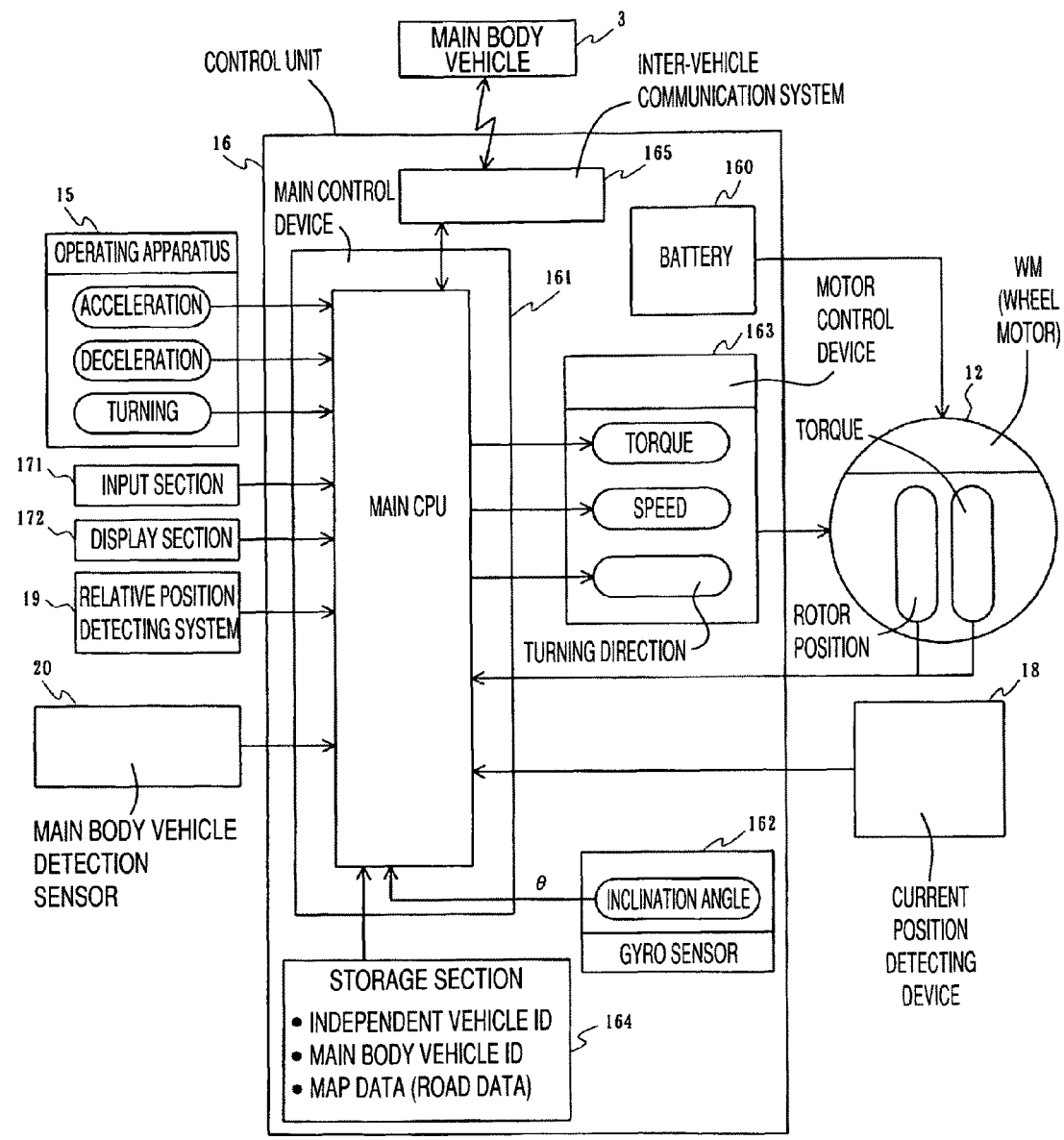
FIG. 25 is a diagram representing a configuration of a control unit in an independent vehicle.

FIG. 25 is a diagram representing a configuration of the main control device 161 in the independent vehicle 2.

The main control device 161 includes both a function (independent moving mode) for performing inverted-pendulum moving when the independent vehicle 2 moves as an independent vehicle and a function (connection mode) where the independent vehicle 2 moves as the vehicle 1 in a coordinated manner with the main body vehicle 3 during connection with the main body vehicle 3. Respective constituent elements configuring the main control device 161 will be explained below.

The control unit 16 is provided with a battery 160, a main control device 161, a gyro sensor 162, a motor control device 163, a storage section 164, and an inter-vehicle interface 165.

The battery 160 supplies power to the driving motor 12. Further, the battery 160 also supplies a power source with a low voltage for control to the main control device 161.

The main control device 161 is provided with a main CPU, and it is configured using a computer system provided with a ROM where various programs or data have been stored, a RAM used as a working area, an external storage device, an interface section and the like (not shown).

Various programs such as an attitude control program holding an attitude of an inverted-pendulum vehicle and a moving control program controlling moving based upon various instruction signals from the steering apparatus 15 are stored in the ROM (or the storage section 164), and the main control device 161 executes the various programs to conduct corresponding processings.

Incidentally, the attitude control program is executed during the independent mode. Further, the moving control program has both a control algorism for independent mode and a control algorism for connection mode, and it executes the control algorism for independent mode during independent moving, while executing the control algorism for connection mode during connection moving.

The gyro sensor 162 is used for performing inverted-pendulum moving during independent mode and it functions as an attitude sensing sensor for sensing an attitude of the boarding portion 13.

The gyro sensor 162 detects an angular acceleration and an inclination angle θ of the boarding portion 13 as physical quantity based upon an inclination of the boarding portion 13.

The main control device 161 recognizes an inclination direction from the inclination angle detected by the gyro sensor 162.

Incidentally, the gyro sensor 162 in the third embodiment detects an angular acceleration and an inclination angle to supply them to the main control device 161, but it may detect only the angular acceleration.

In this case, the main control device 161 accumulates angular velocities supplied from the gyro sensor 162, thereby calculating an angular acceleration and an angle to acquire an inclination angle.

Further, various sensors outputting a signal according to an angular acceleration when the boarding portion 13 such as a liquid rotor type angular accelerometer or an eddy current type angular accelerometer inclines may be used as the attitude sensing sensor besides the gyro sensor 162.

Instead of a pendulum in a servo type accelerometer, the liquid rotor type angular accelerometer detects motion of liquid to measure an angular acceleration from a feedback current when motion of the liquid is balanced by a servo mechanism. On the other hand, the angular accelerometer utilizing an eddy current is provided by configuring a magnetic circuit using a permanent magnet and disposing a cylindrical rotor made of aluminum in the circuit, and it detects an angular acceleration based upon magnetic electromotive force generated according to change of a rotating speed of the rotor.

The motor control device 163 controls the drive motor 12.

That is, the motor control device 163 controls the drive motor 12 according to respective instruction signals of a drive torque, a speed, and a rotation direction supplied from the main control device 161.

The main control device 161 operates based upon a moving demand from the steering apparatus 15, it controls the motor control device 163 according to a moving demand during independent mode, while it controls the motor control device 163 according to a moving demand during connection mode, and it further transmits a moving demand to the main body vehicle 3 via the inter-vehicle interface 165. The main control device 161 and the inter-vehicle interface 165 configure moving demand transmitting means.

Control on the motor control device 163 is performed by transmitting respective instruction signals of drive torque, a speed, and a rotation direction to the motor control device 163.

The motor control device 163 is provided with a torque-current map for independent mode and a torque-current map for connection mode for the driving motor 12.

The motor control device 163 performs control so as to output a current corresponding to drive torque supplied from the main control device 161 to the driving motor 12 according to the torque-current map corresponding to a moving mode.

Incidentally, during independent mode, drive torque supplied from the main control device 161 is a torque instruction value T for attitude control when the vehicle is stopping and a value obtained by adding/subtracting the torque instruction value T to/from a torque instruction value according to a drive demand of a driver while the vehicle is moving.

At a time of connection mode, torque for attitude control is not required, so that drive torque responding to a drive demand from a driver is supplied from the main control device 161.

Incidentally, the motor control device 163 and the driving motor 12 configure independent vehicle driving means.

Various data items such as a independent vehicle ID which is an identification number of an own vehicle, a main body vehicle ID which is an identification number of a main body vehicle, and map data (road data) are stored in the storage section 164 as various information items required for connection moving with the main body vehicle 3.

The independent vehicle ID is a number for the main body vehicle 3 to identify the independent vehicle 2. The main body vehicle 3 can identify the independent vehicle 2 to be connected owing to the independent vehicle ID.

Thereby, such a configuration can be adopted that, when another independent vehicle which does not belong to the vehicle 1 is connected to the vehicle 1, the main body vehicle 3 recognizes such a fact that it is not controlled by the other vehicle. Similarly, when the independent vehicle 2 is connected to another main body vehicle which does not belong to the vehicle 1, it can detect such a fact.

The inter-vehicle interface 165 is an interface for transmitting a moving demand to the main body vehicle 3. The inter-vehicle interface 165 is provided with a connector for connecting a signal cable 60 (see FIG. 24), so that the signal cable 60 is connector-connected to the inter-vehicle interface 165 manually or automatically at a time of connection with the main body vehicle 3.

Incidentally, the main control device 161 not only transmits a moving demand to the main body vehicle 3 via the inter-vehicle interface 165 but also can receive information for grasping a current status of the main body vehicle 3, such as occurrence state of torque or an angle of steering, from the main body vehicle 3 in real time, and it can also perform feedback control such as transmission of a moving demand according to a state of the main body vehicle 3.

Incidentally, in the third embodiment, a moving demand is transmitted through a wired communication using the signal cable 60, but such a configuration can be adopted that a moving demand is transmitted through wireless communication using radio wave or infrared ray.

When such a configuration is adopted in this manner that the independent vehicle 2 and the main body vehicle 3 perform wireless communication, an instruction is transmitted to the main body vehicle 3 before connection with the independent vehicle 2, so that remote control such as activation of the main body vehicle 3 is made possible before the connection, for example.

The input section 171 is disposed in the display/operation section 17 (see FIG. 2), and it functions as input means for inputting various data, or instruction and selection.

The input section 171 comprises a touch panel and exclusive selection buttons disposed on the display section 172. Regarding the touch panel portion, a position pressed (touched) by a passenger is detected corresponding to various selection buttons displayed on the display section 172 so that selection content is acquired from the pressed position and the display content thereof.

The display section 172 is disposed on the display/operation section 17. Buttons to be selected or inputted from the input section 171, explanation, and the like are displayed on the display section 172.

As the selection buttons displayed on the display section 172, various buttons such as, for example, a moving position (arrangement relationship) selection button are displayed.

A current position detecting device 18 is for detecting a current position (an absolute coordinate value having a latitude and a longitude) of a vehicle, and one or more of a GPS (Global Positioning System) receiving device for measuring a position of a vehicle utilizing an artificial satellite, a geomagnetic sensor which detects geomagnetism to obtain an orientation of a vehicle, a gyro sensor, a vehicle speed sensor and the like are used.

Road width information is acquired by specifying a road on which a vehicle is currently moving from a current position detected by the current position detecting device 18 and map data in the storage section 164 through map matching (road width information acquiring means) and it is used for determination about whether or not change of a moving formation is required.

A relative position detecting section 19 detects a relative position to the main vehicle body 3, and a detection value is utilized at a time of connection with the main body vehicle 3. The main control device 161 can guide the independent vehicle 2 to a connecting position with the main body vehicle 3 to conduct automatic connection.

A main body vehicle detecting sensor 20 is a sensor for detecting whether or not connection with the main body vehicle 3 has been completed. When connection with the main body vehicle 3 has been confirmed by the main body vehicle detecting sensor 20, the main control device 161 operates in the connection mode, but when the connection has not been confirmed, the main control device 161 operates in the independent mode.

The main control device 161 is supplied with information items according to respective devices and equipment from the drive motor (wheel motor) 12, the steering apparatus 15, and the gyro sensor 162, the current position detecting device 18, the input section 171, and the relative position detecting section 19, so that respective controls of attitude control, moving control, braking control, and the independent moving control and the connection moving control in the third embodiment are performed according to these information items.

Information indicating a torque and a rotor position is supplied from the drive motor 12, acceleration instruction information, deceleration instruction information, and turning information showing a turning direction are supplied from the steering apparatus 15, an angular velocity of the boarding portion is supplied from the gyro sensor 162, a current position (a latitude, a longitude) of a vehicle is supplied from the current position detecting device 18, selection information of a driver to respective buttons displayed on the display section 172 is supplied from the input section 171, a relative position relationship to the main body vehicle 3 is supplied from the relative position detecting section 19, and presence/absence of connection with the main body vehicle 3 is supplied from the main body vehicle detecting sensor 20.

Figure 26:
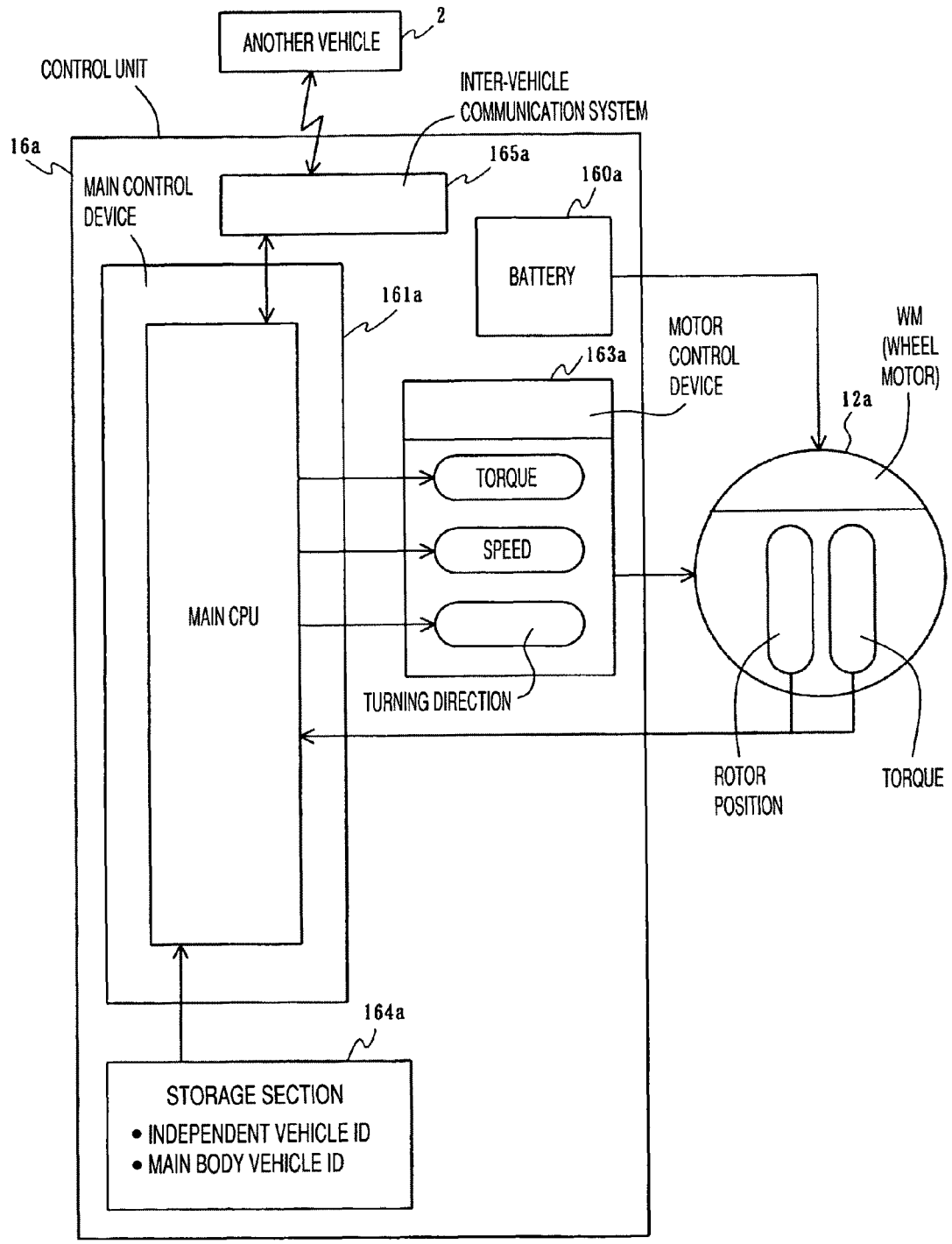
FIG. 26 is a diagram representing a configuration of a control unit in a main body vehicle.

FIG. 26 is a diagram representing a configuration of a main control device 161*a* of the main body vehicle 3.

A configuration of the main control device 161*a* is approximately equal to a configuration of the main control device 161 in the independent vehicle 2 from which a system for inverted-pendulum moving is removed, and constituent elements therein corresponding to those of the main control device 161 are denoted by same reference numerals attached with alphabet "a". Further, explanation about constituent portions of the main control device 161*a* similar to those of the main control device 161 is omitted properly.

The control unit 16*a* is provided with a battery 160*a*, a main control device 161*a*, a motor control device 163*a*, a storage section 164*a*, and an inter-vehicle interface 165*a*.

Functions of the battery 160*a* and the motor control device 163*a* are equal to the battery 160 and the motor control device 163 of the independent vehicle 2, respectively.

The storage section 164*a* stores therein not only a main body vehicle ID which is an ID number of an own vehicle but also an independent vehicle ID which is an ID number of the independent vehicle 2.

The main control device 161*a* acquires the independent vehicle ID from the independent vehicle 2 to confirm that the independent vehicle ID coincides with a independent vehicle ID stored in the storage section 164*a* at a time of connection with the independent vehicle 2 so that it can be confirmed that the independent vehicle 2 is an independent vehicle configuring the vehicle 1.

The inter-vehicle interface 165*a* is an interface for connecting a signal cable 60 for communication with the independent vehicle 2. The main control device 161*a* can receive a moving demand from the independent vehicle 2 via the inter-vehicle interface 165*a*.

The main control device 161*a* transmits a control signal to the motor control device 163*a* according to a moving demand transmitted from the independent vehicle 2 and accesses the storage section 164*a*.

Further, although not illustrated, the main control device 161*a* performs steering operation via a steering control device and performs braking operation via a brake control device.

The main control device 161*a* and the inter-vehicle interface 165*a* configure moving demand receiving means, and the motor control device 163*a* and the driving motor 12*a* configure main body vehicle driving means.

Figure 27:
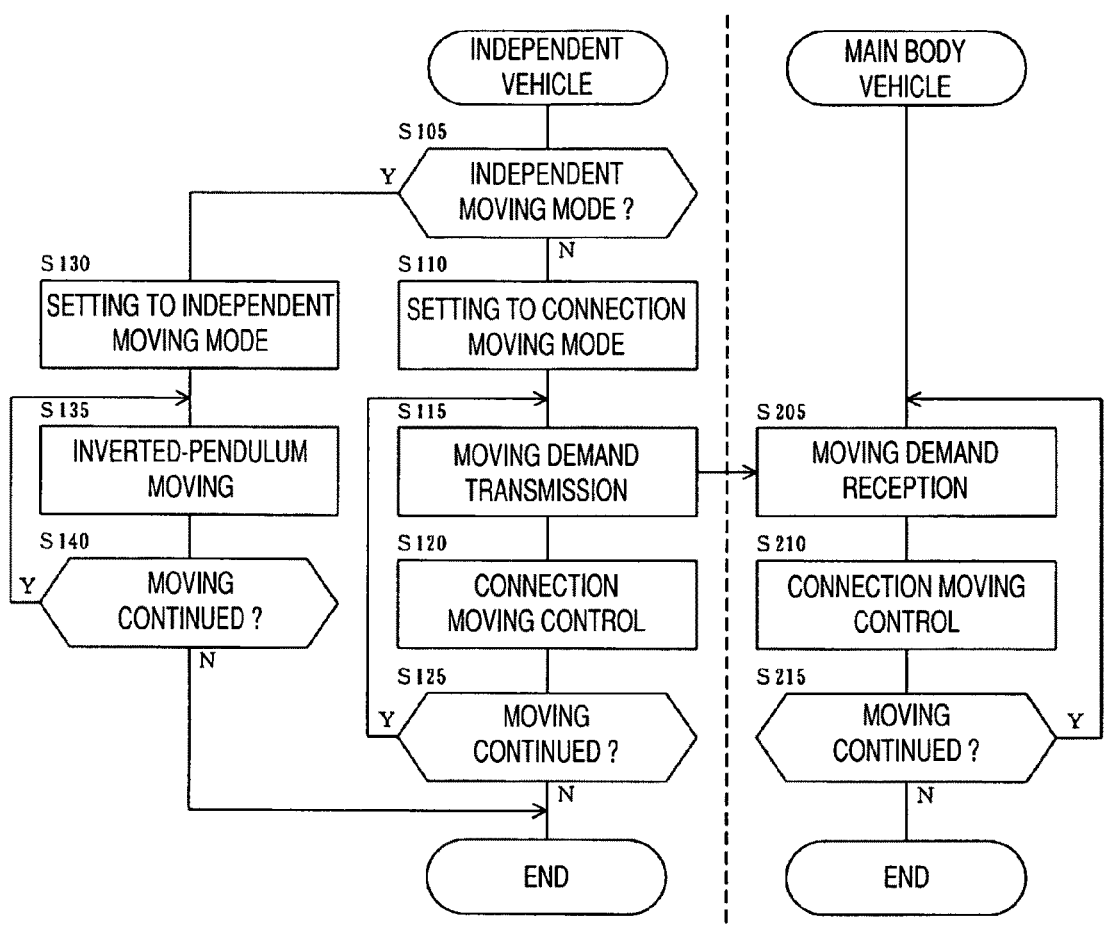
FIG. 27 is a flowchart for explaining a procedure for an independent vehicle and a main body vehicle to operate.

FIG. 27 is a flowchart representing operations of the independent vehicle 2 and the main body vehicle 3.

The operation on the side of the independent vehicle 2 is controlled by the main control device 161, and the operation on the side of the main body vehicle is controlled by the main control device 161*a*.

When a driver activates the independent vehicle 2, the main control device 161 determines whether independent moving is performed or connection moving is performed (step 105). That is, the main control device 161 determines that the independent moving is performed when it is confirmed by the main body vehicle detecting sensor 20 (FIG. 25) that connection with the main body vehicle 3 has been not performed, while the main control device 161 determines that the connection moving is performed when connection with the main body vehicle 3 has been confirmed.

When it is determined that the independent moving is performed (step 150; Yes), the main control device 161 performs setting to the independent moving mode (step 130).

The main control device 161 performs inverted-pendulum moving according to a moving demand due to operation of the steering apparatus 15 by a driver (step 135).

Next, the main control device 161 determines whether or not moving should be continued (step 140).

In the determination, for example, when the driver instructs activation stop of the independent vehicle 2 through the steering apparatus 15, it is determined that moving is not continued, while when an instruction for activation stop is not issued, it is determined that moving is continued (step 140).

When it is determined that moving is continued (step 140; Yes), the main control device 161 returns back to step 135, where inverted-pendulum moving is continued, while when it is determined that moving is not continued (step 140; No), the main control device 161 terminates the operation.

On the other hand, at step 105, when the main control device 161 determines that connection moving is performed (step 105; No), the main control device 161 performs setting to the connection moving mode (step 110).

The main control device 161 receives a moving demand due to operation of the steering apparatus 15 by a driver to transmit the same to the main control device 161*a* in the main body vehicle 3 (step 115) and controls connection moving of the independent vehicle 2 (step 120).

The main control device 161 determines whether or not moving is continued (step 125).

When the main control device 161 determines that moving is continued (step 125; Yes), it returns back to step 115 where the connection moving is continued, while, when it is determined that moving is not continued (step 125; No,), the main control device 161 stops the operation.

On the other hand, in the main body vehicle 3, when the independent vehicle 2 conducts connection moving mode, the main control device 161*a* receives a moving demand from the main control device 161 (step 205), and the main control device 161*a* controls the connection moving of the main body vehicle 3 according to the moving demand (step 210).

Next, the main control device 161*a* determines whether or not the moving is continued (step 215), and when the main control device 161*a* determines that the moving is continued (step 215; Yes), it returns back to step 205 and the connection moving is continued, while, when the main control device 161*a* determines that the moving is not continued (step 215; No), it stops the operation.

When the operation is stopped, the main control device 161 instructs the main control device 161*a* to stop the operation, and the main control device 161*a* determines whether or not the operation is stopped according to presence/absence of the instruction.

The following effects can be obtained by the third embodiment explained above.

(1) The independent vehicle 2 and the main body vehicle 3 can be connected to be used as an ordinary vehicle, and the independent vehicle 2 can be disconnected from the main body vehicle 3 to be utilized as a single-seat vehicle.

(2) When the independent vehicle 2 moves independently, it does not accompany the main body vehicle 3, so that reduction of operation cost and high efficiency of use energy can be achieved.

(3) Since the independent vehicle 2 and the main body vehicle 3 can confirm partner vehicle IDs mutually, the main body vehicle 3 can be prevented from being connected with an independent vehicle belonging to another vehicle.

In the third embodiment, the vehicle 1 is configured using an inverted-pendulum vehicle as one example, which is not limited a vehicle type of the vehicle 1. For example, the vehicle 1 can be configured using a vehicle having a plurality of axles such as a three-wheel vehicle or four-wheel vehicle.

Further, in the third embodiment, such a configuration has been adopted that the driver seat portion is disconnected from the main body vehicle 3, but the present invention is not limited to this configuration, and such a configuration can be adopted that a driver seat and a front passenger seat are connected to/disconnected from a rear occupant seats so that the driver seat and the front passenger seat are disconnected from the rear occupant seats to move independently.

Next, a modified embodiment of the independent vehicle 2 and the main body vehicle 3 will be explained with reference to respective figures of FIG. 28.

Figure 28A:
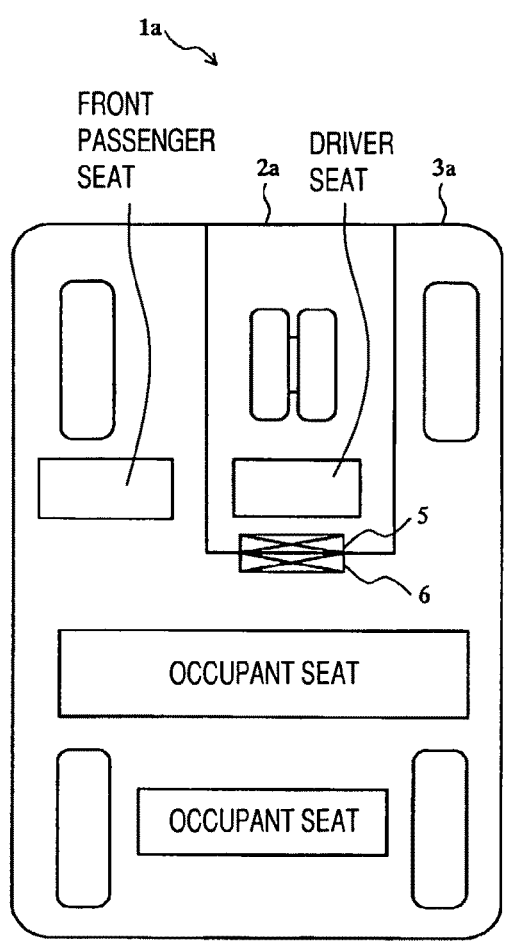
FIG. 28 is a diagram for explaining a modified embodiment of the independent vehicle and the main body vehicle.

As shown in FIG. 28A, a vehicle 1a is configured such that an independent vehicle 2a and a main body vehicle 3a are connected to each other via a connecting device 5 and a connecting device 6.

The main body vehicle 3a has a wheel configuration similar to an ordinary vehicle provided with two front wheels and two rear wheels. A drive system may be configured by a front drive system, a rear wheel system, or four-wheel system.

An accommodating space 4 for the independent vehicle 2a provided with a driver seat is provided between the front wheels of the main body vehicle 3a, and the main body vehicle 3a is connected with the independent vehicle 2a by the connecting device 5 and the connecting device 6.

Thus, when the independent vehicle 2a is connected to the main body vehicle 3a, the vehicle 1a can be driven in a manner similar to an ordinary vehicle.

A driving wheel of the independent vehicle 2 can be configured to be driven in a linkage with the wheels of the main body vehicle 3a. In this case, the driving wheel is turned in sync with the front wheels when the front wheels of the main body vehicle 3a are turned.

Further, such a configuration can be adopted that the driving wheel of the independent vehicle 2a is accommodated in the accommodated space 4 provided in the independent vehicle 2a so as not to contact with the ground during connection. In this case, when the independent vehicle 2a is disconnected from the main body vehicle 3a, the independent vehicle 2a takes the driving wheel from the accommodating space to ground the same.

Figure 28B:
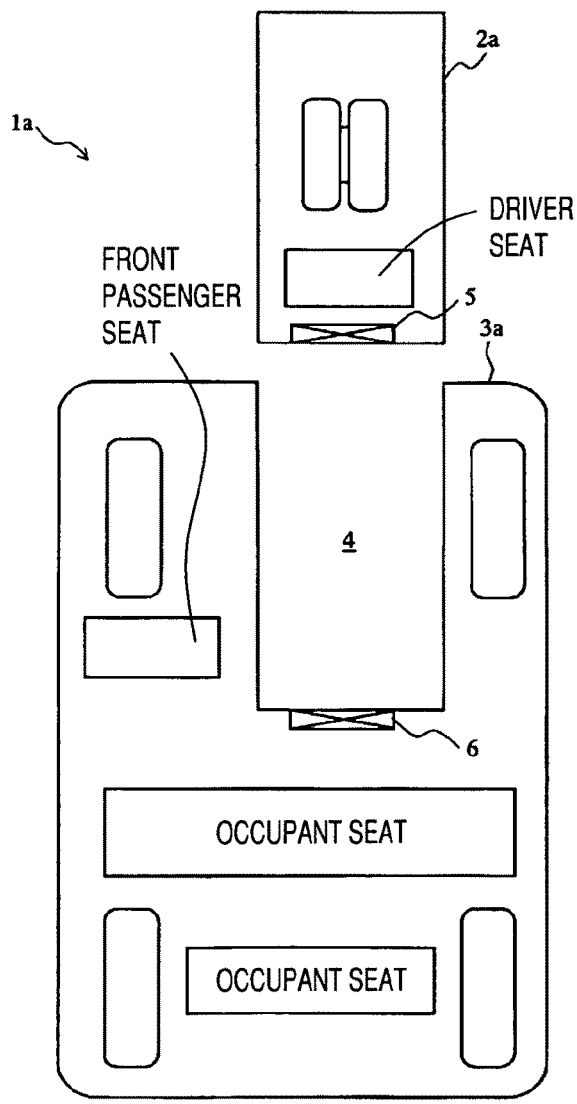

FIG. 28B is a diagram showing a state that the independent vehicle 2a has been disconnected from the main body vehicle 3a.

When the independent vehicle 2a is disconnected from the main body vehicle 3a, it performs independent moving by inverted-pendulum.

The following effects can be obtained by configuring the main body vehicle 3a using four wheels like an ordinary vehicle and incorporating the independent vehicle 2a into the main body vehicle 3a in this manner.

(1) Since the main body vehicle 3a is provided with four wheels, when the independent vehicle 2 is put in disconnected state, balance maintaining property of a vehicle body of the main body vehicle 3a is excellent.

(2) Since the main body vehicle 3a is provided with four wheels, the main body vehicle 3a can support a large weight. Therefore, a large-sized vehicle such as a bus or a track can be configured using the main body vehicle 3a.

(3) When such a configuration is adopted that the driving wheels of the independent vehicle 2a are accommodated during connection, it is unnecessary to drive the independent vehicle 2a during connection moving. Therefore, the independent vehicle 2a is required for only inverted-pendulum moving so that a control system for the independent vehicle 2a can be simplified.

(4-1) Next, the Fourth Embodiment Will be Explained

The fourth embodiment relates to a connected vehicle, a connecting device, and a vehicle, and relates to, for example, supply of energy when a plurality of vehicles moves in a connected manner.

(4-2) Background Art in Third Embodiment

In a conventional vehicle such as an automobile, since its size cannot be changed regardless of the number of occupants, even when a vehicle moves with only one occupant, the vehicle must move together with an empty seat and a space unneeded, which results in much wasteful weight and space and deterioration of an efficiency of fuel consumption relative to the number of occupants.

In view of these circumstances, the vehicle utilized such that a plurality of single-seat vehicles which can move independently is connected and they move integrally while maintaining a predetermined moving formation according to linkage among respective vehicles has been proposed in the first embodiment.

In this technique, movement with an optical size can be made possible by increasing/subtracting the number of joined vehicles so as to coincide with the number of occupants. A pilot is one occupant in the host vehicle even in a connected state of many vehicles, and the vehicles other than the host vehicle are controlled in a coordinated manner based upon moving information transmitted from the host vehicle in charge of operation as following vehicles By this technique, the plurality of vehicles connected can be operated integrally as if they were only one vehicle.

As a case that moving is performed as an independent vehicle, for example, utilization in a close range and a low speed moving such as neighborhood shopping is assumed. On the other hand, as a case of connection moving, utilization in a far distance and a high speed moving such as a drive or a trip is assumed.

A power source such as, for example, a battery or a fuel battery is required in order to drive a vehicle, but when a small-sized power source is mounted on a vehicle for a purpose of a close range moving, such a problem arises that, when vehicles are connected to perform far distance moving or high speed moving, energy shortage occurs so that output lowers and a distance where a vehicle can move becomes short.

Therefore, when a large-sized power source is mounted on a vehicle in order to allow far distance moving, such a problem arises that power source is wasteful due to mounting of a power source equal to or more than a power source required for a independent moving and energy efficiency further deteriorates because the vehicle must move accompanying a large-sized and heavy power source.

Therefore, an object of the fourth embodiment is to provide an energy source corresponding to necessity in a connectable vehicle.

(4-3) The Following Configuration is Adopted in the Fourth Embodiment in Order to Solve the above Problem (a) The above object is achieved by providing connected vehicles with a plurality of vehicles provided with driving means for generating driving force for moving by power and a power source device supplying power to the driving mean, connecting means for connecting the plurality of vehicles attachable and detachably, and an external power source device for supplying power to at least one driving means in the plurality of vehicles connected.

(b) The connected vehicles in the configuration (a) is characterized in that at least one vehicle of the vehicles connected is provided with regenerating means for recovering kinetic energy as electric energy at a time of braking and storage means for performing storage of the power source by at least one of the electric energy recovered or power supplied by the external power source device.

(c) The connected vehicles in the configuration (a) or (b) are characterized by providing power distributing means for distributing power supplied by the external power source device according to driving force generated by the plurality of vehicles connected.

(d) The above object is achieved by providing the connecting devices with connecting means for connecting a plurality of vehicles for generating driving force for moving by power and an external power source device for supplying power to at least one of the plurality of vehicles connected.

(e) The above object is achieved by providing a vehicle with driving means for generating driving force for moving by power, a power source device for supplying power to the driving means, connecting means for connecting to another vehicle attachable and detachably, and connection means for connecting to an external power source device for supplying power to the driving means at a time of connection conducted by the connecting means.

(f) The vehicle in the configuration (e) is characterized by having regenerating means for regenerating kinetic energy as electric energy at a time of braking and storage means for performing storage of the power source in the power source device by at least one of the electric energy regenerated or power supplied by the external power source device.

(g) The above object is achieved by providing a vehicle with driving means for generating driving force for moving by power, a power source device for supplying power to the driving means, connecting means for connecting to another vehicle attachable and detachably, and power supplying mean for supplying power to the driving means of another vehicles from the power source device at a time of connection conducted by the connecting means.

(4-4) Effect of Fourth Embodiment

According to the fourth embodiment, proper power sources corresponding to moving situations of independent moving and connection moving can be used in a vehicle connectable to another vehicle.

(4-5) Brief Overview of Fourth Embodiment

A small-sized and light-weight battery (power source) is disposed on each vehicle and a large-sized battery (power source) is disposed on a connecting device for connecting respective vehicles.

When each vehicle moves independently, it moves with the small-sized and light-weight battery provided in each vehicle and, when respective vehicles move in a connected state thereof, they move with the large-sized battery provided in the connecting device.

When each vehicle moves independently, it is unnecessary for the vehicle to accompany a battery with a large size exceeding a size required for moving so that energy efficiency becomes high. On the other hand, when vehicles move in a connected manner over a long distance, they can receive a supply of sufficient energy for moving from the large-sized battery.

Further, the small-sized battery is charged by the large-sized battery or regeneration energy during connection, so that a charged amount of the small-sized battery is kept at a predetermined amount or more at any time when switching is performed to independent moving.

By performing integration of a large energy source at a connected time of vehicles in this manner, the most efficient power source systems can be provided during connection moving and during independent moving, respectively.

Details of Fourth Embodiment

The vehicle of the fourth embodiment is configured such that connected vehicles are configured by connecting (integrating) a plurality of single-seat vehicles, each of which can move independently, and the vehicles can move integrally while maintaining a predetermined moving formation by linkage of control systems of the respective vehicles.

One of the connected vehicles serves as a host vehicle and the whole connected vehicles are steered by transmitting moving information to the remaining vehicles (following vehicles).

Figure 29:
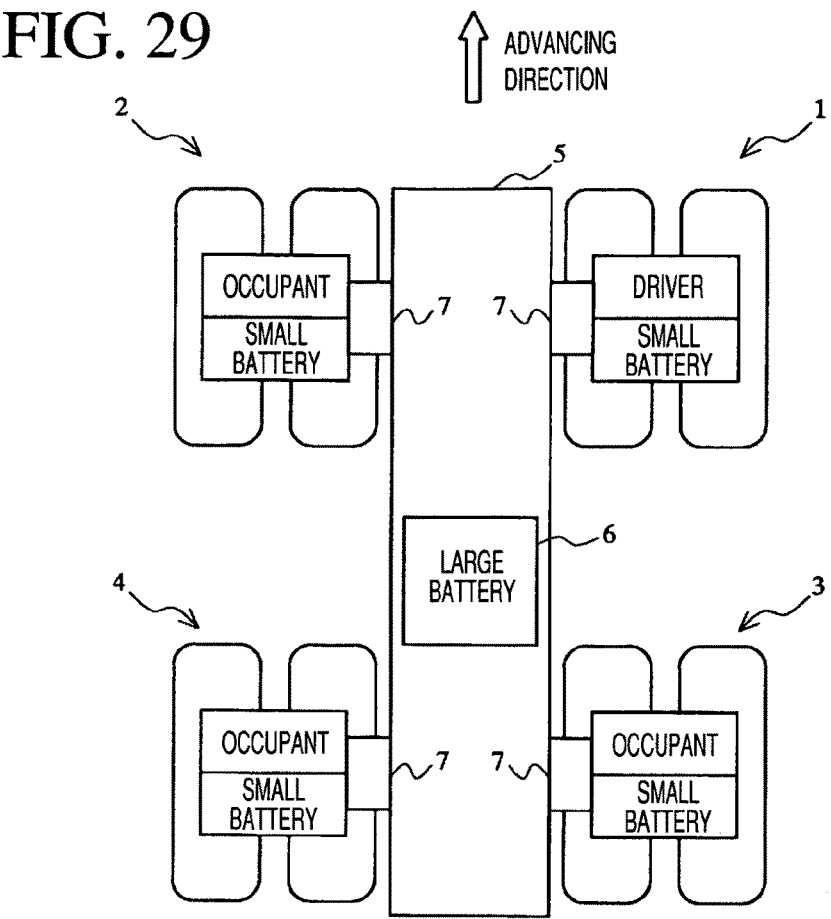
FIG. 29 is a diagram showing an organization example of connected vehicles.

FIG. 29 is a diagram representing a formation example of the connected vehicles having one host vehicle and three following vehicles.

The connecting device 5 is a column-like structure extending in an advancing direction, and it is provided with connecting mechanisms 7, 7, 7, and 7 on both front sides and both rear sides thereof in the advancing direction. The connecting mechanism 7 configures connecting means for connecting a vehicle attachable and detachably.

The connecting device 5 is formed by attaching exterior plates to a frame made of metal such as, for example, iron, stainless steel, or aluminum alloy, and is designed such that, even if stress is imparted on the connecting device 5 from the vehicles 1 to 4, the connecting device 5 is designed to endure such stress.

The connecting mechanism 7, 7 provided on the front sides are connected with the vehicle 1 and the vehicle 2 respectively, while the connecting mechanisms 7, 7 provided on the rear sides are connected with the vehicle 3 and the vehicle 4 respectively.

The vehicle 1 of the vehicles 1 to 4 is set as the host vehicle, while the vehicles 2 to 4 are set as following vehicles.

Incidentally, the number of host vehicles is limited to one, but any one of the vehicles 1 to 4 may be the host vehicle.

A vehicle which has selected a host selection button set on each vehicle is in charge of the host vehicle and the selected vehicle notifies the other vehicles of such a fact that its own vehicle is the host vehicle.

When the host vehicle has been selected by a plurality of vehicles, the vehicle which has been first selected becomes the host vehicle. On the other hand, in another vehicle where the host selection button has been selected after such a fact has been notified from the vehicle which has been first selected, such a fact that the host vehicle has been selected by another vehicle and that the host selection is invalid is displayed in an alarming manner.

The vehicle 1 to the vehicle 4 are vehicles which can move independently, and they are each provided with a small-sized battery (hereinafter, called "small battery") for close range moving.

The small battery configures a power source device for supplying power to a driving motor (driving means) for driving a vehicle.

Hereinafter, the small batteries of the vehicles 1 to 4 are each called simply "small battery" especially when they are not distinguished from one another, but when they are distinguished from one another, each small battery is shown together with the vehicle number to which the small battery belongs, for example, such that the small battery of the vehicle 1 is shown as small battery 1.

Each vehicle is provided with connecting mechanisms on both side faces thereof, and connection is achieved by connecting the connecting mechanism of the connecting mechanisms which faces the connecting device 5 to the connecting mechanism of the connecting device 5. For example, the vehicle 1 is connected with the connecting device 5 by the connecting mechanism on the left side along an advancing direction, but when the vehicle 1 is disposed at a position of the vehicle 2, it is connected to the connecting device 5 by the connecting mechanism on the right side along the advancing direction.

The connecting device 5 is provided with not only a large-sized large battery 6 supplying power to the vehicles 1 to 4 and power feeding cables feeding current of the large battery 6 to the vehicles 1 to 4 but also signal cables connecting with electronic control systems of the vehicles 1 to 4.

The large battery 6 has a charging capacity sufficiently larger than that of the small battery, and it can supply power required for a far distance moving to the vehicles 1 to 4. The large battery 6 configures an external power source device for supplying power to at least one of driving means of a plurality of vehicles connected.

Incidentally, each small battery mounted on the vehicles 1 to 4 is designed to have a capacity by which a vehicle starts independent moving in a full charged state, and it can move at a predetermined constant speed V1 (for example, 30 km/h) by a predetermined distance L1 (for example, 30 km).

On the other hand, the large battery is designed to have a capacity with which each vehicle starts moving in a full charged state and it can move at a predetermined speed V2 (>V1, for example, V2=80 km/h) by a predetermined distance L2 (>L1, for example, 300 km) during a connected moving using only the large battery without using the small battery.

Further, in the fourth embodiment, the small batteries 1 to 4 and the large battery 6 are used as energy source, but, for example, an energy source of another type which allows supply and recovery (regeneration) of energy, such as a small-sized capacitor or a large-sized capacitor may be utilized.

Further, a fuel battery may be used as the large battery, and a capacitor (for regeneration and charging) and a fuel battery may be used as the small battery.

The power feeding cables include various cables such as a cable for feeding power of the large battery 6 to the driving motors of the vehicles 1 to 4, a cable for feeding power from the large battery 6 to each small battery to charge the small battery, a cable for feeding power from a small battery of one vehicle to a small battery of another vehicle, and the like.

That is, the connected vehicles have a total of five batteries of the large battery 6 and the small batteries 1 to 4, but the power feeding cables are disposed such that they can select any battery from the five batteries as a power source for driving. Similarly, wiring is performed such that destination of regeneration energy can be selected from the large battery 6 and the small batteries 1 to 4.

A connection connector for the power feeding cable or the signal cable is provided in the connecting mechanism 7, and when the vehicles 1 to 4 are connected to the connecting devices 5, electrical connections of these cables are also performed simultaneously. The connection connector for the power feeding cable configures connecting means for connecting to an external power source device for feeding power at a time of connection.

As described above, the connecting device 5 is provided with a function of connecting the vehicles 1 to 4 physically and a function of connecting them electrically.

In the fourth embodiment, as described above, the vehicles 1 to 4 are connected physically, but they may be software-connected to move such that following vehicles maintain a formation using moving information generated by the host vehicle, as disclosed in Patent Literature 1. In this case, the power feeding cables and the signal cables are connected to the vehicles 1 to 4.

In this case, such a configuration can be adopted that transmission/reception of signals are conducted through radio waves, so that the signal cables can be omitted.

Further, as the connecting device 5, not only one having rigidity as shown in FIG. 29 and having a structure for fixing a arrangement relationship among respective vehicles but also one having a structure deformable within a predetermined allowable range, such as, for example, a rod member articulated by a bellows or a hinge, or a wire can be used.

When the former connecting device having rigidity is used, such a configuration is adopted that an axle is rotated to a vehicle body in a turning direction because the connected vehicles turn.

When the latter deformable connecting device is used, the vehicle body and the axle can be fixed to each other, or such a configuration may be adopted that the axle is rotated to the vehicle body. When the vehicle body and the axle are fixed, the vehicle can turn by adjusting the number of rotations of the left and right wheels.

Next, moving information which is transmitted/received between the host vehicle (vehicle 1) and the following vehicles (vehicles 2 to 4) via the signal cables will be explained.

The host vehicle performs drive required for a speed/a direction according to running operation which has been performed by an occupant.

Simultaneously therewith, the host vehicle instructs each following vehicle to synchronize (follow) the own vehicle.

That is, the host vehicle transmits a speed, a direction, and a relative position to the own vehicle (host vehicle) to each following vehicle as moving information (following instruction) in order to synchronize the own vehicle (maintain a connected relationship).

On the other hand, each following vehicle moves based upon a follow-up instruction and feeds status information including a speed and a direction of its own vehicle, and the like back to the host vehicle as own vehicle information.

The host vehicle prepares moving information according to each status information item fed back and a current moving state of the own vehicle and running operation to transmit the same to each following vehicle.

By performing moving while repeating the follow-up instruction from the host vehicle and feedback of status information from the following vehicles in this manner, connection moving can be performed without imposing burden on the connecting device as much as possible.

Especially, when the connecting device has a deformable structure, flexible moving such as moving while changing formation can be performed by using both physical connection and software-like connection using feedback.

The host vehicle monitors charged/discharged state including charged amounts of small batteries of respective vehicles including the own vehicle utilizing signals transmitted from the respective following vehicles and also monitors charged/discharged state including the changed amount of the large battery 6 utilizing a signal from a sensor provided in the large battery 6.

When the connected vehicles accelerate/move, the host vehicle instructs an amount of power from power source to be consumed to respective vehicles including the own vehicle, and instructs a power source of power sources which should be returned with regenerated power obtained at a time of braking to respective vehicles including the own vehicle.

As described above, regarding the connected vehicles, a driver boards the host vehicle and occupants board the following vehicles so that the connected vehicles can be operated like an ordinary vehicle.

Incidentally, in the fourth embodiment, the case that two vehicles are disposed on the front side and two vehicles are disposed on the rear side by utilizing the connecting device 5 will be explained, but the connection formation of vehicles is not limited to this formation. For example, the connecting device 5 can be provided such that two vehicles are further disposed behind each of the vehicles 3 and 4 so that more occupants can be accommodated, respective vehicles are arranged in one line along an advancing direction such that they can pass through even a narrow road, or respective vehicles are arranged in one line perpendicular to an advancing direction.

An appearance configuration of the vehicles 1 to 4 in the fourth embodiment is as explained in FIG. 2 and the first embodiment.

Incidentally, though not illustrated in FIG. 2, the inverted-pendulum vehicle in the fourth embodiment is provided with connecting mechanisms to be connected to the connecting mechanism 7 on the left and right sides thereof.

Incidentally, in the fourth embodiment, the vehicles 1 to 4 are each comprised of an inverted-pendulum vehicle, but such a fact is not for limiting a structure of a vehicle. For example, it is possible to use a vehicle having a plurality of axles, such as a motorcycle, a three-wheel vehicle, a four-wheel vehicle, or a caterpillar car. Further, it is possible to use an inverted-pendulum vehicle having only one spherical wheel.

Further, it is possible to configure connected vehicles by connecting a plurality of kinds of vehicles such that an inverted-pendulum vehicle is used as the vehicle 1 and a motorcycle is used as the vehicle 2.

Next, the connecting mechanism 7 in the fourth embodiment will be explained.

Figure 30A:
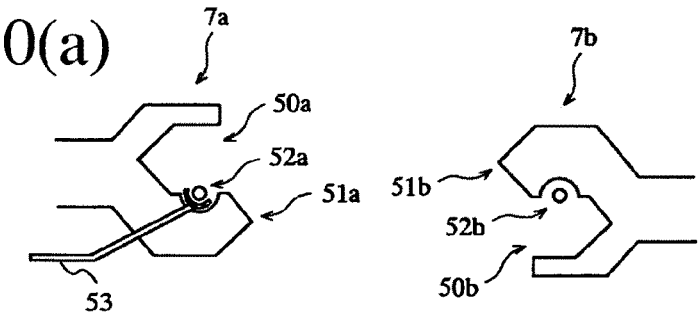
FIG. 30 is a diagram for explaining a connecting mechanism.

FIG. 30A is a diagram showing one example of a connecting mechanism 7a on the vehicle side and a connecting mechanism 7b on the connecting device 5 side. The connecting mechanism has a configuration similar to that of a connecting mechanism of a train, for example.

The connecting mechanism 7a and the connecting mechanism 7b configure connecting means for performing connection and disconnection by a mechanical connecting mechanism, and the connecting mechanism 7a configures single body vehicle side connecting means, while the connecting mechanism 7b configures main body vehicle side connecting means.

The connecting mechanism 7a is formed with a recessed portion 50a, a protrusion portion 51a, and a swivel 52a. On the other hand, the connecting mechanism 7b is also formed with a recessed portion 50b, a protrusion portion 51b, and a swivel 52b.

The recessed portion 50a and the protrusion portion 51b face each other, and the protrusion portion 51a and the recessed portion 50b face each other, respectively, so that positioning is achieved at a time of connection between the connecting mechanism 7a and the connecting mechanism 7b by fitting these portions to each other.

Further, shaft members of the swivel 52a and the swivel 52b are positioned coaxially at a time of connection, so that the connecting mechanism 7a and the connecting mechanism 7b can be fixed by turning a release lever 53 down to a closing side. On the other hand, fixation of the shaft members is cancelled by turning the releasing lever 53 to an opening side, so that the connecting mechanism 7a and the connecting mechanism 7b can be disconnected from each other.

Incidentally, in the fourth embodiment, fixation and release of the swivels 52a, 52b are performed manually using the releasing lever 53, but such a configuration can be adopted that the releasing lever 53 is automatically opened and closed using external force such as hydraulic pressure or electromagnetic force.

Further, the connecting mechanism 7a and the connecting mechanism 7b may be other mechanisms, and another mechanical connecting mechanism provided with a positioning mechanism for positioning the connecting mechanism 7a and the connecting mechanism 7b and a locking mechanism for locking the connecting mechanism 7a and the connecting mechanism 7b at positions where the connecting mechanism 7a and the connecting mechanism 7b have been positioned can be adopted.

Figure 30B:
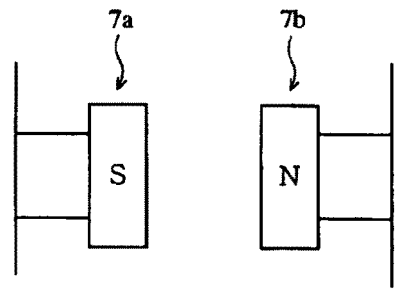

FIG. 30B is a diagram representing another example of the connecting mechanism 7a and the connecting mechanism 7b.

The connecting mechanism 7a and the connecting mechanism 7b according to the present embodiment configure connecting means for performing connection and disconnection utilizing electromagnetic binding force, and the connecting mechanism 7a configures single body vehicle side connecting means, while the connecting mechanism 7b configures main body vehicle side connecting means.

Both the connecting mechanism 7a and the connecting mechanism 7b are configured of electromagnets, where magnetic poles face each other. Both exciting currents supplied to the connecting mechanism 7a and the connecting mechanism 7b are controlled by a control unit of the host vehicle.

In this case, the connecting device 5 forms magnetic poles with predetermined polarity (N pole or S pole) at the respective connecting mechanisms 7b at four portions.

On the other hand, the host vehicle forms a magnetic pole with polarity opposite to that of the magnetic pole formed at the connecting mechanism 7b at the own connecting mechanism 7a and it instructs each following vehicle to form a magnetic pole with polarity opposite to that of the magnetic pole formed at the connecting mechanism 7b at its own connecting mechanism 7a.

Thus, the connecting mechanism 7a of each vehicle and the connecting mechanism 7b of the connecting device 5 are formed with magnetic poles with polarities reversed to each other, so that each vehicle and the connecting device 5 are connected to each other by an attracting force machine acting between these magnetic poles.

Here, when such a configuration is adopted that a magnetic pole of one of the connecting mechanism 7a and the connecting mechanism 7b is reversed at a time of disconnection, repelling force is generated between the connecting mechanism 7a and the connecting mechanism 7b, so that disconnection of each vehicle from the connecting device 5 becomes easy.

Further, such a configuration can be adopted that a mechanism for temporarily connecting each vehicle and the connecting device 5 mechanically is provided in addition to the connecting mechanism 7a and the connecting mechanism 7b, current supplied to the connecting mechanism 7a and the connecting mechanism 7b is stopped and each vehicle and the connecting device 5 are connected by the temporary connecting mechanism during non-activation of the host vehicle. In this case, current is not supplied to the connecting mechanism 7a and the connecting mechanism 7b during non-activation of the host vehicle so that power consumption can be suppressed.

Figure 31:
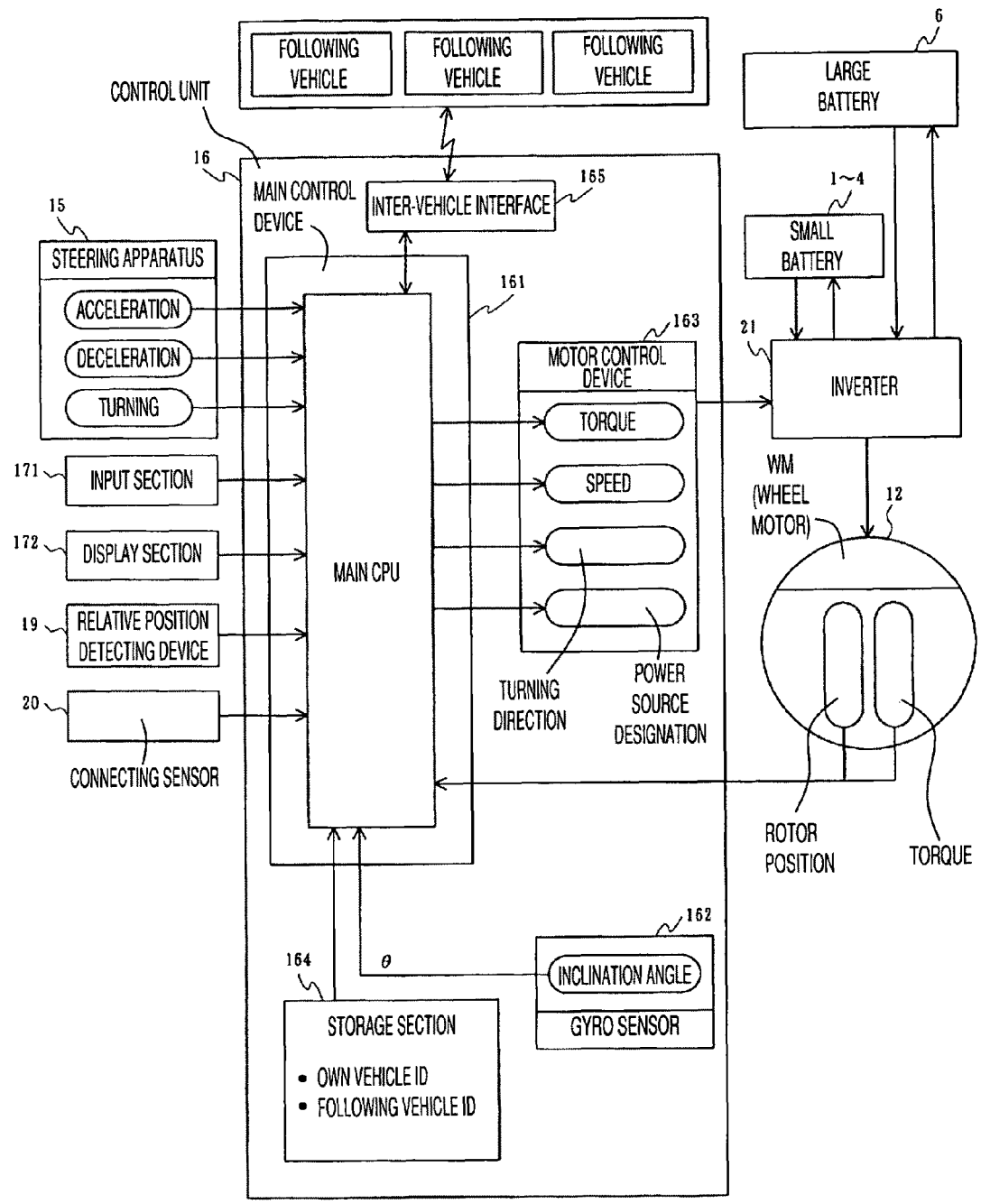
FIG. 31 is a diagram showing a configuration of a control unit.

FIG. 31 is a diagram representing a configuration of a control unit 16 mounted on the vehicle 1 (host vehicle). Incidentally, control units 16 mounted on the vehicles 2 to 4 have similar configurations.

The control unit 16 has a function for performing inverted-pendulum moving when the vehicle moves independently (an independent moving mode), a host mode where a vehicle is connected to the connecting device 5 to function as a host vehicle, and a following mode where a vehicle is connected to the connecting device 5 to function as a following vehicle. Respective constituent elements configuring the control unit 16 will be explained below.

The control unit 16 is provided with a main control device 161, a gyro sensor 162, a motor control device 163, a storage section 164, and an inter-vehicle interface 165.

The main control device 161 is provided with a main CPU, and it comprises a computer system provided with a ROM storing various programs and data, a RAM used as a working area, an external storage device, an interface section, and the like (not shown).

Various programs such as an attitude control program for holding an attitude of an inverted-pendulum vehicle and a moving control program for controlling moving based upon various instruction signals from the steering apparatus 15 are stored in the ROM (or the storage section 164), and the main control device 161 executes the various programs to conduct corresponding processings.

Incidentally, the attitude control program is executed at a time of independent moving mode. Further, the moving control program has respective control algorithms for independent moving mode, for host mode, and for following mode, where when independent moving is performed, the control algorithm for independent moving mode is executed, when connection moving is performed as the host vehicle, the control algorithm for host mode is executed, and when connection moving is performed as the following vehicle, the control algorithm for following mode is executed.

The gyro sensor 162 is used for performing inverted-pendulum moving at a time of independent moving mode to function as an attitude sensing sensor for sensing an attitude of the boarding portion 13.

The gyro sensor 162 detects an angular acceleration and an inclination angle θ of the boarding portion 13 as physical quantity based upon inclination of the boarding portion 13.

The main control device 161 recognizes an inclination direction from the inclination angle detected by the gyro sensor 162.

Incidentally, the gyro sensor 162 in the fourth embodiment detects the angular acceleration and the inclination angle to supply them to the main control device 161, but it can detect only the angular acceleration.

In this case, the main control device 161 accumulates angular velocities supplied from the gyro sensor 162 to calculate an angular acceleration and an angle, thereby, acquiring an inclination angle.

Further, various sensors outputting a signal corresponding to an angular acceleration when the boarding portion 13 inclines, such as a liquid rotor type angular accelerometer or an eddy current type angular accelerometer may be used as the attitude sensing sensor besides the gyro sensor 162.

Instead of a pendulum in a servo type accelerometer, the liquid rotor type angular accelerometer detects motion of liquid to measure an angular acceleration from a feedback current when motion of the liquid is balanced by a servo mechanism. On the other hand, the angular accelerometer utilizing an eddy current is formed by configuring a magnetic circuit using a permanent magnet and disposing a cylindrical rotor made of aluminum in the circuit, and it detects an angular acceleration based upon magnetic electromotive force generated according to change of a rotating speed of the rotor.

An inverter 21 converts DC current supplied from the small battery or the large battery 6 to AC current to supply the same to the driving motor 12 or converts regeneration energy (AC current) regenerated from the driving motor 12 at a braking time of the driving motor 12 to DC current to feed the same to the small battery or the large battery, thereby storing it therein.

Thus, in the fourth embodiment, the inverter 21 is given a function of performing conversion of regeneration energy, but an AC-DC converting device for regeneration having a converter and the like may be provided.

By performing regeneration, kinetic energy to be lost due to braking can be converted to electric energy to be stored in a power source so that usability of energy can be elevated.

Thus, the connected vehicles are provided with regenerating means for recovering kinetic energy as electric energy at a braking time. The motor control device 163 controls the inverter 21, thereby controlling the driving motor 12.

That is, the motor control device 163 controls the driving motor 12 by controlling the inverter 21 according to each instruction signal of a driving torque, a speed, and a rotation direction supplied from the main control device 161.

The main control device 161 supplies each instruction signal of a driving torque, a speed, and a rotation direction to the motor control device 163 based upon moving demand from the steering apparatus 15 when the vehicle moves as the host vehicle and based upon moving information received from the host vehicle when the vehicle moves as the following vehicle.

The motor control device 163 is provided with a torque-current map for the driving motor 12.

The motor control device 163 controls the inverter 21 to generate a current corresponding to a driving torque supplied from the main control device 161 to output the current to the driving motor 12. At this time, the motor control device 163 designates a power source to be used (the large battery 6 and/or the small battery) to the inverter 21 based upon an instruction from the main control device 161 in the host vehicle. The motor control device 163 performs designation of a power source to be used and designation of regeneration destination (the large battery or the small battery) of the regeneration energy to the inverter 21.

Incidentally, the drive torque supplied from the main control device 161 is a torque instruction value T for attitude control when the vehicle is stopping and a value obtained by adding/subtracting the torque instruction value T to/from a torque instruction value responding to a drive demand of a driver while the vehicle is moving.

Here, power source designation performed by the motor control device 163 will be explained more specifically.

In the case of the vehicle 1, as a power source from which the inverter 21 receives power, there are not only the small battery 1 of the own vehicle but also the large battery 6 and the connected small batteries 2 to 4 of the other vehicles.

The inverter 21 is disposed to be connectable to all of these batteries, and when a power source is designated from the motor control device 163, connection to the designated power source is performed.

For example, when the large battery 6 is designated as a power source from the motor control device 163, the inverter 21 is connected to the large battery 6 to obtain power for driving from the large battery 6. Further, when the large battery 6 is designated as the regeneration destination from the motor control device 163, the inverter 21 feeds regeneration current to the large battery 6.

The above examples show the case of the vehicle 1, but the control unit in the host vehicle causes the respective vehicles including the own vehicle to select the power source and the regeneration destination from the large battery 6 and the small batteries 1 to 4.

Thus, the connected vehicles is provided with storing means for charging the small battery by at least one of electric energy recovered in regeneration or power supplied by the large battery 6.

Further, when the motor control device 163 can designate a plurality of power sources to the inverter 21 in an overlapping manner.

For example, the motor control device 163 designates the small battery 1 and the large battery 6 as the power sources, the inverter 21 is connected to the small battery 1 and the large battery 6 to receive power supply from the both simultaneously. Similarly, regeneration can be simultaneously performed to the small battery 1 and the large battery 6.

When a plurality of power sources are used in an overlapping manner in this manner, the motor control device 163 can designate a supply ratio of power among respective power sources (in the case of driving) and a current feeding ratio of regeneration current (in the case of braking) to the inverter 21.

For example, when the motor control device 163 designates the inverter 21 such that 70% of current for driving the driving motor 12 is supplied from the large battery 6 and the remaining 30% is supplied from the small battery 1, the inverter 21 obtains power from the large battery 6 and the small battery 1 at this ratio. The regeneration is conducted similarly.

Incidentally, the case of simultaneous connection to a plurality of power sources will be omitted in the following explanation for simplification of explanation The main control device 163 operates in an independent moving mode, in a host mode, and in a following mode.

In the independent moving mode, the main control device 161 operates based upon a moving demand from the steering apparatus 15 to perform information processing for the vehicle to move independently.

In the host mode, the main control device 161 controls the own vehicle based upon a moving demand from the steering apparatus 15 and controls the following vehicles based upon each instruction signal of a drive torque, a speed, a rotation direction, and power source designation issued from the inter-vehicle interface 165 to each following vehicle.

In the following mode, the main control device 161 receives each instruction signal of a drive torque, a speed, a rotation direction, and power source designation from the host vehicle via the inter-vehicle interface 165 and controls the own vehicle according to the instruction signal.

Programs such as an attitude control program is stored in the storage section 164, and various data items such as a vehicle ID which is an identification number of the own vehicle, or vehicle IDs which are identification numbers of other vehicles are also stored therein as a various data required for the connection moving with the other vehicles. The vehicle IDs of the other vehicles are acquired at a time of connection and the control unit 16 stores these in the storage section 164.

The host vehicle can identify respective following vehicles connected according to the vehicle IDs of the following vehicles, and the following vehicles can also identify the host vehicle and the other following vehicles connected according to the vehicle IDs.

The inter-vehicle interface 165 is an interface for transmission/reception of various signals with the other vehicles connected by the connecting device 5. When the host vehicle receives a signal representing a state of each following vehicle via the inter-vehicle interface 165, it can transmit an instruction signal to each following vehicle.

The inter-vehicle interface 165 is provided with a connector for connecting to a signal cable housed in the connecting device 5 and the signal cable is connected to the connector manually or automatically at a time of connection with the connecting device 5.

Incidentally, in the fourth embodiment, transmission and reception of various signals are performed through wired communication using the signal cables, but, for example, such a configuration can be adopted that transmission of signals is performed through wireless communication using radio wave or infrared ray.

The input section 171 is disposed on the display/operation section 17 (see FIG. 2), and it functions as input means for inputting various data or conducting instruction and selection.

The input section 171 comprises a touch panel and exclusive selection buttons disposed on the display section 172. Regarding the touch panel portion, a position touched (pressed) by a passenger is detected corresponding to each of various selection buttons displayed on the display section 172 so that selection content is acquired from the pressed position and the display content thereof.

The display section 172 is disposed on the display/operation section 17. Buttons to be selected or inputted from the input section 171, explanation, and the like are displayed on the display section 172.

A relative position detecting device 19 detects a position of the connecting device 5 and the detected value is utilized when performing connection with the connecting device 5. The control unit 16 uses the detected value to guide the own vehicle to a connecting position of the connecting device 5 to allow automatic connection.

The connecting sensor 20 is a sensor for detecting connection between the connecting device 5 and the main body vehicle 3. When connection with the connecting device 5 is not detected, the control unit 16 operates in the independent moving mode, and when connection with the connecting device 5 is detected, the control unit 16 operates in the host mode or in the following mode. Selection of the host mode and the following mode is performed by pressing-down of a selection button through the input section 171 conducted by a driver.

The main control device 161 is supplied with information items according to respective devices and equipments from the inverter 21, the steering apparatus 15, the gyro sensor 162, the input section 171, the relative position detecting device 19, and the connecting sensor 20, so that respective controls of attitude, moving, and braking, and independent moving control and connection moving control in the fourth embodiment are performed according to these information items.

The main control device 161 is supplied with information items showing a torque and a rotor position from the driving motor 12, supplied with acceleration instruction information, deceleration instruction information, and turning information indicating a turning direction from the steering apparatus 15, supplied with an angular velocity of a boarding portion from the gyro sensor 162, supplied with selection information of a driver to various buttons displayed on the display section 172 from the input section 171, supplied with a relative position relationship to the connecting device 5 from the relative position detecting device 19, and supplied with presence/absence of connection with the connecting device 5 from the connecting sensor 20.

Next, supply and regeneration of power in the connected vehicles will be explained with reference to FIG. 32.

These current controls are performed according to instructions to respective vehicles from the control unit in the host vehicle (for example, the control unit 16 in the vehicle 1). Incidentally, moving in the city streets where the vehicle moves at a low speed and repeats acceleration and deceleration frequently is mainly assumed here.

Incidentally, the driving motors 12 mounted on the vehicles 1 to 4 are respectively described as motors 1 to 4 like the small batteries. Further, the inverter 21 is omitted in FIG. 32 and figures subsequent thereto for simplification.

The connected vehicles include a total of five batteries of the large battery 6 and the small batteries 1 to 4 as power sources and a total of five batteries of the large battery 6 and the small batteries 1 to 4 as charge destinations for regeneration power. Therefore, as selection of supply source of a power source and selection of regeneration destination, there are various combinations, any one of which can be used.

In the fourth embodiment, selection of the power source and selection of the regeneration destination are performed according to the following standards.

(Standard 1) The large battery 6 is basically used and the small batteries 1 to 4 are used subsidiarily during connection.

First, regarding the case that the connected vehicles drive, each vehicle receives power supply from the large battery 6 to dive the motors 1 to 4 using the power. When charging to the large battery 6 is insufficient, or when the large battery 6 is discharged to an empty state, and when rapid acceleration or high-speed moving is performed as described later, the small batteries 1 to 4 are also used.

(Standard 2) Each vehicle performs regeneration to the small batteries 1 to 4 preferentially during connection.

When all of the small batteries have been fully charged, each vehicle performs regeneration to the large battery 6.

(Standard 3) The small batteries 1 to 4 are maintained in fully charged states as much as possible during connection.

The control unit in the host vehicle detects charged states of the small batteries 1 to 4 periodically and when the small batteries 1 to 4 are not in fully charged states, they are charged using current in the large battery 6.

Further, when the vehicle is connected to the connecting device 5 after moving independently, the host vehicle senses a charged amount of the small battery in the vehicle and when the battery is not put in a fully charged state, it is charged by the large battery 6.

By adopting such a configuration that the small batteries 1 to 4 are always maintained in full charged states as much as possible during connection with the connecting device 5, the vehicle can always perform independent moving after disconnected from the connecting device 5.

The selection standards of the power sources and the regeneration destinations have been explained above, but when each vehicle moves independently, it can be disconnected from the connecting device 5 in a fully charged state as much as possible according to these standards.

Further, these standards can be modified variously. For example, the host vehicle is given a learning ability so that a ratio where each vehicle including the own vehicle moves independently is learned. Such a configuration can be adopted that regarding a vehicle having an independent moving ratio equal to or more than a predetermined value, its fully charged state is always maintained using the large battery 6 during connection with the connecting device 5, and regarding the other vehicles, they are charged using the large battery 6 when their charged rates falls below a predetermined value. Thereby, a vehicle which performs independent moving frequently can be managed in a concentrated manner.

As still another example, the following case is thought. That is, one of the small batteries is selected and used for regeneration. In this case, for charging to the small battery, regeneration is used without using the large battery 6. Electric energy stored in the small battery is used in preference to the large battery 6. By adopting such a configuration, the remaining amount (the charged amount) of the small battery can be reduced to the lowest limit value for each driving of the connected vehicles, so that regeneration energy can be stored in the small battery efficiently at a braking time.

Figure 33:
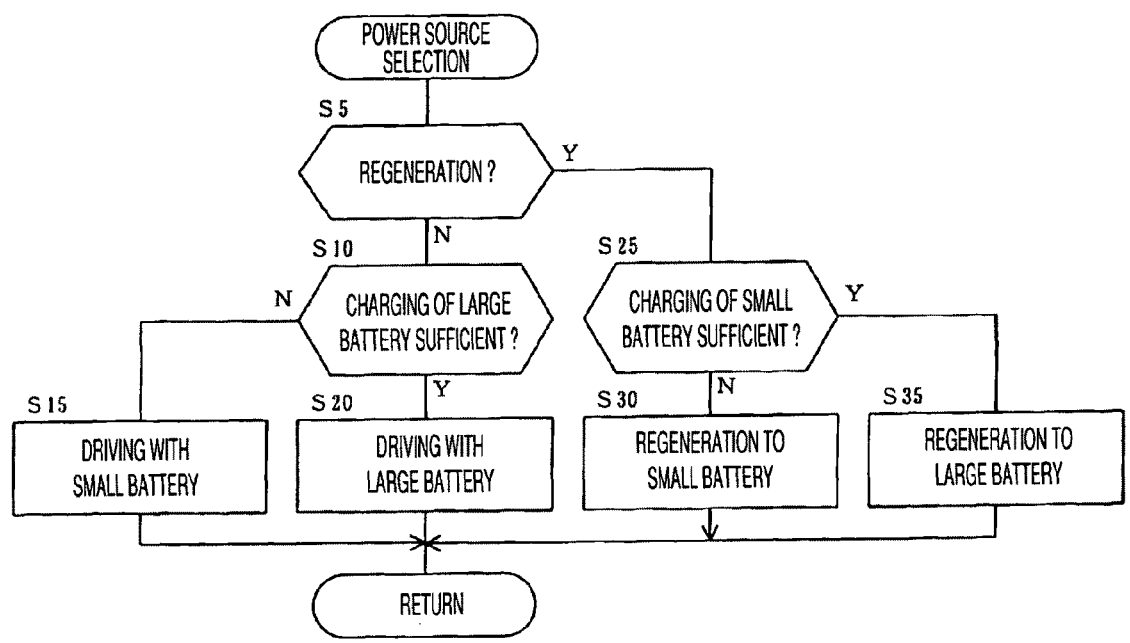
FIG. 33 is a flowchart for explaining a power selecting procedure.

FIG. 33 is a flowchart for explaining a power source selecting procedure performed by the control unit in the host vehicle.

First, the control unit in the host vehicle determines whether connected vehicles are going to drive or perform regeneration (braking) from a running operation of a driver (step 5).

When the connected vehicles are going to drive (step 5; No), the control unit in the host vehicle senses whether or not the charged amount of the large battery 6 is sufficient (step 10). The charged amount is determined to be insufficient, for example, when the large battery 6 has been completely discharged to an empty state.

When the control unit in the host vehicle senses that the charged amount of the large battery 6 is sufficient (step 10; Yes), the motors 1 to 4 are driven by power of the large battery 6 (step 20), and the control unit returns back to step 5.

The control is performed by the control unit in the host vehicle instructing each following vehicle to use power of the large battery 6 and the own vehicle using power of the large battery 6.

On the other hand, when it is sensed that the charged amount of the large battery 6 is not sufficient (step 10; No), the control unit in the host vehicle uses power of the small batteries 1 to 4 to drive the motors 1 to 4 (step 15), and the control unit returns back to step 5.

Such a configuration can be adopted that when the small batteries 1 to 4 are used, each vehicle uses the small battery of its own vehicle, or such a configuration can be adopted that the use sequence of the batteries is determined, for example, such that the small battery 4 is used by all the vehicles and after the small battery 4 is discharged down to the lowest limit value of the remaining amount (charged amount), the small battery 3 is used, and the batteries are used based upon the sequence.

Further, such control can be conducted that when the charged amount of the large battery 6 is equal to or less than a predetermined reference value, for example, 40%, both the large battery 6 and the small batteries 1 to 4 are used.

Incidentally, in the fourth embodiment, it is assumed that the connected vehicles move with the large battery 6, and when the large battery 6 is discharged down to a predetermined lowest limit value, the connected vehicles move with the small batteries subsequently. In this case, the control unit 16 in the host vehicle turns ON a warning light or the like to instruct the driver to charge the large battery 6.

Next, at step 5, when it is determined that the connected vehicles are going to perform regeneration (step 5; Yes), the control unit 16 in the host vehicle determines whether or not charging of the small batteries 1 to 4 is sufficient (step 25). Here, the control unit 16 determines that the charged amounts of the small batteries are sufficient when the charged amounts are equal to or more that 80%.

When the charged amount is insufficient (step 25; No), the control unit in the host vehicle prioritizes regeneration of the small battery (step 30) and it returns back to step 5.

On the other hand, when it is sensed that charging of the small batteries 1 to 4 is sufficient (step 25; Yes), the control unit in the host vehicle performs regeneration to the large battery 6 (step 35) and it returns back to step 5.

Next, a case that the connected vehicles are moving using the large battery 6 and the small batteries 1 to 4 are used subsidiarily will be explained. As the case requiring assistance, for example, there are a case that rapid acceleration is performed and a case that high-speed moving is performed.

Figure 34A:
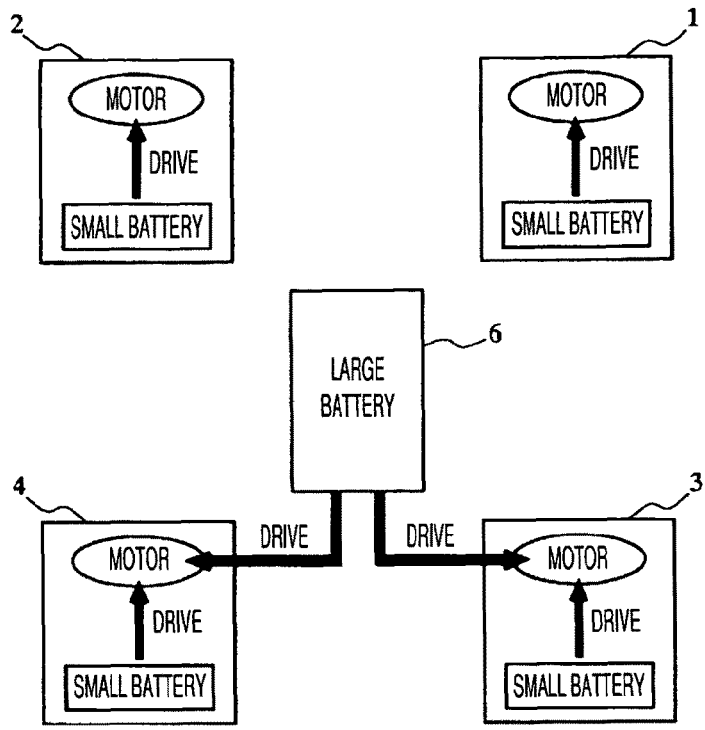
FIG. 34 is a diagram for explaining a case that a small battery is used as an auxiliary battery.

FIG. 34A is a diagram representing a power supplying state when rapid acceleration is performed.

When the connected vehicles are accelerated rapidly, it is necessary to generate large torque at the rear wheels. Therefore, the control unit in the host vehicle allocates power from the large battery 6 which is supplying power to the respective vehicles 1 to 4 in an ordinary moving to the vehicles 3, 4 corresponding to the rear wheels preferentially and also supplies power from the small batteries 3, 4 to the motors 3, 4.

At this time, since power supply from the large battery 6 to the motors 1, 2 of the vehicles 1, 2 corresponding to the front wheels is stopped, power from the small batteries 1, 2 is used for the motors 1, 2 of the vehicles 1, 2.

When a power supply amount to the vehicles 3, 4 exceeds the power supply capacity of the large battery 6, as illustrated, power supply of the large battery 6 is concentrated to the motors 3, 4 and power is supplied to the respective motors 1 to 4 from the small batteries of the respective vehicles. By supplementing shortage of power supplied by the large battery 6 by the small batteries in this manner, the connected vehicles can obtain torque required for rapid acceleration.

Figure 34B:
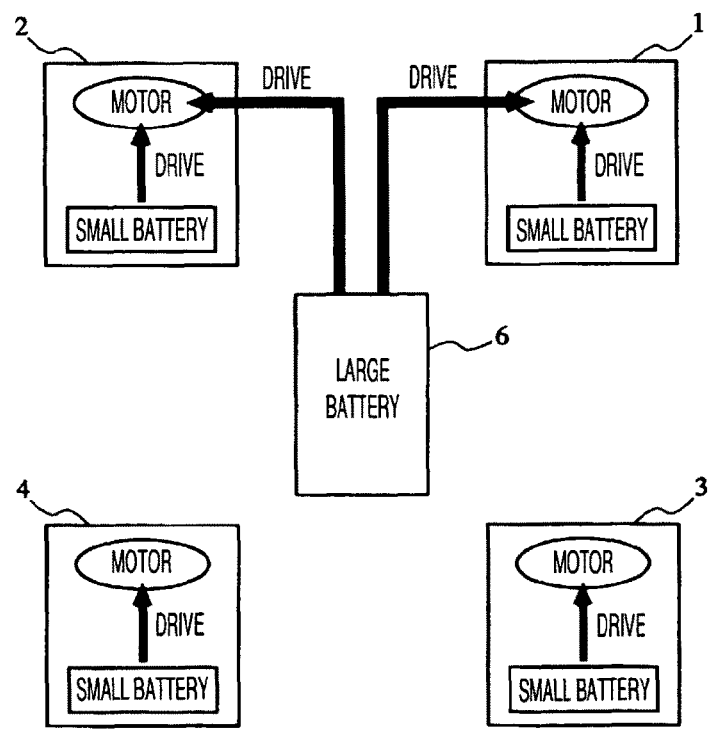

FIG. 34B is a diagram showing power supply conducted in a high-speed moving. When high-speed moving is performed, since moving of the connected vehicles is stabilized by making torque of the front wheels larger than that of the rear wheels, it is desirable to supplement power supply to the front two wheels.

Therefore, the control unit in the host vehicle allocates the power supply ability of the large battery 6 to the vehicles 1, 2 which are front vehicles preferentially.

When the power supply amount to the vehicles 1, 2 exceeds the power supply ability of the large battery 6, as illustrated, the power of the large battery 6 is concentrated to the motors 1, 2 and power is supplied from the small batteries in the respective vehicles to the motors 1 to 4. By supplementing shortage of power supplied from the large battery 6 by the small batteries in this manner, the connected vehicles can obtain torque required for high-speed moving.

As explained above with reference to respective figures on FIG. 34, the connected vehicles are provided with power distributing means for distributing power supplied from the large battery 6 according to driving force generated at the plurality of vehicles.

Next, a modified embodiment where the small batteries 1 to 4 are used as an aid will be explained.

Figure 35A:
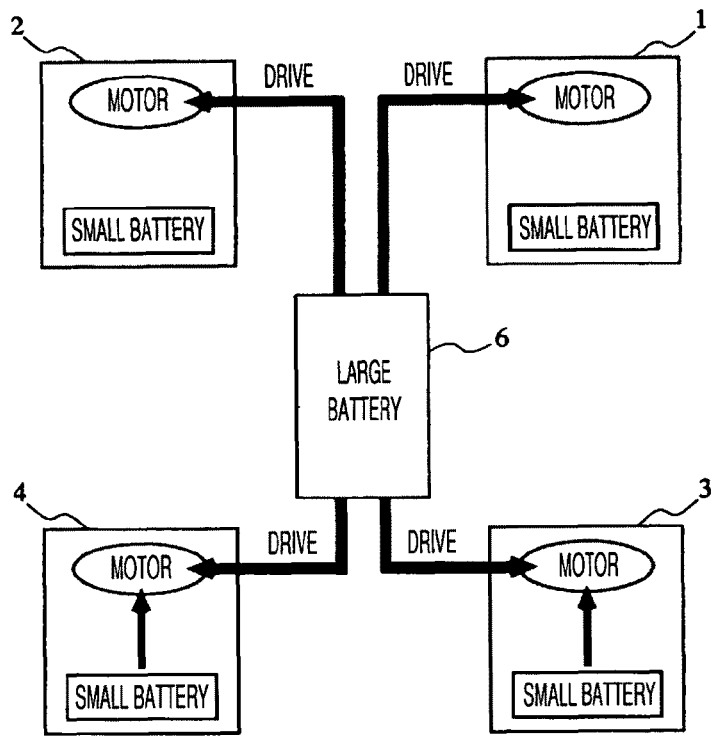
FIG. 35 is a diagram for explaining a case that a small battery is used as an auxiliary battery.

FIG. 35A is a diagram for explaining a modified embodiment when rapid acceleration is performed. In this embodiment, power for ordinary moving is supplied from the large battery 6 to the vehicles 1 to 4 like moving on the city streets shown in FIG. 32 and regarding the vehicles 3, 4, power for aid is supplied to the motors 3, 4 from the small batteries thereof. Thereby, the connected vehicles can obtain torque required for rapid acceleration.

Figure 35B:
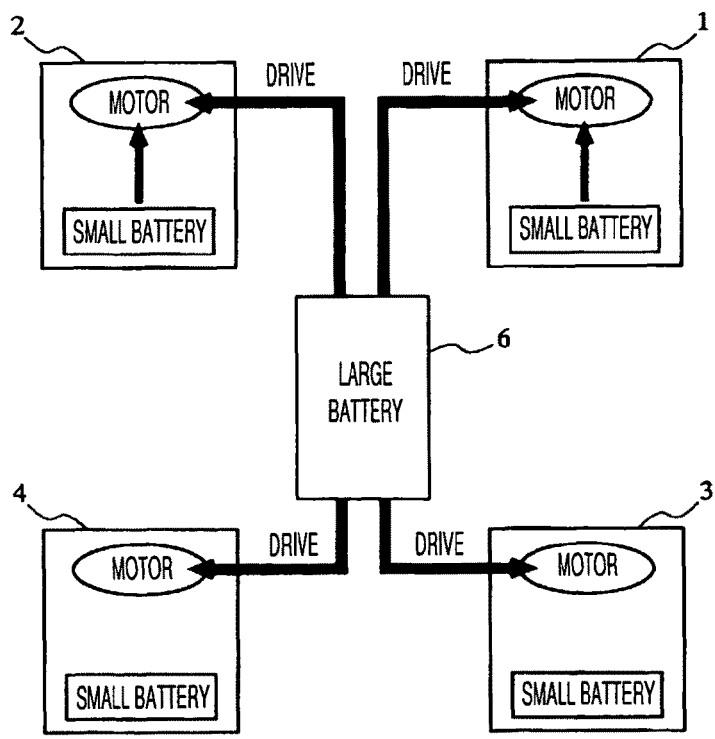

FIG. 35B is a diagram for explaining a modified embodiment when high-speed moving is performed. In this embodiment, power for ordinary moving is supplied from the large battery 6 to the vehicles 1 to 4 like moving on the city streets shown in FIG. 32 and regarding the vehicles 1, 2, power for aid is supplied to the motors 1, 2 from the small batteries thereof. Thereby, the connected vehicles can obtain torque required for high-speed moving.

Power supplies at a rapid acceleration time and during high-speed moving have been explained above with reference to respective figures on FIGS. 34, 35, but the following modified embodiment can be further adopted.

In the rapid acceleration, as shown in FIG. 35A, the motors 3, 4 are assisted by the small batteries 3, 4 while ordinary power is being supplied from the large battery 6 to the motor 1 to 4 in a first stage of acceleration.

After a predetermined acceleration is achieved in the first stage, as shown in FIG. 34A, power of the large battery 6 is concentrated to the motors 3, 4 to achieve a targeted acceleration in a second stage where further large power is required.

Figure 32:
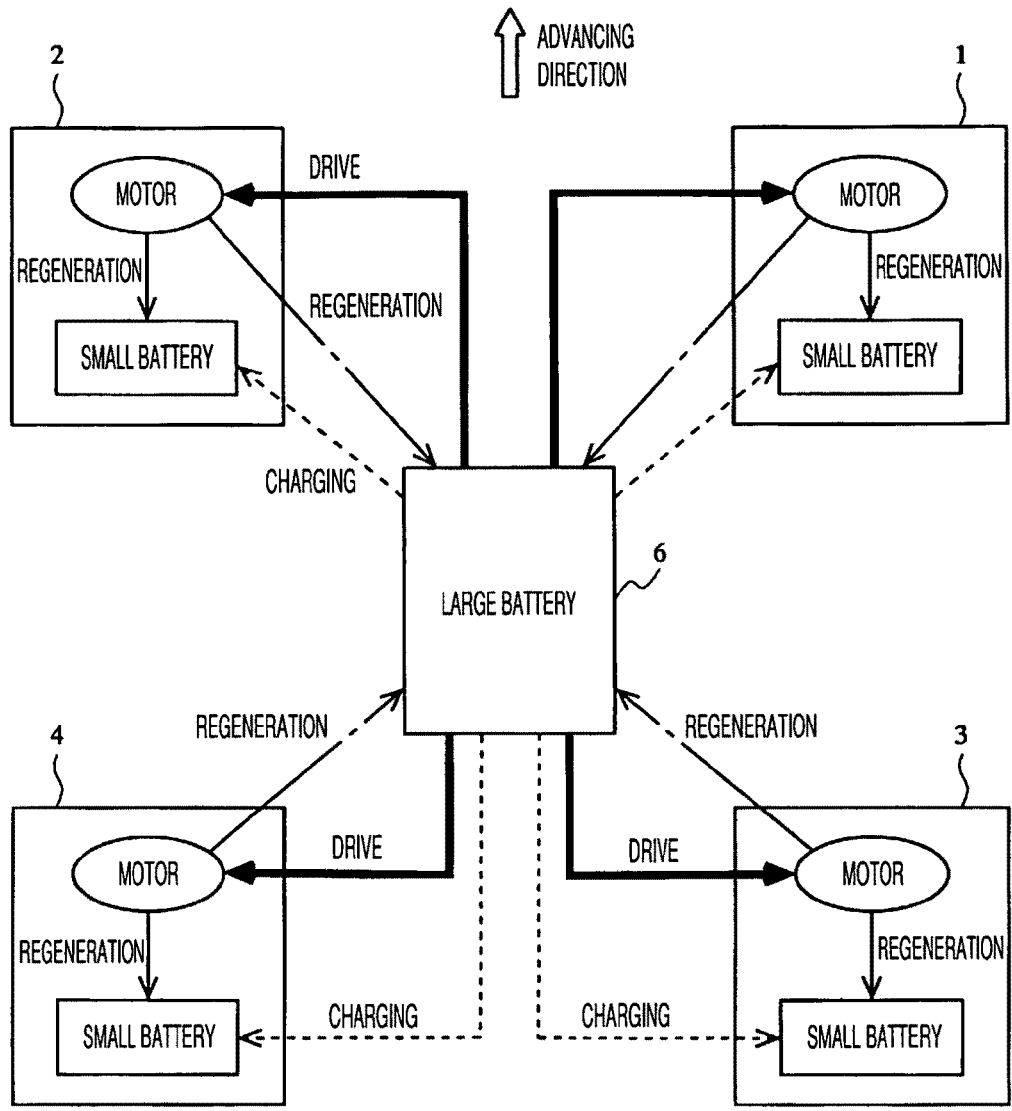
FIG. 32 is a diagram for explaining supply and regeneration of power in connected vehicles.

In this case, the state shown in FIG. 35A is an intermediate state for transition from the state shown in FIG. 32 to the state shown in FIG. 34A.

On the other hand, in the high-speed moving, as shown in FIG. 35B, the motors 1, 2 are assisted by the batteries 1, 2 while ordinary power is being supplied from the large battery 6 to the motors 1 to 4 in a first stage of high-speed moving.

After the high-speed moving is stabilized in the first stage, as shown in FIG. 34B, power of the large battery 6 is concentrated to the motors 1, 2 to maintain the high-speed moving state in a second stage of high-speed moving where further large power is required.

In this case, the state shown in FIG. 35B is an intermediate state for transition from the state shown in FIG. 32 to the state shown in FIG. 34B.

Like these modified embodiments, rapid change in power supplying aspect can be avoided by transition to a final power supplying aspect via the intermediate state, and while burden on a power supply system is reduced, rapid transition from an initial state of the power supply aspect to the final state can be achieved while moving is stabilized.

In the fourth embodiment described above, the large battery 6 is mounted on the connecting device 5, but such a configuration may be adopted that the large battery 6 is mounted on any one of the vehicles.

For example, as shown in FIG. 9, the large battery 6 may be mounted on the vehicle 4.

The connected vehicles move by power supplied by the vehicle 4. In independent moving, each vehicle receives power supply from its own small battery to move. In this case, the vehicle 4 receives power supply from the large battery 6 to move independently.

Figure 36:
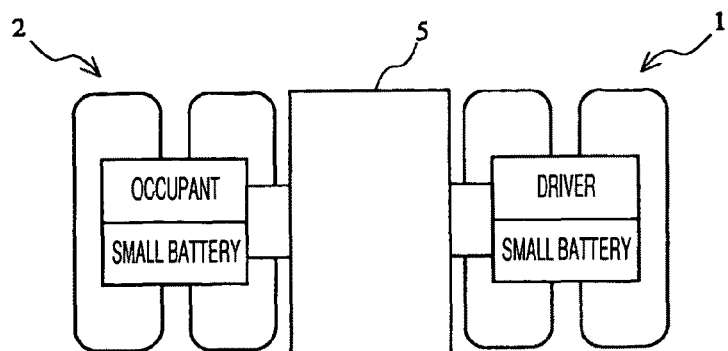
FIG. 36 is a diagram for explaining a mounting example of a large battery according to a modified embodiment.
Figure 36:
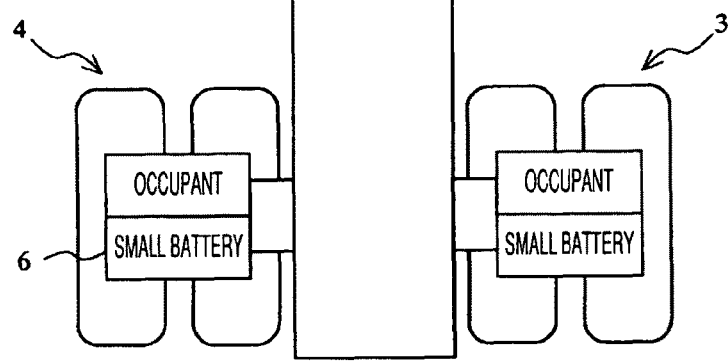

The vehicle 4 shown in FIG. 36 is provided with power supplying means for supplying power from the large battery 6 to the driving motors 12 in the other vehicles during connection. Incidentally, the vehicles 1 to 3 are also provided with power supplying means for supplying powers of the small batteries in their own vehicles to the other vehicles during connection.

When the large battery is mounted on any one of the vehicles in this manner, configuration of the connecting device 5 can be simplified so that manufacturing cost of the connecting device 5 can be reduced. Further, since the power sources are comprised from four batteries of the large battery 6 and the small batteries 1 to 3, the number of power sources is reduced by one as compared with the case that the large battery 6 is mounted on the connecting device 5, so that the transmission system and transmission control system for power are simplified.

For example, when a vehicle performing independent moving is limited such that a vehicle of the vehicles 1 to 4 which frequently moves independently is the vehicle 1 and the other vehicles are not utilized for independent moving, it is desirable that the large battery 6 is mounted on the vehicle which does not move independently.

Incidentally, in the fourth embodiment, the large battery 6 and the small batteries 1 to 4 are adopted as the power sources and the regeneration destinations, but a device having a storage function and a discharging function like a capacitor can be used instead of the large battery 6 and the small batteries 1 to 4.

When capacitors are used, a large-sized capacitor is used instead of the large battery 6 and small-sized capacitors are used instead of the small batteries 1 to 4.

The fourth embodiment of the connected vehicles has been explained above, and the following effects can be obtained by this embodiment.

(1) When independent moving is performed, a small-sized battery is used, and when vehicles are connected and connection moving is performed, a large-sized battery can be used. Thereby, since extension of a cruising distance and output improvement can be achieved at a connection moving time by a large-sized energy source, independent moving is specialized in short trips at low speed and connection moving is specialized in long-distance movement.

(2) Since mounting of a heavy and large-sized battery is not required during independent moving, energy efficiency during the independent moving can be improved. That is, only mounting of minimal energy source is required during independent moving.

(3) Since the connected vehicles have a plurality of energy sources, transmission and reception among the energy sources are made possible. Thereby, for example, since each small battery can be charged during connection by using regeneration energy and the large battery 6, each vehicle is disconnected from the connecting device 5 so that it can always move independently.

(4) A vehicle moving independently can be reduced in weight and size thoroughly and a minimal energy source may be mounted on the vehicle.

(5) Since a minimal energy use amount is only required during independent vehicle, a vehicle can be used economically as a tool for movement, and vehicles can be used as a comfortable automobile which can accommodate many people during connection (integrated vehicles) like a conventional vehicle.

Figure 37:
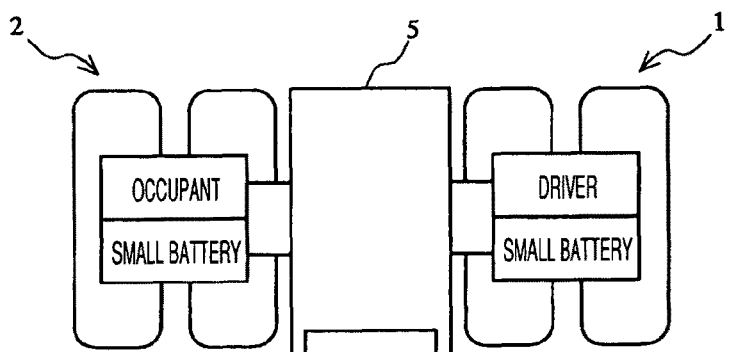
FIG. 37 is a diagram for explaining a case that a fuel battery is used as a power source.
Figure 37:
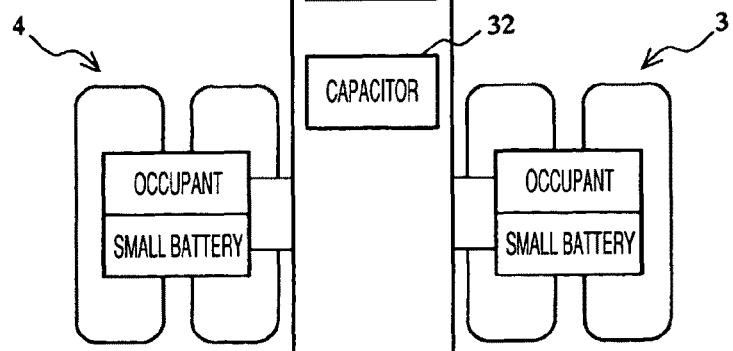

Next, a case that a fuel battery is used as a large-sized power source will be explained with reference to FIG. 37.

In this embodiment, a fuel battery 31 and a capacitor 32 are mounted on a connecting device 5.

The fuel battery 31 is a generator for generating power by combining hydrogen and oxygen. Since liquid fuel such as alcohols, or gasoline or similar materials is mainly used as fuel for the fuel battery 31, these fuels may be supplied to a fuel tank at a time of serving fuel, so that supply of fuel can be performed rapidly as compared with the case that charging is performed to the large battery 6.

On the other hand, the capacitor 32 has a property storing charge. Therefore, the capacitor 32 can supply power for moving to connected vehicles by discharging stored charge and it can store regeneration energy as charge.

Thus, the fuel battery 31 and the capacitor 32 can supply power to the vehicles 1 to 4 and the capacitor 32 can recover regeneration energy of the vehicles 1 to 4. Therefore, a combination of the fuel battery 31 and the capacitor 32 can be used like the large battery 6 explained in the fourth embodiment.

On the other hand, since recovery of regeneration energy is generally not performed in the fuel battery 31, the capacitor 32 is provided for recovery of regeneration energy, so that a power supplying function and a regeneration energy recovering function like the large battery 6 are realized.

Incidentally, in case that both the fuel battery 31 and the capacitor 32 are used, when such a configuration is adopted that charge stored in the capacitor 32 is discharged preferentially relative to the fuel battery 31, the capacitor 32 can be frequently discharged so that an empty capacitance prepared for regeneration of the capacitor can be secured.

FIG. 38 is a table showing one example of respective cases of usage of a fuel battery 31, a capacitor 32, and small batteries 1 to 4 in connected vehicles. Incidentally, in the connected vehicle, energy stored in the capacitor 32 is used for driving most preferentially and the capacitor 32 is put in a discharged state in the following cases.

Case 1 shows a case that fuel in the fuel battery 31 is sufficient and the charged amounts of the small batteries 1 to 4 are sufficient, but the capacitor 32 is empty.

In this case, the fuel battery 31 supplies driving power to the vehicles 1 to 4 and regeneration energy is recovered in the capacitor 32.

Case 2 shows a case that fuel in the fuel battery 31 is sufficient but the small batteries 1 to 4 and the capacitor 32 are empty. Incidentally, in FIG. 38, empty in the small battery represents a case that the remaining amount of charging is a predetermined lowest limit (hereinafter, the same in explanation of FIG. 38).

In this case, the fuel battery 31 supplies driving power to the vehicles 1 to 4 and also supplies power for charging the small batteries 1 to 4. Regeneration energy is recovered in the capacitor 32.

Further, as a case similar to Case 2, when some of the small batteries are empty, the fuel battery 31 supplies power for charging to the some.

Case 3 is a case that fuel in the fuel battery 31 is insufficient and the charged amounts of the small batteries 1 to 4 are sufficient but the capacitor 32 is empty.

In this case, the small battery 4 supplies power for moving to the vehicles 1 to 4 and regeneration energy is recovered in the capacitor 32. The Case 3 is a case that fuel in the fuel battery 31 is completely consumed, which corresponds to an emergency situation. In such a case, however, the connected vehicles move with the small battery 4 for the meantime, and they instruct a driver to perform fuel servicing by lighting a warning light or the like.

Case 4 is a case that the small battery 4 has become empty due to moving in the Case 3. In this case, the small battery 3 supplies power for moving to the vehicles 1 to 4. Regeneration energy is recovered in the capacitor 32.

Case 5 is a case that the small battery 3 has become empty due to moving in the Case 4. In this case, the small battery 2 supplies power for moving to the vehicles 1 to 4. Regeneration energy is recovered in the capacitor 32.

Incidentally, the small battery 1 is not used for connection moving, and the vehicle 1 is prepared for independent moving.

Thus, when fuel in the fuel battery 31 is insufficient, the connected vehicles use the small batteries 1 to 4 in a predetermined sequence. That is, a use sequence as the power source is the order of the capacitor 32, the fuel battery 31, the small battery 4, the small battery 3, and the small battery 2.

In the above explanation, regeneration energy is recovered in the capacitor 32 in any cases, but when the capacitor 32 is fully charged, the connected vehicles perform regeneration to the capacitor of one of the small batteries 1 to 4 which can be charged. However, since energy stored in the capacitor 32 is used preferentially, it is rare that the capacitor 32 is fully charged by regeneration.

In the above, the case that power is supplied by the fuel battery 31 and regeneration energy is recovered in the capacitor 32 has been explained, but a configuration which does not include the capacitor 32 is possible. In this case, any one of the small batteries 1 to 4 is used instead of the capacitor 32.

FIG. 39 is a table showing one example of respective cases of usage of a fuel battery 31 and small batteries 1 to 4 in connected vehicles.

In this example, the small battery 4 is used instead of the capacitor 32. That is, the small battery 4 is used as a power source preferentially, and regeneration energy is recovered in the small battery 4 in case of regeneration.

Case 1 is a case that fuel in the fuel battery 31 is sufficient, the charged amounts of the small batteries 1 to 3 are sufficient, and the small battery 4 is empty. That is, the Case 1 shows a state after power in the small battery 4 has been used up.

In this case, the fuel battery 31 supplies power for driving to the vehicles 1 to 4 and regeneration energy is recovered in the small battery 4.

Case 2 is a case that the small battery 4 has been fully charged by regeneration in the Case 1. That is, the Case 1 is a case that fuel in the fuel battery 31 is sufficient and the charged amounts of the small batteries 1 to 4 are also sufficient.

In this case, the small battery 4 supplies power for driving to the vehicles 1 to 4 and it also performs recovery of regeneration energy.

Thus, the connected vehicles move while repeating the Case 1 and the Case 2 alternately in an ordinary state. That is, the connected vehicles move using the small battery 4 when the small battery 4 is full, and when the small battery 4 becomes empty, they subsequently move using the fuel battery 31. Regeneration is performed at the small battery 4 and so that when the small battery is charged, the connected vehicles move using the small battery 4 again.

Thus, when all of the small batteries 1 to 4 have been fully charged, by using any one (here, the small battery 4) of the small batteries preferentially, capacity for recovering regeneration energy can be secured in the small battery.

Case 3 is a case that fuel in the fuel battery 31 is insufficient, the charged amounts of the small batteries 1 to 3 are sufficient, and the small battery 4 is empty. The case corresponds to an emergency situation after fuel in the fuel battery 31 has been used up.

In this case, the small battery 3 supplies power for driving to the vehicles 1 to 4 and it also performs regeneration.

Case 4 is a case that the small battery 3 has become empty due to moving in the Case 3. In this case, the small battery 2 supplies power for driving to the vehicles 1 to 4 and it also recovers regeneration energy.

Incidentally, the small battery 1 is not used for connection moving and the vehicle 1 is always prepared for independent moving.

Thus, a use sequence as the power sources is the order of the small battery 4, the fuel battery 31, the small battery 3, and the small battery 2.

In the above, the example where the fuel battery 31 has been used has been explained in the fourth embodiment, but the fuel battery 31 and the capacitor 32 may be mounted on any one (for example, the vehicle 4) of the vehicles instead of the connecting device 5.

By using the fuel battery 31 as the power source in the connected vehicles in this manner, the following effects can be obtained.

(1) The connected vehicles receive power supply from the fuel battery 31 during connection moving.

(2) For example, since liquid fuel is used, fuel servicing can be performed rapidly.

(3) Since fuel is drained as water after used, vehicle weight is reduced according to use of fuel. Therefore, fuel consumption is improved.

(3) By providing the capacitor 32, recovery of regeneration energy and use of regeneration energy recovered can be performed efficiently.

The invention claimed is:

1. A vehicle, comprising:

moving selecting means for selecting either one of leading moving serving as a leading vehicle in linkage moving where an own vehicle moves integrally in a linkage manner with another vehicle and following moving serving as a following vehicle in the linkage moving;

running operation means for conducting running operation;

moving information transmitting and receiving means for transmitting moving information based upon a moving demand according to the running operation to the following vehicle in the leading moving and receiving moving information transmitted from the leading vehicle in the following moving;

driving means for driving the own vehicle based upon a moving demand according to the running operation in the leading moving and driving the own vehicle based upon the received moving information in the following moving;

moving procedure storing means where a moving procedure where each vehicle moves at a changing time from a specific moving formation to another moving formation is stored, and moving formation changing means for performing determination about necessity of change from a moving formation in current moving to another moving formation to determine a moving formation after changed, wherein the moving formation transmitting and receiving means sequentially transmits arrangement relationships after changed to the respective following vehicles according to the moving procedure for performing change from a current moving formation to the determined moving formation after changed in the leading moving, and the driving means drives the own vehicle such that the own vehicle moves to satisfy the arrangement relationship after changed received from the leading vehicle in the following moving.

2. The vehicle according to claim 1, further comprising road width information acquiring means for acquiring road width information, wherein the moving formation changing means makes determination about necessity of moving formation change and a moving formation after changed based upon at least one of a moving speed of the own vehicle and the acquired road width information.

3. The vehicle according to claim 2, further comprising:

one or plural driving wheels which are driven by the driving means and are disposed on one shaft;

a boarding portion disposed above the driving wheels;

an attitude sensing sensor sensing an attitude of the boarding portion; and attitude control means for performing attitude control of the boarding portion so as to hold balance in a longitudinal direction regarding a driving direction of the driving wheels according to the sensed attitude of the boarding portion.

4. The vehicle according to claim 1, further comprising:

one or plural driving wheels which are driven by the driving means and are disposed on one shaft;

a boarding portion disposed above the driving wheels;

an attitude sensing sensor sensing an attitude of the boarding portion; and attitude control means for performing attitude control of the boarding portion so as to hold balance in a longitudinal direction regarding a driving direction of the driving wheels according to the sensed attitude of the boarding portion.

* * * * *